US010910898B2

(12) United States Patent
Sakuma et al.

(10) Patent No.: US 10,910,898 B2
(45) Date of Patent: Feb. 2, 2021

(54) ROTATING ELECTRIC MACHINE

(71) Applicant: AISIN SEIKI KABUSHIKI KAISHA, Kariya (JP)

(72) Inventors: Masafumi Sakuma, Chiryu (JP); Teppei Tsuda, Nagoya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 426 days.

(21) Appl. No.: 16/003,294

(22) Filed: Jun. 8, 2018

(65) Prior Publication Data

US 2018/0358857 A1 Dec. 13, 2018

(30) Foreign Application Priority Data

Jun. 12, 2017 (JP) .................. 2017-114920

(51) Int. Cl.
*H02K 3/28* (2006.01)
*H02K 3/12* (2006.01)
(Continued)

(52) U.S. Cl.
CPC ................. *H02K 3/28* (2013.01); *H02K 1/02* (2013.01); *H02K 1/24* (2013.01); *H02K 1/276* (2013.01);
(Continued)

(58) Field of Classification Search
CPC .. H02K 3/28; H02K 3/12; H02K 1/02; H02K 15/045; H02K 1/276; H02K 3/20; H02K 1/24; H02K 2213/03
(Continued)

(56) References Cited

U.S. PATENT DOCUMENTS 9,871,417 B2    1/2018  Saito et al.
2013/0113330 A1*  5/2013  Saito ............... H02K 21/14
                                        310/207
(Continued)

FOREIGN PATENT DOCUMENTS

JP    5948061 B2     7/2016
JP    2016-140202 A  8/2016

OTHER PUBLICATIONS

Received STIC search report from EIC2800 searcher Samir Patel on Jan. 14, 2020. (Year: 2020).*

(Continued)

*Primary Examiner* — Shawki S Ismail
*Assistant Examiner* — Htet Z Kyaw
(74) *Attorney, Agent, or Firm* — Buchanan Ingersoll & Rooney PC

(57) ABSTRACT

A rotating electric machine having a fraction slot configuration in which the number of slots per pole per phase is not an integer includes: a stator that includes a stator core provided with a plurality of slots, and a stator winding having a plurality of coil sides accommodated in the plurality of slots and a plurality of coil ends connecting the same side end parts of the plurality of coil sides to each other; and a movable element that is supported to be movable with respect to the stator, and includes a movable element core, and a plurality of movable element magnetic poles provided in the movable element core. The stator winding includes a plurality of basic coils in which the magnitude of magnetomotive force generated by the plurality of coil sides forming the one-phase band is uniform in each of the plurality of movable element magnetic poles.

9 Claims, 35 Drawing Sheets

(51) Int. Cl.
*H02K 1/02* (2006.01)
*H02K 15/04* (2006.01)
*H02K 1/27* (2006.01)
*H02K 3/20* (2006.01)
*H02K 1/24* (2006.01)

(52) U.S. Cl.
CPC .............. *H02K 3/12* (2013.01); *H02K 3/20* (2013.01); *H02K 15/045* (2013.01); *H02K 2213/03* (2013.01)

(58) Field of Classification Search
USPC ........................................................ 310/184
See application file for complete search history.

(56) References Cited

U.S. PATENT DOCUMENTS

| | | | |
|---|---|---|---|
| 2013/0154428 A1* | 6/2013 | Sakuma | H02K 3/28 310/207 |
| 2014/0361646 A1* | 12/2014 | Saito | B60L 15/20 310/51 |
| 2016/0181893 A1* | 6/2016 | Shrestha | H02K 3/12 310/60 R |
| 2016/0218580 A1* | 7/2016 | Ito | H02K 3/28 |

OTHER PUBLICATIONS

U.S. Appl. No. 16/157,748, filed Oct. 11, 2018, Masafumi Sakuma et al.
U.S. Appl. No. 16/343,545, filed Apr. 19, 2019, Masafumi Sakuma et al.
Academic curriculum Electrical Engineering and Design (revised 2nd edition), pp. 43 and 44, Feb. 25, 1993.

* cited by examiner

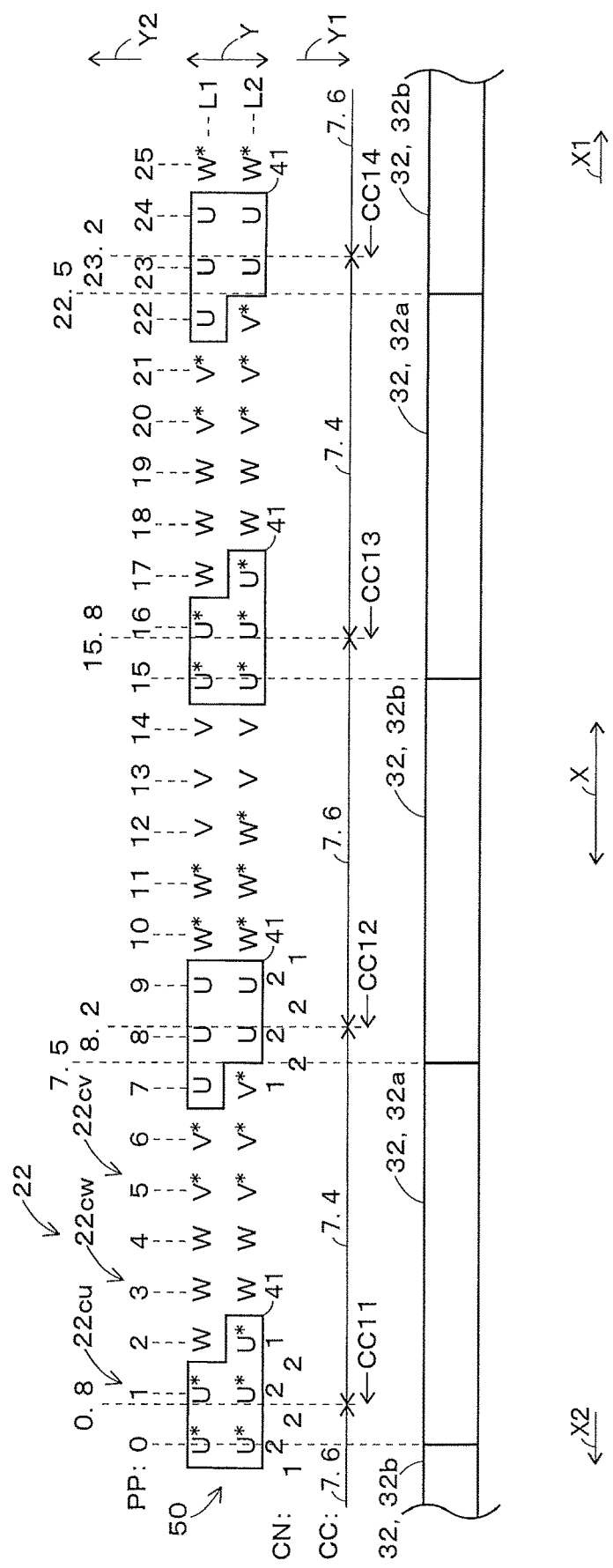

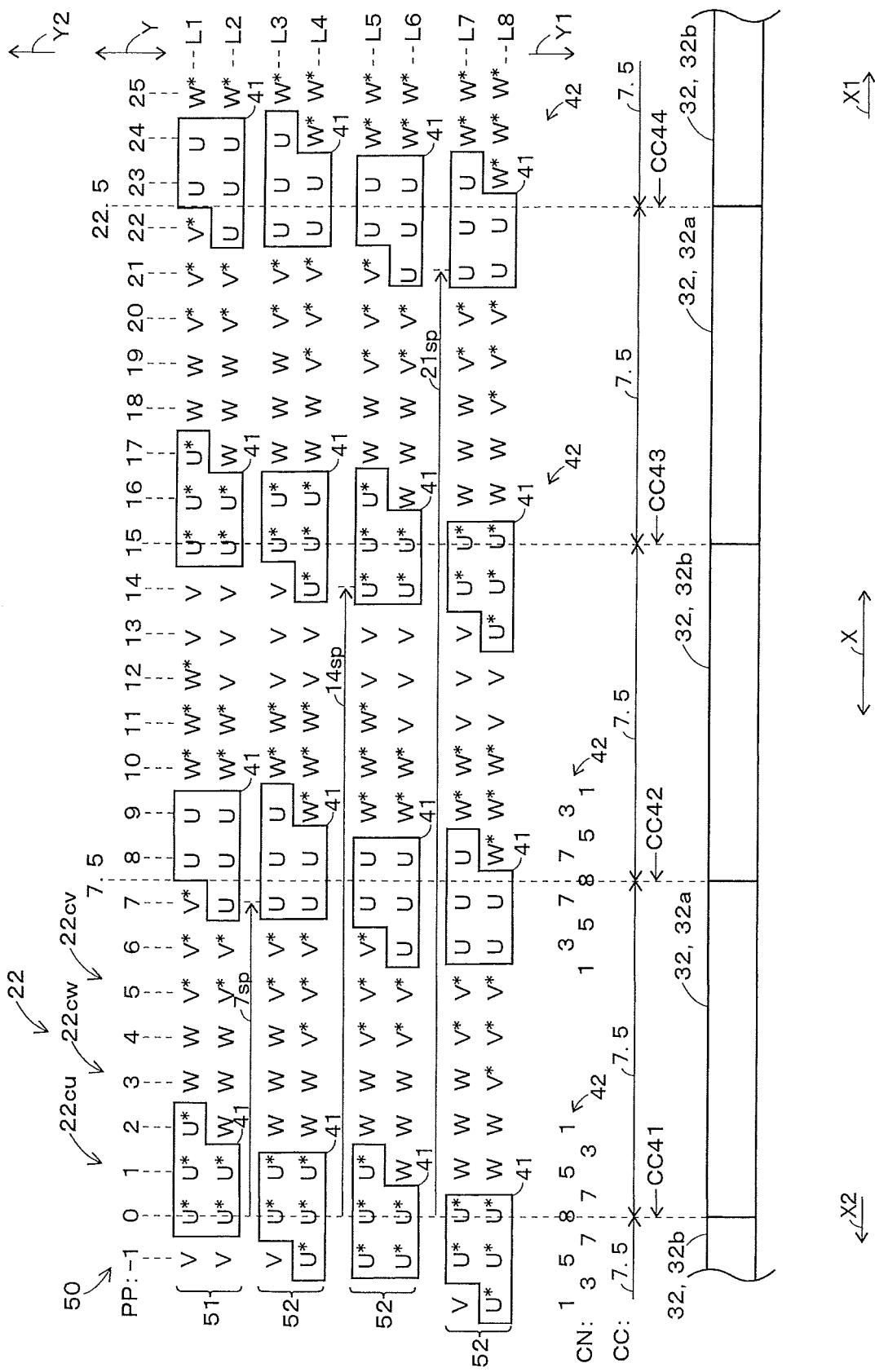

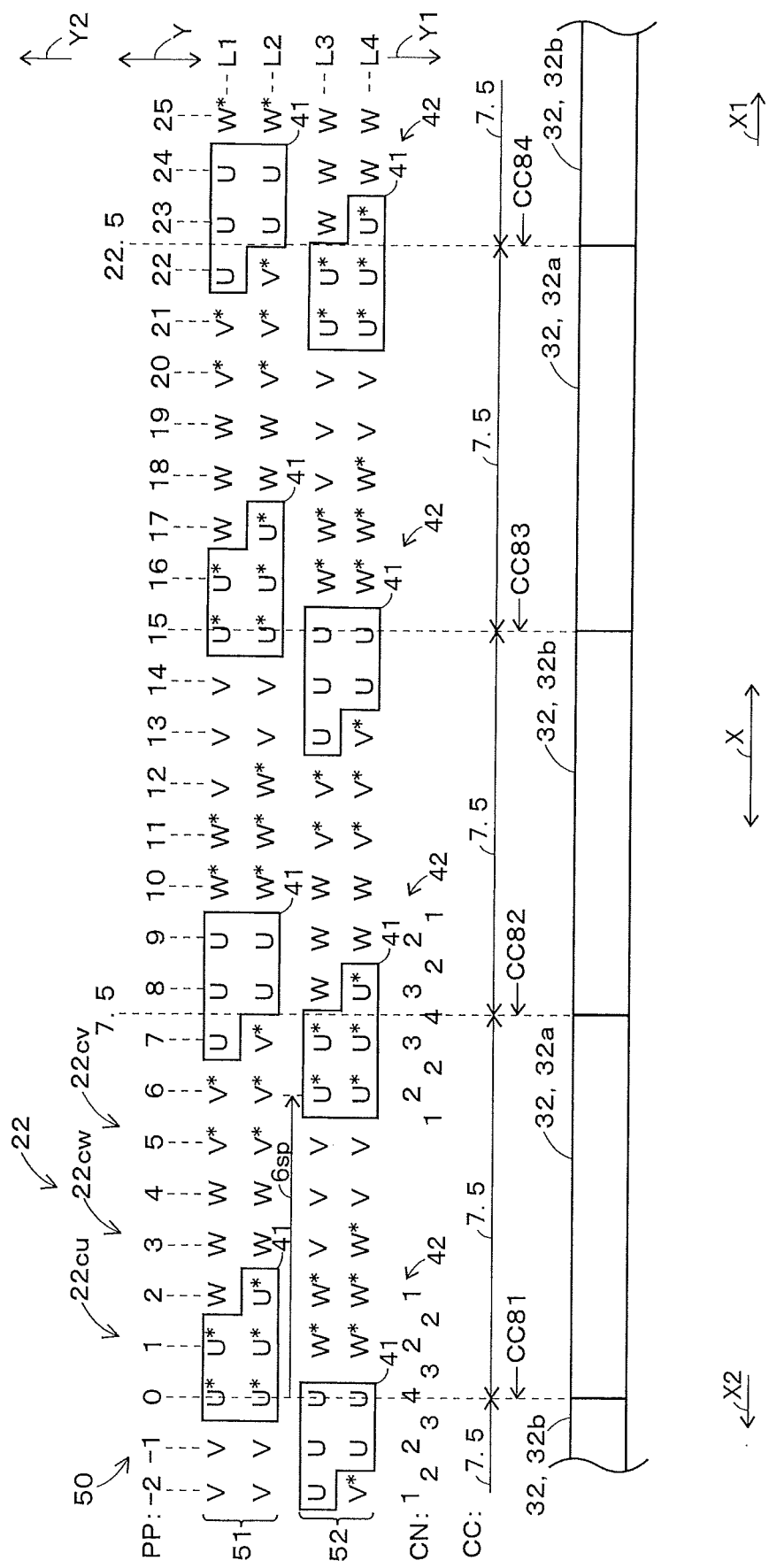

ROTATING ELECTRIC MACHINE

CROSS REFERENCE TO RELATED APPLICATIONS

This application is based on and claims priority under 35 U.S.C. § 119 to Japanese Patent Application 2017-114920, filed on Jun. 12, 2017, the entire contents of which are incorporated herein by reference.

TECHNICAL FIELD

The present specification discloses a technique relating to a rotating electric machine.

BACKGROUND DISCUSSION

A rotating electric machine disclosed in Japanese Patent No. 5948061 (Reference 1) is a rotating electric machine having an integer slot configuration in which the number of slots per pole per phase is an integer. The rotating electric machine disclosed in Reference 1 includes a stator winding having a plurality of slot conductor groups each formed of a plurality of slot conductors with the same phase. The plurality of slot conductors of the slot conductor group are inserted into slots of a predetermined number Ns which are continuously arranged in a stator core circumferential direction such that the slots and layers are adjacent to each other. The predetermined number Ns is set to Ns=NSPP+NL in a case where the number of slots per pole per phase is NSPP, and the number of layers is 2×NL. Consequently, the invention disclosed in Reference 1 achieves low noise of the rotating electric machine.

A three-phase AC electric motor disclosed in JP 2016-140202A (Reference 2) is a three-phase AC electric motor having a fraction slot configuration in which the number of slots per pole per phase is not an integer. In the three-phase AC electric motor disclosed in Reference 2, three layers of windings are disposed to overlap each other for a single slot. The winding in the first layer is disposed such that the respective windings of three phases such as a U phase, a V phase, and a W phase are arranged to have rotational symmetry of ±120 degrees of mechanical angles relative to each other. The winding in the second layer is shifted by L slots relative to the disposition of the winding in the first layer. The winding in the third layer is shifted by L slots relative to the disposition of the winding in the first layer in a direction opposite to the direction in which the winding in the second layer is shifted. Consequently, in the invention disclosed in Reference 2, a torque ripple of the three-phase AC electric motor can be reduced.

A three-phase synchronous machine disclosed in "Academic curriculum Electrical Engineering and Design (revised 2nd edition)" originally written by Shotaro Takeuchi, Ohmsha Ltd., issued Feb. 25, 1993 (first impression of revised 2nd edition), pages 43 and 44 (Reference 3) is a three-phase synchronous machine having a fraction slot configuration in which the number of slots per pole per phase is not an integer (more specifically, a fraction slot configuration in which a decimal place of the number of slots per pole per phase is 0.5). Reference 3 discloses an example of connection of two-layer double windings of the three-phase synchronous machine.

However, the invention disclosed in Reference 1 cannot be applied to a rotating electric machine having a fraction slot configuration in which the number of slots per pole per phase is not an integer. Specifically, in a rotating electric machine having a fraction slot configuration, the predetermined number Ns is not an integer, and thus arrangement of a plurality of slot conductors cannot be defined.

The invention disclosed in Reference 2 is directed to an invention for reducing a torque ripple, and it is hard to reduce noise and vibration of a three-phase AC electric motor. Specifically, in the three-phase AC electric motor disclosed in Reference 2, the magnetomotive force generated by windings with the same phase and the same current direction, accommodated in two slots which are continuously adjacent to each other in a rotation direction of a rotor changes in the ratio of 4:3:3:4 in the rotation direction of the rotor, and this is repeated. Thus, even if the windings in the three layers are shifted by the predetermined slots in the rotation direction of the rotor, the magnetomotive force generated when the windings are conducted is not uniform per pole of rotor magnetic poles. As a result, excitation force in a low-order spatial deformation mode is easily generated compared with the number of magnetic poles of the rotor. The stator has an eigenfrequency corresponding to the spatial deformation mode, and the eigenfrequency is reduced by a low-order spatial deformation mode. Thus, the three-phase AC electric motor has resonance points of noise and vibration at which the eigenfrequency corresponding to the spatial deformation mode of the stator matches a frequency of the low-order excitation force at a lower rotation frequency, and thus a countermeasure against that is necessary.

Reference 3 merely discloses an example of connection of two-layer double windings of the three-phase synchronous machine having a fraction slot configuration, and does not disclose a technique for reducing noise and vibration of the three-phase synchronous machine caused by phase arrangement of the stator windings.

Thus, a need exists for a rotating electric machine having a fraction slot configuration which is not susceptible to the drawback mentioned above.

SUMMARY

The present specification discloses a rotating electric machine having a fraction slot configuration in which the number of slots per pole per phase is not an integer, including a stator that includes a stator core provided with a plurality of slots, and a stator winding having a plurality of coil sides accommodated in the plurality of slots and a plurality of coil ends connecting the same side end parts of the plurality of coil sides to each other; and a movable element that is supported to be movable with respect to the stator, and includes a movable element core, and a plurality of movable element magnetic poles provided in the movable element core. In a case where a set of the plurality of coil sides with the same phase and the same current direction, accommodated in the plurality of slots which are continuously adjacent to each other in a movement direction of the movable element is referred to as a one-phase band, the stator winding includes a plurality of basic coils in which the magnitude of magnetomotive force generated by the plurality of coil sides forming the one-phase band is uniform in each of the plurality of movable element magnetic poles. The plurality of basic coils include a first basic coil which is used as a reference regarding arrangement of the one-phase band per pole in the movement direction of the movable element, and at least one second basic coil in which arrangement of the one-phase band per pole in the movement direction of the movable element differs with respect to the first basic coil. In a case where a newly formed one-phase band by mixing the plurality of coil sides forming a certain one-phase band of the first basic coil with the plurality of coil sides forming a certain one-phase band of each of at least one second basic coil is referred to as a mixed one-phase band, in the stator winding, in the stator winding, the plurality of basic coils are mixed with each other such that the magnitude of magnetomotive force generated by the plurality of coil sides forming the mixed one-phase band is uniform in each of the plurality of movable element magnetic poles.

BRIEF DESCRIPTION OF THE DRAWINGS

The foregoing and additional features and characteristics of this disclosure will become more apparent from the following detailed description considered with the reference to the accompanying drawings, wherein:

FIG. 3 is a schematic diagram illustrating an example of phase arrangement of the stator winding according to a reference form;

FIG. 10O is a schematic diagram illustrating an example of phase arrangement of the stator winding in which arrangement in a slot of the plurality of coil sides accommodated in the same slot is changed according to a modification form;

FIG. 19A is a schematic diagram illustrating an example of phase arrangement of a stator winding according to another modification form;

DETAILED DESCRIPTION

Figure 1:
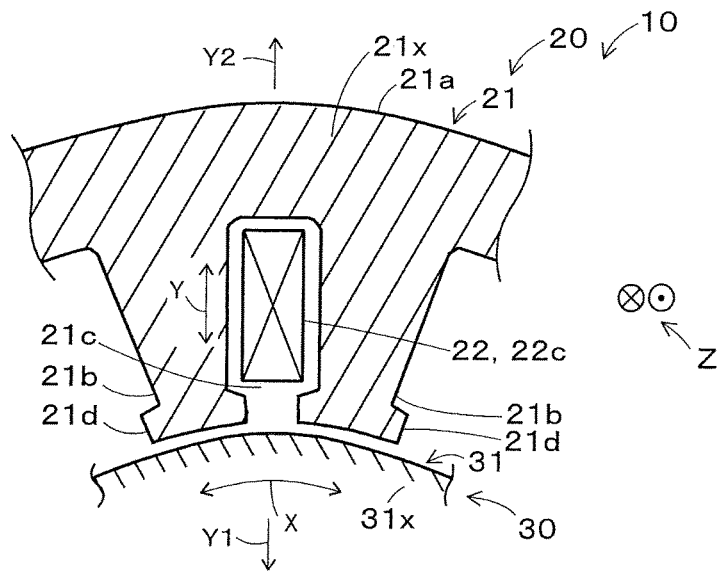
FIG. 1 is a cut portion sectional view illustrating a part of a section obtained by cutting a rotating electric machine in a plane perpendicular to a third direction (arrow Z direction) according to a first embodiment.

In the present specification, a plurality of embodiments are described with reference to the drawings. In the drawings, in the respective embodiments, a common reference numeral is given to common portions, and repeated description is omitted in the present specification. The content described in one embodiment may be applied to other embodiments as appropriate. The drawings are conceptual diagrams, and do not define dimensions of detail structures.

First Embodiment

Schematic Configuration of Rotating Electric Machine 10

A rotating electric machine 10 of the present embodiment includes a stator 20 and a movable element 30. The stator 20 has a stator core 21 and a stator winding 22. A plurality of (in the present embodiment, sixty) slots 21c are formed in the stator core 21, and the stator winding 22 is wound on each of a plurality of (sixty) slots 21c. The stator winding 22 is provided with a plurality of (in the present embodiment, three) phase coils 22c with phases which are different from each other. In other words, the rotating electric machine 10 of the present embodiment is a three-phase machine.

The movable element 30 is supported to be movable with respect to the stator 20, and includes a movable element core 31 and a plurality of (in the present embodiment, eight) movable element magnetic poles 32 (four pairs of movable element magnetic poles 32a and 32b) provided in the movable element core 31. As mentioned above, the rotating electric machine 10 of the present embodiment is a rotating electric machine having an eight-pole and sixty-slot configuration (a rotating electric machine having a fundamental configuration in which the number of magnetic poles of the movable element 30 is two, above-described the number of slots of the stator 20 is fifteen), and the number of slots per pole per phase is 2.5. In other words, the rotating electric machine 10 of the present embodiment is a rotating electric machine having a fraction slot configuration in which the number of slots per pole per phase is not an integer.

Here, when the number of slots per pole per phase is expressed by a mixed fraction, an integer part is referred to as an integer part a. When a true fraction part of the mixed fraction is expressed by a simple fraction, a numerator part is referred to as a numerator part b, and a denominator part is referred to as a denominator part c. The integer part a is set to 0 (zero) or a positive integer, and both of the numerator part b and the denominator part c are set to positive integers. In the three-phase rotating electric machine 10, the denominator part c is set to an integer which is equal to or greater than 2 and is not a multiple of 3. In the present embodiment, the number of slots per pole per phase is 2.5, the integer part a is 2, the numerator part b is 1, and the denominator part c is 2. In the present specification, the rotating electric machine 10 is expressed as a b/c-sequence rotating electric machine 10 by using the numerator part b and the denominator part c of the number of slots per pole per phase. In other words, the rotating electric machine 10 of the present embodiment is a ½-sequence rotating electric machine 10.

A movement direction of the movable element 30 with respect to the stator 20 is set to a first direction (arrow X direction). A direction in which the stator 20 faces the movable element 30 is set to a second direction (arrow Y direction). In the second direction (arrow Y direction), a direction directed from the stator 20 side toward the movable element 30 side is set to a second direction movable element side (arrow Y1 direction). In the second direction (arrow Y direction), a direction directed from the movable element 30 side toward the stator 20 side is set to a second direction stator side (arrow Y2 direction). A direction which is orthogonal to both of the first direction (arrow X direction) and the second direction (arrow Y direction) is set to a third direction (arrow Z direction).

As illustrated in FIG. 1, the rotating electric machine 10 of the present embodiment is a radial gap type cylindrical rotating electric machine in which the stator 20 and the movable element 30 are disposed on the same axis. Therefore, the first direction (arrow X direction) corresponds to a circumferential direction of the rotating electric machine 10, and corresponds to a rotation direction of the movable element 30 with respect to the stator 20. The second direction (arrow Y direction) corresponds to a radial direction of the rotating electric machine 10, and corresponds to a depth direction of the slot 21c. The third direction (arrow Z direction) corresponds to an axial line direction of the rotating electric machine 10.

The stator core 21 is formed, for example, by stacking a plurality of electromagnetic steel sheets 21x in the third direction (arrow Z direction). For example, silicon steel sheets may be used as the plurality of electromagnetic steel sheets 21x, and each of the plurality of electromagnetic steel sheets 21x is formed in a thin plate shape. The stator core 21 includes a yoke portion 21a and a plurality of (in the present embodiment, sixty) teeth portions 21b formed integrally with the yoke portion 21a.

The yoke portion 21a is formed along the first direction (arrow X direction). A plurality of (sixty) teeth portions 21b are formed to protrude toward the second direction movable element side (arrow Y1 direction) from the yoke portion 21a. The slot 21c is formed by the teeth portions 21b and 21b which are adjacent to each other in the first direction (arrow X direction), and the stator winding 22 is inserted into each of a plurality of (sixty) slots 21c. Each of a plurality of (sixty) teeth portions 21b has a teeth tip part 21d. The teeth tip part 21d indicates a tip part of the teeth portion 21b in the second direction movable element side (arrow Y1 direction), and is formed to be wide in the first direction (arrow X direction).

In the stator winding 22, for example, a surface of a conductor such as copper is coated with an insulating layer such as enamel. A sectional shape of the stator winding 22 is not particularly limited, and may have any sectional shape. For example, a round wire having a circular sectional shape or a square wire having a polygonal sectional shape may be used as windings having various sectional shapes. Parallel thin wires obtained by combining a plurality of thin winding strands may be used. In a case where the parallel thin wires are used, compared with a case of a single wire, it is possible to reduce an eddy current loss occurring in the stator winding 22, and thus the efficiency of the rotating electric machine 10 is improved. Since the force required for winding shaping can be reduced, shaping property is improved, and thus manufacturing is facilitated.

A winding method for the stator winding 22 is not limited as long as the stator winding 22 can be wound on the stator 20 having a fraction slot configuration. The stator winding 22 may be wound according to, for example, two-layer double windings, a coaxial winding, or a wave winding. In any case, the stator winding 22 has a plurality of coil sides 22a and a plurality of coil ends 22b. The plurality of coil sides 22a indicate portions accommodated in the plurality of slots 21c. The plurality of coil ends 22b indicate portions connecting the end parts of the plurality of coil sides 22a on the same side to each other.

Figure 2A:
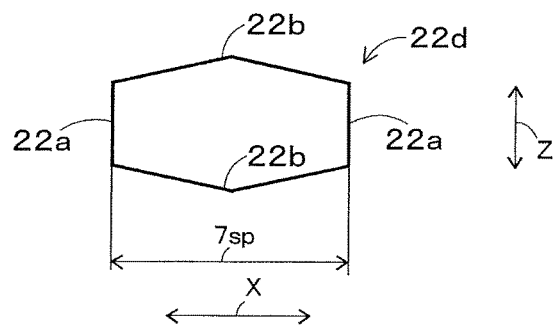
FIG. 2A is a schematic diagram illustrating a configuration example of a unit coil included in a stator winding.

Each of a plurality of (three) phase coils 22c of the stator winding 22 has a plurality of unit coils 22d. As illustrated in FIG. 2A, in a case of the two-layer double windings, each of the plurality of unit coils 22d has a pair of coil sides 22a and 22a and a pair of coil ends 22b and 22b. In a case of the two-layer double windings, winding directions and winding pitches of the plurality of unit coils 22d are the same as each other, and, for example, a winding pitch is set to a 7-slot pitch (7sp). The 7-slot pitch (7sp) is an integer smaller than and closest to the number of slots per pole (in the present embodiment, 7.5). In a case of the coaxial winding, as the plurality of unit coils 22d, a plurality of types of unit coils 22d having different winding pitches are provided.

Figure 2B:
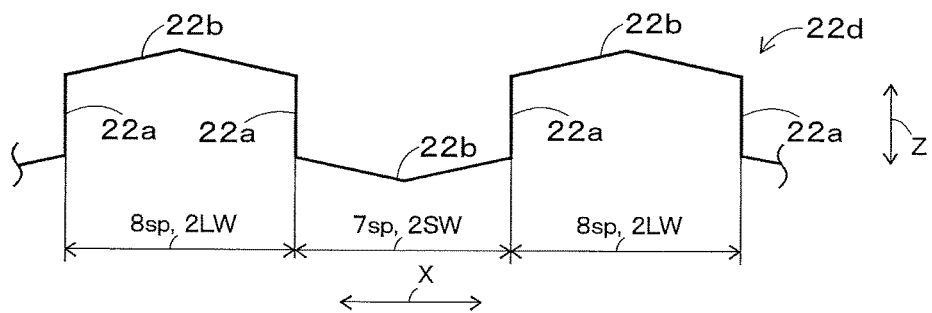
FIG. 2B is a schematic diagram illustrating another configuration example of the unit coil included in the stator winding.

As illustrated in FIG. 2B, in a case of the wave winding, each of the plurality of unit coils 22d has a plurality of coil sides 22a and a plurality of coil ends 22b. The plurality of coil ends 22b alternately connect end parts of the plurality of coil sides 22a on one end side in the third direction (arrow Z direction) to each other and connect end parts of the plurality of coil sides 22a on the other end side in the third direction (arrow Z direction) to each other such that a wave winding configuration is obtained.

In a case of the wave winding, as a winding pitch of each of the plurality of unit coils 22d, for example, a 7-slot pitch (7sp) and an 8-slot pitch (8sp) are alternately repeated. The 7-slot pitch (7sp) is an integer which is smaller than and closest to the number of slots per pole (in the present embodiment, 7.5), and a short-pitch winding part 2SW is formed therein. The 8-slot pitch (8sp) is an integer which is greater than and closest to the number of slots per pole (in the present embodiment, 7.5), and a long-pitch winding part 2LW is formed therein. In other words, in a case of the wave winding, in the plurality of respective unit coils 22d, the short-pitch winding part 2SW and the long-pitch winding part 2LW are alternately repeated in the first direction (arrow X direction). Even in a case where a winding method for the stator winding 22 is one of the two-layer double windings, the coaxial winding, and the wave winding, the stator winding 22 may form a basic coil 50 which will be described later.

As mentioned above, in the present embodiment, the stator winding 22 is wound according to distribution winding. In the distribution winding, a winding pitch of the stator winding 22 is set to be more than a 1-slot pitch, and the stator winding 22 is wound over a plurality of (eight) movable element magnetic poles 32. In the distribution winding, the integer part a of the number of slots per pole per phase is a positive integer (in the present embodiment, 2) of 1 or greater. In the stator winding 22 of the present embodiment, a plurality of (three) phase coils 22c are electrically connected to each other through a Y connection. A plurality of (three) phase coils 22c may be electrically connected to each other through a Δ connection. The number of phases (the number of phase coils 22c) is not limited.

The movable element core 31 is formed, for example, by stacking a plurality of electromagnetic steel sheets 31x in the third direction (arrow Z direction). For example, silicon steel sheets may be used as the plurality of electromagnetic steel sheets 31x, and each of the plurality of electromagnetic steel sheets 31x is formed in a thin plate shape. The rotating electric machine 10 of the present embodiment is a cylindrical rotating electric machine, and the movable element core 31 is formed in a columnar shape. The movable element core 31 is provided with a plurality of magnet accommodation portions (not illustrated) along the first direction (arrow X direction).

Permanent magnets (the movable element magnetic poles 32 and four pairs of movable element magnetic poles 32a and 32b) corresponding to a predetermined number (in the present embodiment, eight poles) of magnetic poles are buried in the plurality of magnet accommodation portions, and the movable element 30 is movable (rotatable) by a rotation magnetic field generated in the permanent magnets and the stator 20. In the present specification, of the pair of movable element magnetic poles 32a and 32b, the movable element magnetic poles 32 having one polarity (for example, an N pole) is indicated by a movable element magnetic pole 32a. Of the pair of movable element magnetic poles 32a and 32b, the movable element magnetic poles 32 having the other polarity (for example, an S pole) is indicated by a movable element magnetic pole 32b.

As the permanent magnet, for example, a well-known ferrite magnet or rare earth magnet may be used. A manufacturing method for the permanent magnet is not limited. As the permanent magnet, for example, a resin bond magnet or a sintered magnet may be used. The resin bond magnet is formed, for example, by mixing ferrite raw material magnet powder with a resin or the like, and casting the mixture in the movable element core 31 through injection molding. The sintered magnet is formed, for example, by pressure-molding a rare earth-based raw material magnet powder in a magnetic field and baking the powder at a high temperature. The movable element 30 may be a surface magnet type. In the surface magnet type movable element 30, a permanent magnet is provided on a surface (outer surface) of the movable element core 31 facing each of the teeth tip part 21d of the stator core 21.

In the present embodiment, the movable element 30 is provided in the inside of the stator 20 (the axial center side of the rotating electric machine 10), and is supported to be movable (rotatable) with respect to the stator 20. Specifically, the movable element core 31 is provided with a shaft (not illustrated), and the shaft penetrates through the axial center of the movable element core 31 along the third direction (arrow Z direction). Both ends of the shaft in the third direction (arrow Z direction) is rotatably supported by a bearing member (not illustrated). Consequently, the movable element 30 is movable (rotatable) with respect to the stator 20.

Noise and Vibration of Rotating Electric Machine 10 Due to Phase Arrangement of Stator Winding 22

FIG. 3 illustrates an example of phase arrangement of the stator winding 22 of a reference form. The rotating electric machine 10 of the reference form is a rotating electric machine having an eight-pole and sixty-slot configuration (a rotating electric machine having a fundamental configuration in which the number of magnetic poles of the movable element 30 is two, above-described the number of slots of the stator 20 is fifteen) in the same manner as the rotating electric machine 10 of the present embodiment. The rotating electric machine 10 of the reference form is a three-phase machine in the same as the rotating electric machine 10 of the reference form, and the stator winding 22 includes a plurality of (three) phase coils 22c. A plurality of (three) phase coils 22c include a U-phase coil 22cu, a V-phase coil 22cv, and a W-phase coil 22cw. It is assumed that phases of the U-phase coil 22cu, the V-phase coil 22cv, and the W-phase coil 22cw are deviated relative to each other by electrical angles of 120°, and the phases are delayed in an order of the U-phase coil 22cu, the V-phase coil 22cv, and the W-phase coil 22cw.

FIG. 3 illustrates phases (the U phase, V phase, and the W phase) of a plurality of (twenty-five per layer, and a total of fifty) coil sides 22a accommodated in a plurality of (twenty-five) slots 21c. The number of coil sides 22a (the number of coil sides CN) is defined for convenience in order to describe a distribution of the coil sides 22a for each phase (the U phase, V phase, and the W phase), and does not indicates the number of actual coil sides 22a (the number of actual windings). In FIG. 3, a conduction direction of the coil side 22a is indicated by the presence or absence of an asterisk. Specifically, a conduction direction of the coil side 22a is set to an opposite direction in a phase added with the asterisk (for example, U*) compared with a phase not added with the asterisk (for example, U). In the rotating electric machine 10 of the reference form, the number of slots per pole per phase is 2.5 in the same manner as in the rotating electric machine 10 of the present embodiment. Thus, as the number of the same phases adjacent to each other in the first direction (arrow X direction), two and three are repeated in each of a first layer L1 and a second layer L2.

A position coordinate PP illustrated in FIG. 3 indicates a position of each of a plurality of (twenty-five) slots 21c in the first direction (arrow X direction). The position coordinate PP is set for convenience of description, and can specify a position of each of a plurality of (twenty-five per layer, and a total of fifty) coil sides 22a in the first direction (arrow X direction). FIG. 3 also illustrates a plurality of (three) movable element magnetic poles 32 (the movable element magnetic poles 32a, 32b, and 32a).

Here, a set of a plurality of (in the reference form, five) coil sides 22a with the same phase and the same current direction, accommodated in a plurality of (in the reference form, three) slots 21c which are continuously adjacent to each other in the movement direction (first direction (arrow X direction)) of the movable element 30 is referred to as a one-phase band 41. For example, a set of a plurality of coil sides 22a (indicated by U* in FIG. 3) with the U phase, accommodated in a plurality of (three) slots 21c of which the position coordinates PP are 0, 1, and 2 is the one-phase band 41. In FIG. 3, a plurality of (five) coil sides 22a forming the one-phase band 41 of the U phase are surrounded by a solid line, but, similarly, the one-phase band 41 is formed for the V phase and the W phase.

The center of the one-phase band 41 calculated by taking into consideration both of arrangement of a plurality of (in the reference form, five) coil sides 22a forming the one-phase band 41 and positions of a plurality of (five) coil sides 22a in the movement direction ((first direction (arrow X direction)) of the movable element 30 is referred to as the coil side center CC of the one-phase band 41. For example, a plurality of (two) coil sides 22a (in FIG. 3, indicated by two U*s) with the U phase are accommodated in the slot 21c of which the position coordinate PP is 0. A plurality of (two) coil sides 22a (in FIG. 3, indicated by two U*s) with the U phase are accommodated in the slot 21c of which the position coordinate PP is 1. A single coil side 22a (in FIG. 3, indicated by one U*) with the U phase is accommodated in the slot 21c of which the position coordinate PP is 2. Therefore, the coil side center CC11 of the one-phase band 41 of the U phase formed in a plurality of (three) slots 21c of which the position coordinates PP are 0, 1, and 2 may be calculated, for example, on the basis of Equation 1 as follows, and the coil side center CC11 is 0.8.

$$CC11=(0\times2+1\times2+2\times1)/(2+2+1)=0.8 \quad \text{(Equation 1)}$$

A single coil side 22a (in FIG. 3, indicated by one U) with the U phase is accommodated in the slot 21c of which the position coordinate PP is 7. A plurality of (two) coil sides 22a (in FIG. 3, indicated by two Us) with the U phase are accommodated in the slot 21c of which the position coordinate PP is 8. A plurality of (two) coil sides 22a (in FIG. 3, indicated by two Us) with the U phase are accommodated in the slot 21c of which the position coordinate PP is 9. Therefore, the coil side center CC12 of the one-phase band 41 of the U phase formed in a plurality of (three) slots 21c of which the position coordinates PP are 7, 8, and 9 may be calculated, for example, on the basis of Equation 2 as follows, and the coil side center CC12 is 8.2.

$$CC12=(7\times1+8\times2+9\times2)/(1+2+2)=8.2 \quad \text{(Equation 2)}$$

A plurality of (two) coil sides 22a (in FIG. 3, indicated by two U*s) with the U phase are accommodated in the slot 21c of which the position coordinate PP is 15. A plurality of (two) coil sides 22a (in FIG. 3, indicated by two U*s) with the U phase are accommodated in the slot 21c of which the position coordinate PP is 16. A single coil side 22a (in FIG. 3, indicated by one U*) with the U phase is accommodated in the slot 21c of which the position coordinate PP is 17. Therefore, the coil side center CC13 of the one-phase band 41 of the U phase formed in a plurality of (three) slots 21c of which the position coordinates PP are 15, 16, and 17 may be calculated, for example, on the basis of Equation 3 as follows, and the coil side center CC13 is 15.8.

$$CC13=(15\times2+16\times2+17\times1)/(2+2+1)=15.8 \quad \text{(Equation 3)}$$

A single coil side 22a (in FIG. 3, indicated by one U) with the U phase is accommodated in the slot 21c of which the position coordinate PP is 22. A plurality of (two) coil sides 22a (in FIG. 3, indicated by two Us) with the U phase are accommodated in the slot 21c of which the position coordinate PP is 23. A plurality of (two) coil sides 22a (in FIG. 3, indicated by two Us) with the U phase are accommodated in the slot 21c of which the position coordinate PP is 24. Therefore, the coil side center CC14 of the one-phase band 41 of the U phase formed in a plurality of (three) slots 21c of which the position coordinates PP are 22, 23, and 24 may be calculated, for example, on the basis of Equation 4 as follows, and the coil side center CC14 is 23.2.

$$CC14=(22\times1+23\times2+24\times2)/(1+2+2)=23.2 \quad \text{(Equation 4)}$$

On the basis of the above-described calculation results, a distance between the coil side center CC11 and the coil side center CC12 of the one-phase band 41 of the U phase is 7.4 (=8.2−0.8). A distance between the coil side center CC12 and the coil side center CC13 of the one-phase band 41 of the U phase is 7.6 (=15.8−8.2). A distance between the coil side center CC13 and the coil side center CC14 of the one-phase band 41 of the U phase is 7.4 (=23.2−15.8). As mentioned above, 7.4 and 7.6 are repeated as a distance between the coil side centers CC of the one-phase bands 41 of the same phase (U phase) adjacent to each other in the first direction (arrow X direction). Thus, a distance between the coil side centers CC of the one-phase bands 41 of the same phase (U phase) adjacent to each other in the first direction (arrow X direction) is not uniform in each of a plurality of (eight) movable element magnetic poles 32, and is uniform in each magnetic pole pair.

On the other hand, the number of a plurality of coil sides 22a (the number of coil sides CN) forming the one-phase band 41 of the U phase is all five, and the magnitude of magnetomotive force generated by the plurality of coil sides 22a forming the one-phase band 41 is uniform in each of a plurality of (eight) movable element magnetic poles 32. As mentioned above, in the present specification, a coil in which the magnitude of magnetomotive force generated by the plurality of coil sides 22a forming the one-phase band 41 is uniform in each of a plurality of (eight) movable element magnetic poles 32 is referred to as the basic coil 50. As illustrated in FIG. 3, the stator winding 22 of the reference form has a single basic coil 50.

In the present specification, a distribution width in the first direction (arrow X direction) of a plurality of (in the reference form, five) coil sides 22a forming the one-phase band 41 is referred to as a coil side distribution width. As is clear from FIG. 3, the coil side distribution width of the reference form is three slots in each pole. In the present specification, a substantial coil side distribution width with a plurality of (eight) movable element magnetic poles 32 as a reference is referred to as an effective coil side distribution width. For example, an equivalent position of a plurality of (two) coil sides 22a (in FIG. 3, indicated by two U*s) with the U phase accommodated in the slot 21c of which the position coordinate PP is 0, with a plurality of (eight) movable element magnetic poles 32 as a reference, is a position of which the position coordinate PP is 7.5. An equivalent position of a plurality of (two) coil sides 22a (in FIG. 3, indicated by two U*s) with the U phase accommodated in the slot 21c of which the position coordinate PP is 1, with a plurality of (eight) movable element magnetic poles 32 as a reference, is a position of which the position coordinate PP is 8.5. An equivalent position of a single coil side 22a (in FIG. 3, indicated by one U*) with the U phase accommodated in the slot 21c of which the position coordinate PP is 2, with a plurality of (eight) movable element magnetic poles 32 as a reference, is a position of which the position coordinate PP is 9.5. In other words, the effective coil side distribution width is 3.5 slots of which the position coordinates PP are 7 to 9.5.

Conversely, for example, an equivalent position of a single coil side 22a (in FIG. 3, indicated by one U) with the U phase accommodated in the slot 21c of which the position coordinate PP is 7, with a plurality of (eight) movable element magnetic poles 32 as a reference, is a position of which the position coordinate PP is −0.5. An equivalent position of a plurality of (two) coil sides 22a (in FIG. 3, indicated by two Us) with the U phase accommodated in the slot 21c of which the position coordinate PP is 8, with a plurality of (eight) movable element magnetic poles 32 as a reference, is a position of which the position coordinate PP is 0.5. An equivalent position of a plurality of (two) coil sides 22a (in FIG. 3, indicated by two Us) with the U phase accommodated in the slot 21c of which the position coordinate PP is 9, with a plurality of (eight) movable element magnetic poles 32 as a reference, is a position of which the position coordinate PP is 1.5. In other words, the effective coil side distribution width is 3.5 slots of which the position coordinates PP are −0.5 to 2. As mentioned above, in the ½-sequence rotating electric machine 10, equivalent positions of one-phase bands 41 of the same phase (U phase) adjacent to each other in the first direction (arrow X direction), with a plurality of (eight) movable element magnetic poles 32 as a reference, are deviated by ½ slots. The numbers around the one-phase band 41 of the U phase illustrated in FIG. 3 indicate the number (the number of coil sides CN) of a plurality of coil sides 22a forming the one-phase band 41 of the U phase at the above-described equivalent position.

The number (the number of coil sides CN) of a plurality of coil sides 22a forming the one-phase band 41 of the U phase is uniform in each of a plurality of (eight) movable element magnetic poles 32, and thus the magnitude of magnetomotive force generated when the stator winding 22 is conducted is uniform in each of a plurality of (eight) movable element magnetic poles 32. However, since 7.4 and 7.6 are repeated as a distance between the coil side centers CC of the one-phase bands 41 of the same phase (U phase) adjacent to each other in the first direction (arrow X direction), a magnetomotive force distribution is not equivalent in each of a plurality of (eight) movable element magnetic poles 32, and is equivalent every other poles in each magnetic pole pair. In other words, the ½-sequence rotating electric machine 10 has two types of magnetomotive force distributions.

The two types of magnetomotive force distributions generate excitation force in a low order (in the reference form, fourth order (spatial fourth order)) in the stator core 21 compared with an order (in the reference form, an eighth order (spatial eighth order)) depending on the number of magnetic poles (in the reference form, eight poles) of the movable element 30. Thus, in the rotating electric machine 10 in which a drive rotation frequency is wide, a rotation frequency matching an eigenfrequency of the stator core 21 easily occurs within the drive rotation frequency. As a result, resonance occurs in the stator 20, and thus there is a probability that noise and vibration of the rotating electric machine 10 may increase. Therefore, in the present embodiment, noise and vibration of the rotating electric machine 10 due to phase arrangement of the stator winding 22 are reduced by improving a situation in which a magnetomotive force distribution is not uniform (a situation in which the magnetomotive force distribution does not have rotational symmetry) even if the magnitude of magnetomotive force is uniform. The content described in the method illustrated in FIG. 3 may be similarly applied to the drawings which will be described later illustrating phase arrangement of the stator winding 22. In the present specification, an example in which phase arrangement of the stator winding 22 is arrangement of the U phase is described, but the same applies to the V phase and the W phase.

Figure 4A:
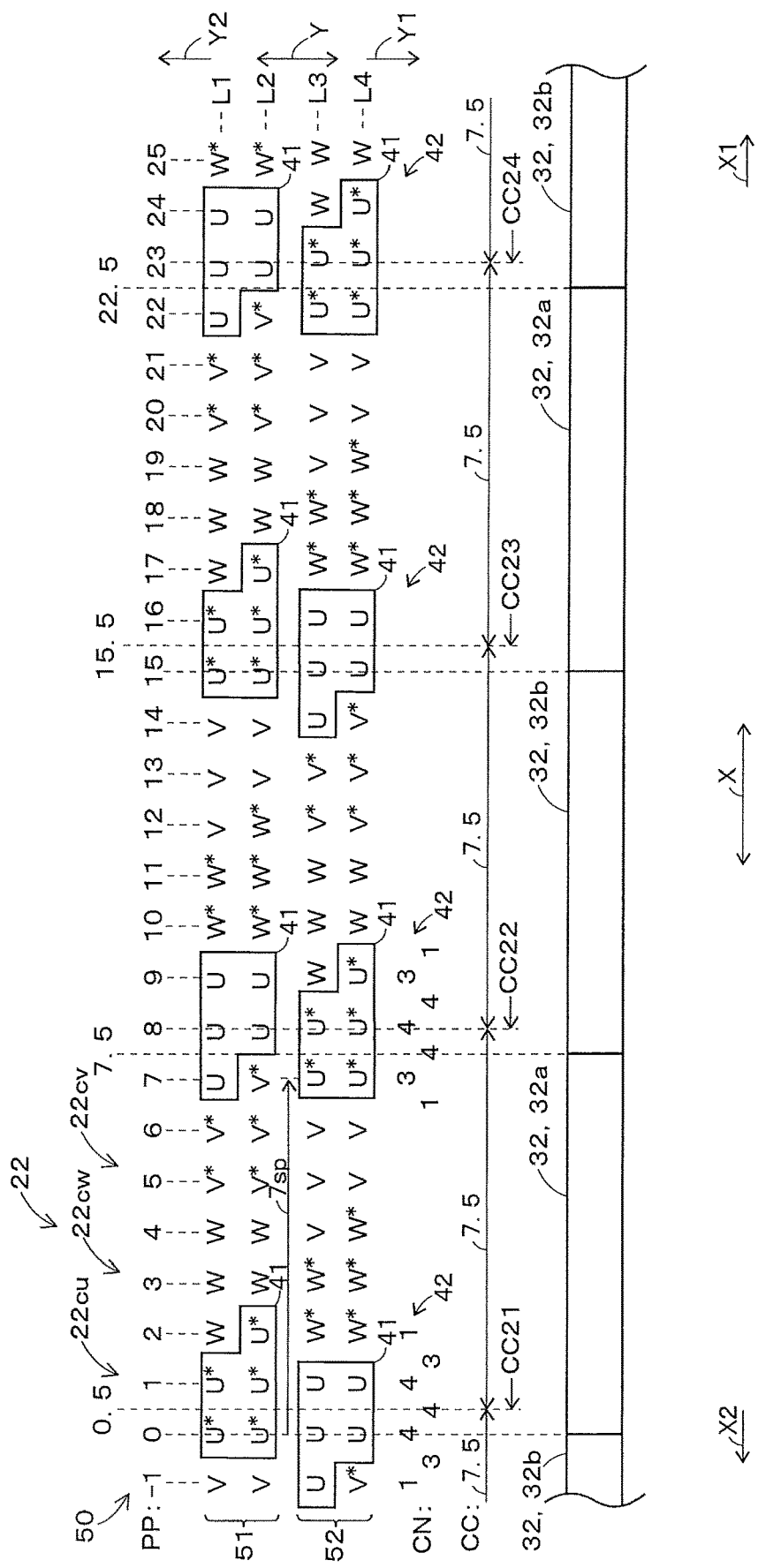
FIG. 4A is a schematic diagram illustrating an example of phase arrangement of the stator winding according to the first embodiment.

Configuration of Stator Winding 22 and Magnetomotive Force Distribution of Present Embodiment As illustrated in FIG. 4A, the stator winding 22 has a plurality of (in the present embodiment, two) basic coils 50. Each of a plurality of (two) basic coils 50 has the same configuration as that of the basic coil 50 described in the reference form. A plurality of (two) basic coils 50 include a first basic coil 51 and at least one second basic coil 52 (in the present embodiment, a single second basic coil 52). The first basic coil 51 is a coil used as a reference regarding arrangement of the one-phase band 41 per pole in the movement direction (first direction (arrow X direction)) of the movable element 30. The second basic coil 52 is a coil in which arrangement of the one-phase band 41 per pole in the movement direction (first direction (arrow X direction)) of the movable element 30 differs with respect to the first basic coil 51.

At least one second basic coil 52 (in the present embodiment, a single second basic coil 52) is preferably disposed at a position moved by a predetermined slot pitch in the movement direction (first direction (arrow X direction)) of the movable element 30 with respect to the first basic coil 51. The predetermined slot pitch is preferably expressed by n times (where n is a natural number of 1 or greater) larger than a movement unit amount. The movement unit amount is preferably an integer closest to the number of slots per pole (in the present embodiment, 7.5) or a l-slot pitch. A first sequence of numbers which is a sequence of numbers in which respective predetermined slot pitches of at least one second basic coil 52 (in the present embodiment, a single second basic coil 52) are enumerated preferably includes all natural number multiples from one time to n times larger than the movement unit amount.

In the present embodiment, the single second basic coil 52 is disposed at a position moved in one direction (arrow X1 direction) of the first direction (arrow X direction) with respect to the first basic coil 51. The movement unit amount is set to a 7-slot pitch which is smaller than and closest to the number of slots per pole (in the present embodiment, 7.5). The predetermined slot pitch is one time (7-slot pitch (7sp)) the 7-slot pitch which is the movement unit amount. As mentioned above, n for defining a predetermined slot pitch is 1. The first sequence of numbers includes one time (7-slot pitch (7sp)) the 7-slot pitch which is the movement unit amount.

For example, the one-phase band 41 of the U phase formed in a plurality of (three) slots 21*c* of which the position coordinates PP are 0, 1, and 2 in the first basic coil 51 is formed in a plurality of (three) slots 21*c* of which the position coordinates PP are 7, 8, and 9 in the second basic coil 52. The one-phase band 41 of the U phase formed in a plurality of (three) slots 21*c* of which the position coordinates PP are 7, 8, and 9 in the first basic coil 51 is formed in a plurality of (three) slots 21*c* of which the position coordinates PP are 14, 15, and 16 in the second basic coil 52. The above-described content may be similarly applied to other one-phase bands 41 of the U phase.

Here, a newly formed one-phase band 41 by mixing a plurality of (in the present embodiment, five) coil sides 22*a* forming a certain one-phase band 41 of the first basic coil 51 with a plurality of (in the present embodiment, five) coil sides 22*a* forming a certain one-phase band 41 of each of at least one second basic coil 52 (in the present embodiment, a single second basic coil 52) is referred to as a mixed one-phase band 42. For example, a new mixed one-phase band 42 of the U phase is formed by mixing the one-phase band 41 of the U phase formed in a plurality of (three) slots 21*c* of which the position coordinates PP are 0, 1, and 2 in the first basic coil 51 with the one-phase band 41 of the U phase formed in a plurality of (three) slots 21*c* of which the position coordinates PP are −1, 0, and 1 in the second basic coil 52. In this case, the mixed one-phase band 42 of the U phase is formed in a plurality of (four) slots 21*c* of which the position coordinates PP are −1, 0, 1, and 2. The number (the number of coil sides CN) of a plurality of coil sides 22*a* forming the mixed one-phase band 42 of the U phase is ten.

In the stator winding 22, a plurality of (in the present embodiment, two) basic coils 50 are mixed with each other such that the magnitude of magnetomotive force generated by the plurality of coil sides 22*a* forming the mixed one-phase band 42 is uniform in each of a plurality of (in the present embodiment, eight) movable element magnetic poles 32. Specifically, the single second basic coil 52 is moved by a predetermined slot pitch (7-slot pitch (7sp)) in the movement direction (first direction (arrow X direction)) of the movable element 30 with respect to the first basic coil 51, and a plurality of (two) basic coils 50 are stacked. Consequently, the stator winding 22 of the present embodiment is formed in four layers such as a first layer L1 to a fourth layer L4.

The center of the mixed one-phase band 42 calculated by taking into consideration both arrangement of a plurality of (in the present embodiment, ten) coil sides 22*a* forming the mixed one-phase band 42 and positions of a plurality of (ten) coil sides 22*a* in the movement direction (first direction (arrow X direction)) of the movable element 30 is referred to as the coil side center CC of the mixed one-phase band 42. For example, a single coil side 22*a* with the U phase is accommodated in the slot 21*c* of which the position coordinate PP is −1. A plurality of (four) coil sides 22*a* are accommodated in the slot 21*c* of which the position coordinate PP is 0. A plurality of (four) coil sides 22*a* are accommodated in the slot 21*c* of which the position coordinate PP is 1. A single coil side 22*a* with the U phase is accommodated in the slot 21*c* of which the position coordinate PP is 2. Therefore, the coil side center CC21 of the mixed one-phase band 42 of the U phase formed in a plurality of (four) slots 21*c* of which the position coordinates PP are −1, 0, 1, and 2 may be calculated, for example, on the basis of Equation 5 as follows, and the coil side center CC21 is 0.5.

$$CC21=(-1\times1+0\times4+1\times4+2\times1)/(1+4+4+1)=0.5 \quad \text{(Equation 5)}$$

Similarly, the one-phase band 41 of the U phase formed in a plurality of (three) slots 21*c* of which the position coordinates PP are 7, 8, and 9 in the first basic coil 51 is mixed with the one-phase band 41 of the U phase formed in a plurality of (three) slots 21*c* of which the position coordinates PP are 7, 8, and 9 in the second basic coil 52, and thus the mixed one-phase band 42 of the U phase is formed. In this case, the mixed one-phase band 42 of the U phase is formed in a plurality of (three) slots 21*c* of which the position coordinates PP are 7, 8, and 9. The number (the number of coil sides CN) of a plurality of coil sides 22*a* forming the mixed one-phase band 42 of the U phase is ten.

A plurality of (three) coil sides 22*a* with the U phase are accommodated in the slot 21*c* of which the position coordinate PP is 7. A plurality of (four) coil sides 22*a* with the U phase are accommodated in the slot 21*c* of which the position coordinate PP is 8. A plurality of (three) coil sides 22*a* with the U phase are accommodated in the slot 21*c* of which the position coordinate PP is 9. Therefore, the coil side center CC22 of the mixed one-phase band 42 of the U phase formed in a plurality of (three) slots 21*c* of which the position coordinates PP are 7, 8, and 9 may be calculated, for example, on the basis of Equation 6 as follows, and the coil side center CC22 is 8.

$$CC22=(7\times3+8\times4+9\times3)/(3+4+3)=8 \quad \text{(Equation 6)}$$

The same may apply to the mixed one-phase band 42 of the U phase formed in a plurality of (four) slots 21*c* of which the position coordinates PP are 14, 15, 16, and 17. Also in this case, the number (the number of coil sides CN) of a plurality of coil sides 22*a* forming the mixed one-phase band 42 of the U phase is ten. The coil side center CC23 of the mixed one-phase band 42 of the U phase in this case may be calculated, for example, on the basis of Equation 7 as follows, and the coil side center CC23 is 15.5.

$$CC23=(14\times1+15\times4+16\times4+17\times1)/(1+4+4+1)=15.5 \quad \text{(Equation 7)}$$

The same may apply to the mixed one-phase band 42 of the U phase formed in a plurality of (three) slots 21*c* of which the position coordinates PP are 22, 23, and 24. Also in this case, the number (the number of coil sides CN) of a plurality of coil sides 22*a* forming the mixed one-phase band 42 of the U phase is ten. The coil side center CC24 of the mixed one-phase band 42 of the U phase in this case may be calculated, for example, on the basis of Equation 8 as follows, and the coil side center CC24 is 23.

$$CC24=(22\times3+23\times4+24\times3)/(3+4+3)=23 \quad \text{(Equation 8)}$$

On the basis of the above-described calculation results, a distance between the coil side center C21 and the coil side center CC22 of the mixed one-phase band 42 of the U phase is 7.5 (=8−0.5). A distance between the coil side center C22 and the coil side center CC23 of the mixed one-phase band 42 of the U phase is 7.5 (=15.5−8). A distance between the coil side center C23 and the coil side center CC24 of the mixed one-phase band 42 of the U phase is 7.5 (=23−15.5). As mentioned above, a distance between the coil side centers CC of the mixed one-phase bands 42 of the same phase (U phase) adjacent to each other in the movement direction (first direction (arrow X direction)) of the movable element 30 is all 7.5, and is uniform. Thus, a distance between the coil side centers CC of the mixed one-phase band 42 of the same phase (U phase) adjacent to each other in the first direction (arrow X direction) is uniform in each of a plurality of (eight) movable element magnetic poles 32.

Here, a ratio between distances between the coil side centers CC of the mixed one-phase band 42 of the same phase (U phase) adjacent to each other in the first direction (arrow X direction) is referred to as an adjacent coil side ratio. In the reference form (a form in which the stator winding 22 includes a single basic coil 50), the adjacent coil side ratio is 0.973 (=7.4/7.6). On the other hand, in the present embodiment (a form in which the stator winding 22 includes a plurality of (two) basic coils 50), the adjacent coil side ratio is 1 (=7.5/7.5). As mentioned above, it can be said that, as the adjacent coil side ratio becomes closer to 1, distances between the coil side centers CC of the mixed one-phase band 42 of the same phase (U phase) adjacent to each other in the first direction (arrow X direction) become more uniform.

The number (the number of coil sides CN) of a plurality of coil sides 22a forming the mixed one-phase band 42 of the U phase is all ten, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. A distance between the coil side centers CC of the mixed one-phase band 42 of the same phase (U phase) adjacent to each other in the first direction (arrow X direction) is uniform in each of a plurality of (eight) movable element magnetic poles 32. Therefore, a magnetomotive force distribution is equivalent in each of a plurality of (eight) movable element magnetic poles 32, and thus the rotating electric machine 10 of the present embodiment has one type of magnetomotive force distribution.

As mentioned above, in the present embodiment, rotational symmetry of the magnetomotive force distribution is improved. As a result, in the rotating electric machine 10, excitation force in a low order (in the present embodiment, fourth order (spatial fourth order)) is reduced compared with an order (in the present embodiment, an eighth order (spatial eighth order)) depending on the number of magnetic poles (in the present embodiment, eight poles) of the movable element 30. Therefore, in the rotating electric machine 10 of the present embodiment, a rotation frequency matching the eigenfrequency of the stator core 21 can be increased, and can thus be set to be out of a drive rotation frequency, for example. In other words, in the rotating electric machine 10 of the present embodiment, it is possible to reduce noise and vibration of the rotating electric machine 10 by avoiding a resonance chance of the stator 20.

According to the rotating electric machine 10 of the present embodiment, it is also possible to reduce a torque ripple due to the reduction in noise and vibration of the rotating electric machine 10. The torque ripple is pulsation occurring in output torque of the rotating electric machine 10, and is generated due to a magnetic flux change between the stator 20 and the movable element 30 caused by movement of the movable element 30. Examples of the torque ripple may include a cogging torque, a slot ripple, and a pole ripple.

As a method of reducing noise and vibration of the rotating electric machine 10, there may be a method in which a cutout is provided at each teeth tip part 21d of the stator core 21 or the surface (outer surface) of the movable element core 31 facing each teeth tip part 21d. However, in this method, a gap is substantially increased, and a torque reduction increases. The rotating electric machine 10 of the present embodiment can reduce noise and vibration of the rotating electric machine 10 while preventing a torque reduction.

Figure 4B:
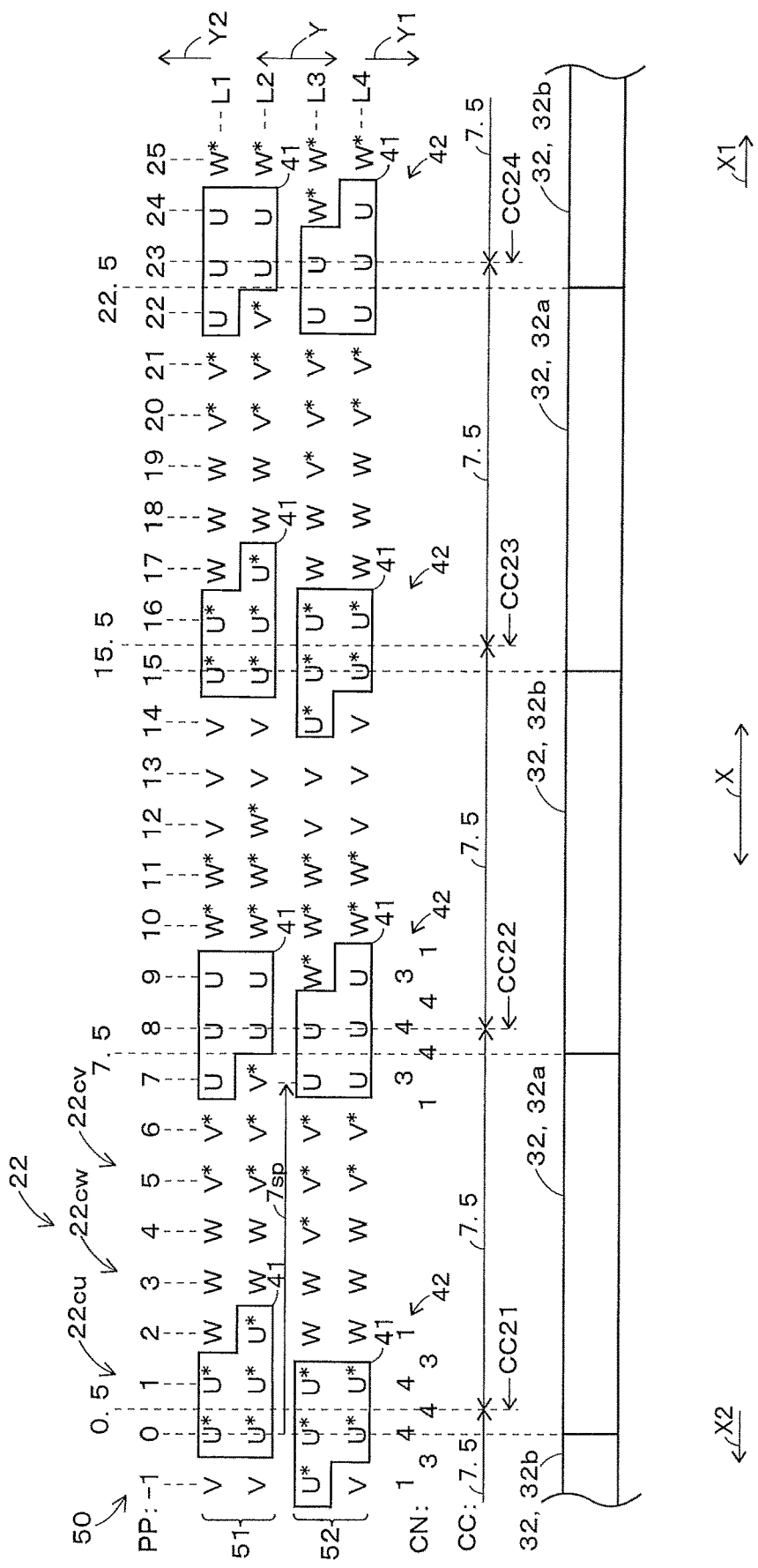
FIG. 4B is a schematic diagram illustrating an example of phase arrangement of the stator winding in which conduction directions of a plurality of coil sides are corrected in a second basic coil illustrated in FIG. 4A.

In the phase arrangement illustrated in FIG. 4A, coil sides 22a having different conduction directions are mixed in a plurality of coil sides 22a with the same phase accommodated in the same slot 21c. Thus, as illustrated in FIG. 4B, it is necessary to correct conduction directions of a plurality of coil sides 22a. For example, in the second basic coil 52 illustrated in FIG. 4B, conduction directions of a plurality of (five) coil sides 22a with the U phase accommodated in a plurality of (three) slots 21c of which the position coordinates PP are 7, 8, and 9 are inversed to the conduction directions illustrated in FIG. 4A. The above-described content may be similarly applied to other one-phase bands 41 of the second basic coil 52.

Figure 4C:
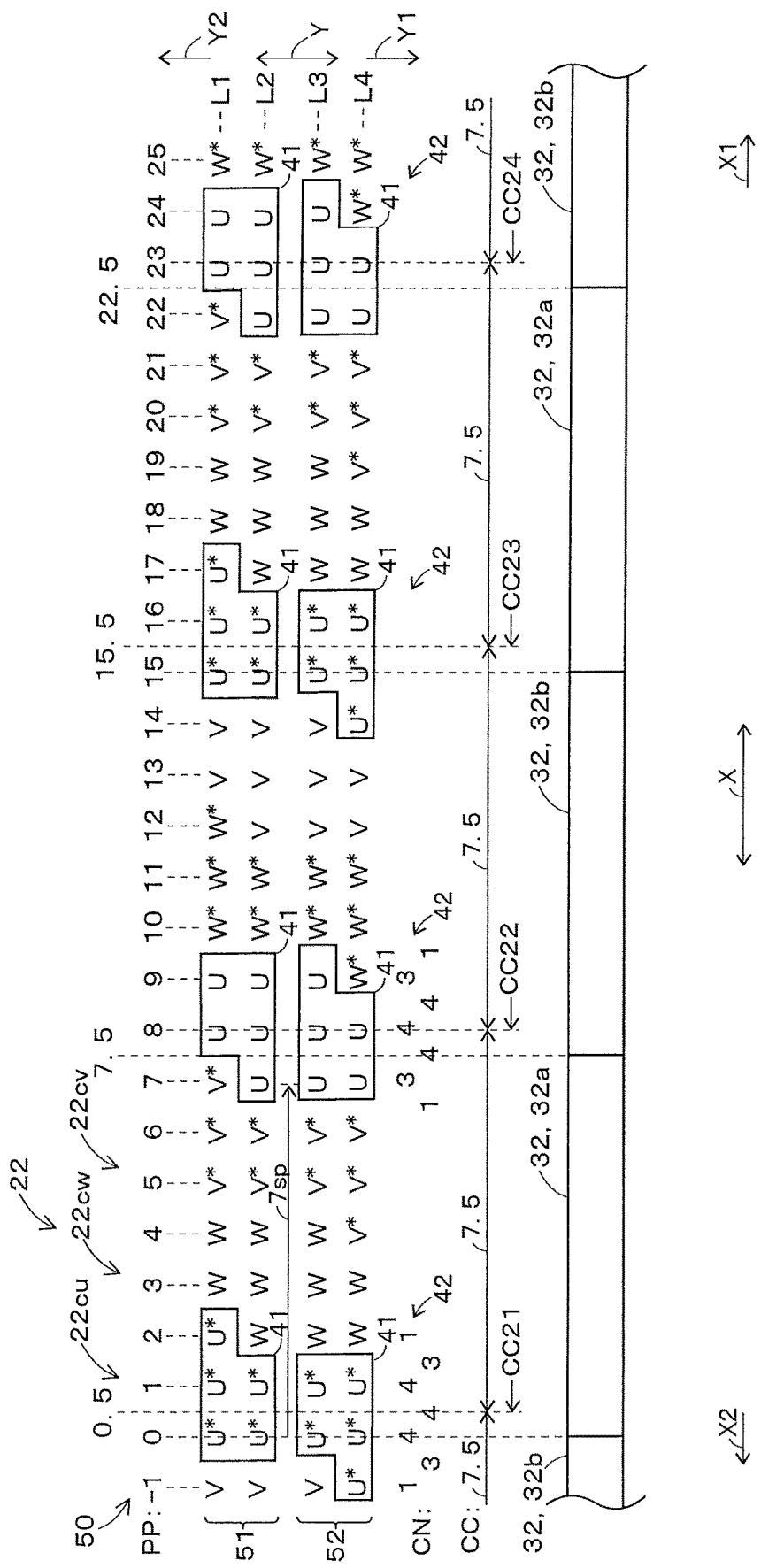
FIG. 4C is a schematic diagram illustrating an example of phase arrangement of the stator winding in which arrangement in a slot of the plurality of coil sides accommodated in the same slot is changed according to a modification form.

As illustrated in FIG. 4C, arrangement of a plurality of coil sides 22a accommodated in the same slot 21c may be changed in the slot 21c. For example, in the second basic coil 52, the coil side 22a with the U phase accommodated in the slot 21c of which the position coordinate PP is −1 is moved from the third layer L3 to the fourth layer L4. In the first basic coil 51, the coil side 22a with the U phase accommodated in the slot 21c of which the position coordinate PP is 2 is moved from the second layer L2 to the first layer L1. The above-described content may be similarly applied to other mixed one-phase bands 42. Consequently, an interface between phases (between any phases of the U phase, the V phase, and the W phase) is simplified (unevenness of the interface between the phases is minimized), and thus insulating between the phases is facilitated. For example, a shape of insulating paper insulating phases from each other is simplified, and thus the insulating paper is easily disposed. As mentioned above, mixing of a plurality of (in the present embodiment, two) basic coils 50 includes a form in which arrangement in a slot 21c of at least one coil side 22a accommodated in the same slot 21c is changed.

A coil side distribution width of the mixed one-phase band 42 of the U phase formed in a plurality of (four) slots 21c of which the position coordinates PP are −1, 0, 1, and 2 is four slots. A coil side distribution width of the mixed one-phase band 42 of the U phase formed in a plurality of (three) slots 21c of which the position coordinates PP are 7, 8, and 9 is three slots. An effective coil side distribution width of the mixed one-phase band 42 of the U phase formed in a plurality of (four) slots 21c of which the position coordinates PP are −1, 0, 1, and 2 is four slots. An effective coil side distribution width of the mixed one-phase band 42 of the U phase formed in a plurality of (three) slots 21c of which the position coordinates PP are 7, 8, and 9 is four slots.

As mentioned above, the effective coil side distribution width (four slots) of the present embodiment is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form. The magnetomotive force distribution is formed on the basis of a coil side distribution, and thus the above-described content may also be described in terms of the coil side distribution.

Figure 5A:
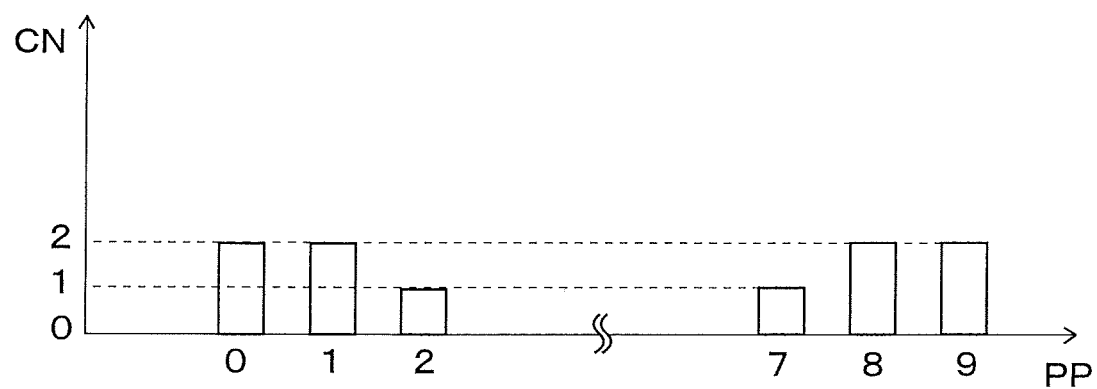
FIG. 5A is a schematic diagram illustrating an example of a coil side distribution according to a reference form.

FIG. 5A illustrates an example of a coil side distribution of the reference form (a form in which the stator winding 22 includes a single basic coil 50). The coil side distribution indicates the number (the number of coil sides CN) of coil sides 22a forming the one-phase band 41 of the same phase (U phase) for each position coordinate PP, and, in FIG. 5A, the coil side distribution is expressed by a bar graph. A transverse axis expresses the position coordinate PP, and a longitudinal axis expresses the number (the number of coil sides CN) of coil sides 22a forming the one-phase band 41 of the U phase. A slot size (a depth of the slot 21c) is constant, and thus an upper limit of the longitudinal axis including the drawings (for example, FIG. 5B) which will be described later, illustrating a coil side distribution, is also required to be constant. However, in the drawing illustrating a coil side distribution, for convenience of description, the longitudinal axis expresses the number (the number of coil sides CN) of coil sides 22a, and thus an upper limit of the longitudinal axis is not necessarily constant. In the drawing illustrating a coil side distribution, a ratio among relative heights of bar graphs and a distribution of the bar graphs are meaningful. For example, in FIG. 5A, a ratio among relative heights of bar graphs of which the position coordinates PP are 0, 1, and 2 is 2:2:1, and, in FIG. 5B, a ratio among relative heights of bar graphs of which the position coordinates PP are −1, 0, 1, and 2 is 1:4:4:1.

For convenience of description, a width of the bar graph in the longitudinal axis direction is set to one slot, and a blank corresponding to a width of the teeth portion 21b in the first direction (arrow X direction) is provided between the adjacent bar graphs. FIG. 5A does not define a width of the teeth portion 21b in the first direction (arrow X direction). FIG. 5A illustrates a coil side distribution corresponding to one magnetic pole pair of a plurality of (eight) movable element magnetic poles 32: The coil side distribution illustrated in FIG. 5A is repeated for each magnetic pole pair of a plurality of (eight) movable element magnetic poles 32. The content described in the method illustrated in FIG. 5A may be similarly applied to the drawings which will be described later, illustrating coil side distributions. However, in the drawings which will be described later, the longitudinal axis expresses the number (the number of coil sides CN) of coil sides 22a forming the mixed one-phase band 42.

As illustrated in FIG. 3, for example, a plurality of (two) coil sides 22a with the U phase are accommodated in the slot 21c of which the position coordinate PP is 0. Thus, as illustrated in FIG. 5A, the number (the number of coil sides CN) of coil sides 22a forming the one-phase band 41 of the U phase at the position coordinate PP of 0 is two. Similarly, a plurality of (two) coil sides 22a with the U phase are accommodated in the slot 21c of which the position coordinate PP is 1, and the number (the number of coil sides CN) of coil sides 22a forming the one-phase band 41 of the U phase at the position coordinate PP of 1 is two. A single coil side 22a with the U phase is accommodated in the slot 21c of which the position coordinate PP is 2, and the number (the number of coil sides CN) of coil sides 22a forming the one-phase band 41 of the U phase at the position coordinate PP of 2 is one.

A single coil side 22a with the U phase is accommodated in the slot 21c of which the position coordinate PP is 7, and the number (the number of coil sides CN) of coil sides 22a forming the one-phase band 41 of the U phase at the position coordinate PP of 7 is one. A plurality of (two) coil sides 22a with the U phase are accommodated in the slot 21c of which the position coordinate PP is 8, and the number (the number of coil sides CN) of coil sides 22a forming the one-phase band 41 of the U phase at the position coordinate PP of 8 is two. A plurality of (two) coil sides 22a with the U phase are accommodated in the slot 21c of which the position coordinate PP is 9, and the number (the number of coil sides CN) of coil sides 22a forming the one-phase band 41 of the U phase at the position coordinate PP of 9 is two.

Figure 5B:
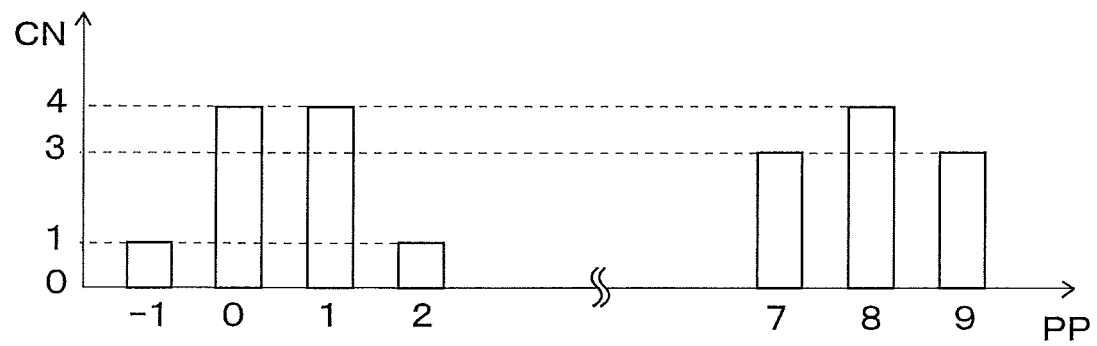
FIG. 5B is a schematic diagram illustrating an example of a coil side distribution according to the first embodiment.

FIG. 5B illustrates an example of a coil side distribution of the present embodiment (a form in which the stator winding 22 includes a plurality of (two) basic coils 50). As illustrated in FIG. 4A, for example, a single coil side 22a with the U phase is accommodated in the slot 21c of which the position coordinate PP is −1. Thus, as illustrated in FIG. 5B, the number (the number of coil sides CN) of coil sides 22a with the U phase at the position coordinate PP of −1 is one. Similarly, a plurality of (four) coil sides 22a with the U phase are accommodated in the slot 21c of which the position coordinate PP is 0, and the number (the number of coil sides CN) of coil sides 22a with the U phase at the position coordinate PP of 0 is four. A plurality of (four) coil sides 22a with the U phase are accommodated in the slot 21c of which the position coordinate PP is 1, and the number (the number of coil sides CN) of coil sides 22a with the U phase at the position coordinate PP of 1 is four. A single coil side 22a with the U phase is accommodated in the slot 21c of which the position coordinate PP is 2, and the number (the number of coil sides CN) of coil sides 22a with the U phase at the position coordinate PP of 2 is one.

A plurality of (three) coil sides 22a with the U phase are accommodated in the slot 21c of which the position coordinate PP is 7, and the number (the number of coil sides CN) of coil sides 22a with the U phase at the position coordinate PP of 7 is three. A plurality of (four) coil sides 22a with the U phase are accommodated in the slot 21c of which the position coordinate PP is 8, and the number (the number of coil sides CN) of coil sides 22a with the U phase at the position coordinate PP of 8 is four. A plurality of (three) coil sides 22a with the U phase are accommodated in the slot 21c of which the position coordinate PP is 9, and the number (the number of coil sides CN) of coil sides 22a with the U phase at the position coordinate PP of 9 is three.

The coil side distribution of the present embodiment illustrated in FIG. 5B is wider in the first direction (arrow X direction) and is gentler than the coil side distribution of the reference form illustrated in FIG. 5A. In the present embodiment, a plurality of (ten) coil sides 22a forming the mixed one-phase band 42 are arranged in a plurality of slots 21c more widely adjacent to each other than a plurality of (five) coil sides 22a forming the one-phase band 41 of the reference form. As a result, a magnetomotive force distribution generated when the stator winding 22 is conducted is distributed in the movement direction (first direction (arrow X direction)) of the movable element 30. Therefore, an attraction force distribution between the stator 20 and the movable element 30 is also gentle, and thus a peak value (the amplitude of a fundamental wave component in the attraction force distribution) and a change amount of the attraction force are reduced compared with the reference form. Pitches in the movement direction (first direction (arrow X direction)) of the movable element 30 at positions where the peak value of the attraction force is the maximum are the same as each other. In other words, it is possible to reduce noise and vibration of the rotating electric machine 10 compared with the rotating electric machine 10 of the reference form. A magnetic flux waveform generated in the gap between the stator 20 and the movable element 30 comes closer to a sine wave than in the reference form, and thus the rotating electric machine 10 of the present embodiment can also reduce harmonic components (for example, fifth-order and seventh-order components) of magnetomotive force compared with the reference form.

The magnitude of magnetomotive force generated by a plurality of coil sides 22a forming the one-phase band 41 is a value obtained by multiplying a current value of a current flowing through a plurality of windings forming the plurality of coil sides 22a by the number of turns (the number of conductors) of the plurality of windings forming the plurality of coil sides 22a. The plurality of windings forming the plurality of coil sides 22a may be electrically connected to each other according to at least one of serial connection and parallel connection. However, if there is a portion connected in parallel to a plurality of windings, a current value is smaller in the portion than in a case of serial connection, and thus the magnitude of magnetomotive force is also reduced. Therefore, in a case where the number of turns (the number of conductors) of a plurality of windings is taken into consideration, it is necessary to use a serial converted conductor number obtained by converting the number of conductors of a portion connected in parallel into the number of conductors of a portion connected in series. For example, the number of conductors of a portion to which a plurality of (two) windings are connected in series is assumed to be one. In this case, in a portion to which a plurality of (two) windings are connected in parallel (two parallels), a serial converted conductor number is two.

Here, a serial converted conductor number of a plurality of (in the present embodiment, five) coil sides 22a forming a certain one-phase band 41 of the first basic coil 51 is referred to as a first coil side conductor number. A serial converted conductor number of a plurality of (in the present embodiment, five) coil sides 22a forming a certain one-phase band 41 of each of at least one second basic coil 52 (in the present embodiment, a single second basic coil 52) disposed at a position moved by a predetermined slot pitch (in the present embodiment, a 7-slot pitch) in the movement direction (first direction (arrow X direction)) of the movable element 30 with respect to the certain one-phase band 41 of the first basic coil 51 is referred to as a second coil side conductor number.

For example, in the first basic coil 51, the one-phase band 41 of the U phase formed in a plurality of (three) slots 21c of which the position coordinates PP are 0, 1, and 2 occupies 2.5 slots. If a serial converted conductor number of the coil sides 22a occupying a single slot 21c is referred to as a reference conductor number t0, the first coil side conductor number may be expressed by 2.5×t0. On the other hand, the one-phase band 41 of the U phase of the second basic coil 52 disposed at a position moved by a 7-slot pitch in the first direction (arrow X direction) with respect to the one-phase band 41 of the first basic coil 51 is formed in a plurality of (three) slots 21c of which the position coordinates PP are 7, 8, and 9, and occupies 2.5 slots. Therefore, the second coil side conductor number may be expressed by 2.5×t0. In other words, in the present embodiment, the first coil side conductor number is the same as the second coil side conductor number. The above-described content may be similarly applied to other one-phase bands 41.

Configuration Example of Stator Winding 22 Based on Two-Layer Double Windings

Figure 6:
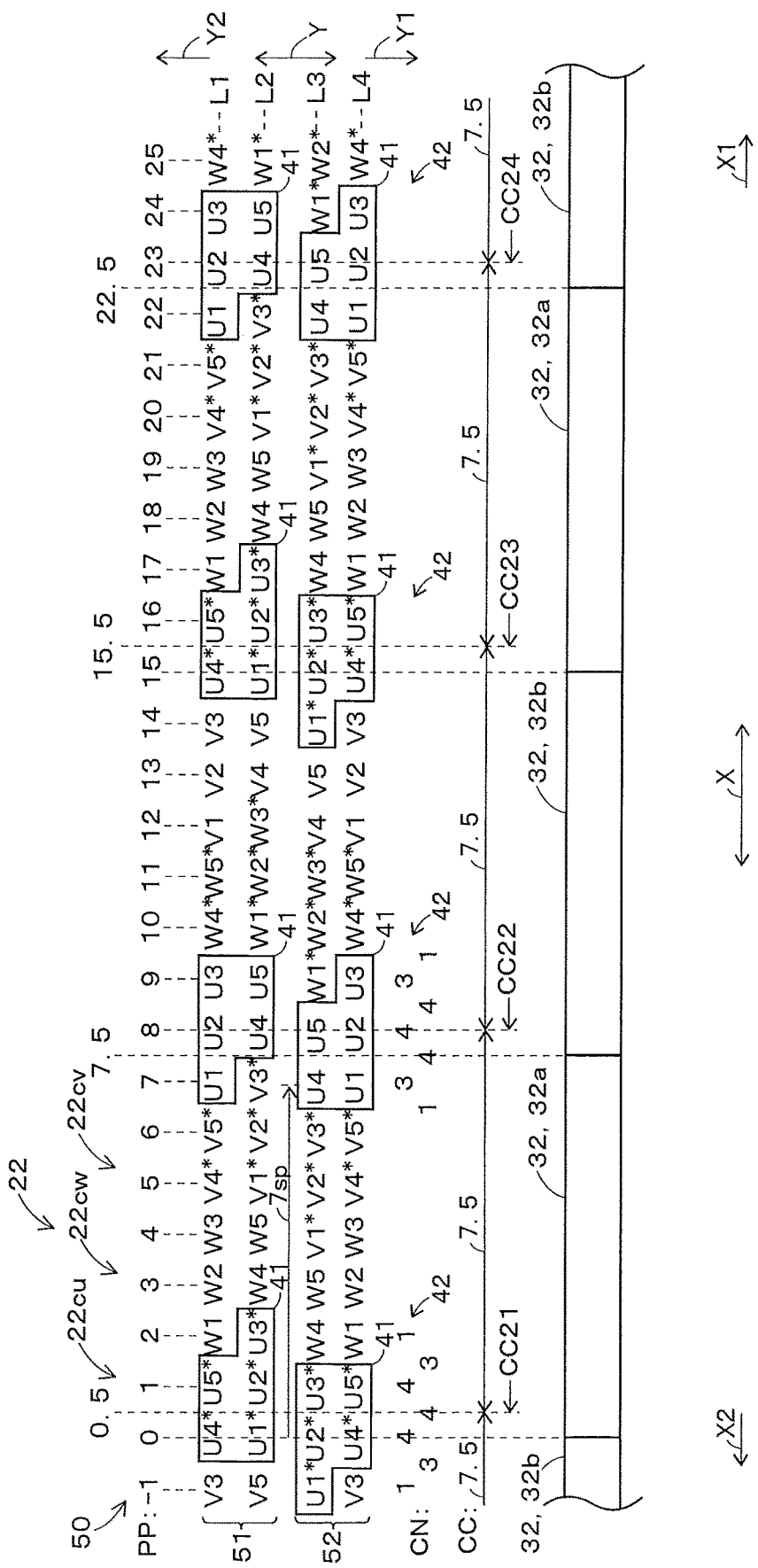
FIG. 6 is a schematic diagram illustrating an example of phase arrangement of the stator winding based on two-layer double windings.

As illustrated in FIG. 6, the stator winding 22 includes the U-phase coil 22cu, the V-phase coil 22cv, and the W-phase coil 22cw. In the stator winding 22 based on two-layer double windings illustrated in FIGS. 6 and 7A, the U-phase coil 22cu has a unit coil 22d with a U1 phase, a unit coil 22d with a U2 phase, a unit coil 22d with a U3 phase, a unit coil 22d with a U4 phase, and a unit coil 22d with a U5 phase.

The unit coil 22d with the U1 phase, the unit coil 22d with the U2 phase, and the unit coil 22d with the U3 phase are moved by a 1-slot pitch in the first direction (arrow X direction) and are arranged. The unit coil 22d with the U4 phase and the unit coil 22d with the U5 phase are moved by a 1-slot pitch in the first direction (arrow X direction) and are arranged. The unit coil 22d with the U4 phase is moved by a 6-slot pitch in the first direction (arrow X direction) and is disposed with respect to the unit coil 22d with the U3 phase. As mentioned above, the unit coil 22d with the U1 phase, the unit coil 22d with the U2 phase, the unit coil 22d with the U3 phase, the unit coil 22d with the U4 phase, and the unit coil 22d with the U5 phase have the same phase (U phase), but are disposed differently from each other on the stator 20.

The U-phase coil 22cu has pole pair coils 60 corresponding to magnetic pole pairs (in the present embodiment, four magnetic pole pairs) of a plurality of (eight) movable element magnetic poles 32 in each of a plurality of (two) basic coils 50. A plurality of (eight) pole pair coils 60 forming the U-phase coil 22cu may be electrically connected to each other according to at least one of serial connection and parallel connection. For example, in the U-phase coil 22cu of the present embodiment, a single pole pair coil 60 of the first basic coil 51 is electrically connected in series to a single pole pair coil 60 of the second basic coil 52, and thus a phase unit coil 22u is formed. A plurality of (four) phase unit coils 22u is electrically connected in parallel to each other, so as to form the U-phase coil 22cu. The above-described content may be similarly applied to the V-phase coil 22cv and the W-phase coil 22cw.

Figure 7A:
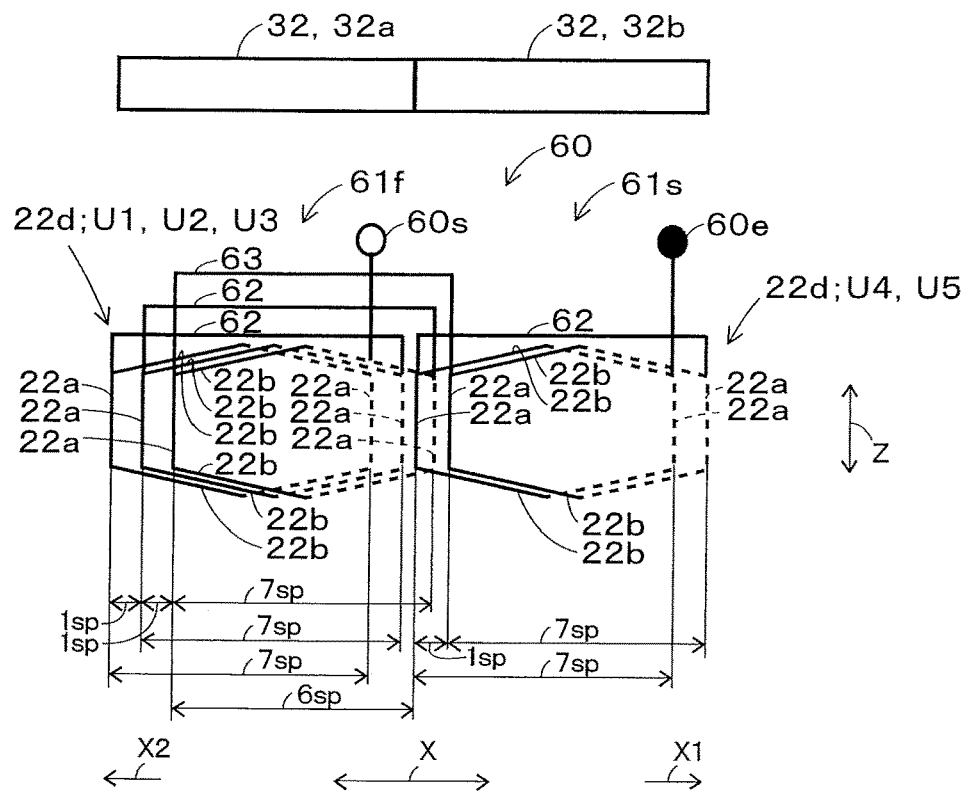
FIG. 7A is a schematic diagram illustrating a configuration example of a pole pair coil.

As illustrated in FIG. 7A, each of a plurality of (eight) pole pair coils 60 includes a first pole coil 61f and a second pole coil 61s. In a case where the first pole coil 61f faces one movable element magnetic pole 32 (for example, the movable element magnetic pole 32a) of a pair of movable element magnetic poles 32 and 32, the second pole coil 61s faces the other movable element magnetic pole 32 (for example, the movable element magnetic pole 32b) of the pair of movable element magnetic poles 32 and 32. In the present embodiment, the first pole coil 61f includes the unit coil 22d with the U1 phase, the unit coil 22d with the U2 phase, and the unit coil 22d with the U3 phase, which are electrically connected in series to each other in this order via inter-coil connection portions 62. The second pole coil 61s includes the unit coil 22d with the U4 phase and the unit coil 22d with the U5 phase which are electrically connected in series to each other via the inter-coil connection portion 62. The first pole coil 61f and the second pole coil 61s are electrically connected to each other via an inter-pole coil connection portion 63.

As mentioned above, a plurality of (five) unit coils 22d forming each of a plurality of (four) pole pair coils 60 of the first basic coil 51 are electrically connected in series to each other. A plurality of (five) unit coils 22d forming each of a plurality of (four) pole pair coils 60 of the second basic coil 52 are electrically connected in series to each other.

The pole pair coil 60 may be formed, for example, through unidirectional continuous winding in which windings are continuously wound in the same direction. In the present embodiment, the pole pair coil 60 is formed as a result of being continuously wound in one direction from a winding start portion 60s to a winding end portion 60e. Each of the first pole coil 61f and the second pole coil 61s may be wound through individual unidirectional continuous winding, the wound first pole coil 61f and second pole coil 61s may be connected in series to each other such that the pole pair coil 60 is formed. In the drawing, a pair of coil sides 22a and 22a disposed on the second direction movable element side (arrow Y1 direction) is indicated by solid lines, and a pair of coil sides 22a and 22a disposed on the second direction stator side (arrow Y2 direction) is indicated by dashed lines. The above-described content may be similarly applied to a pair of coil ends 22b and 22b.

Figure 7B:
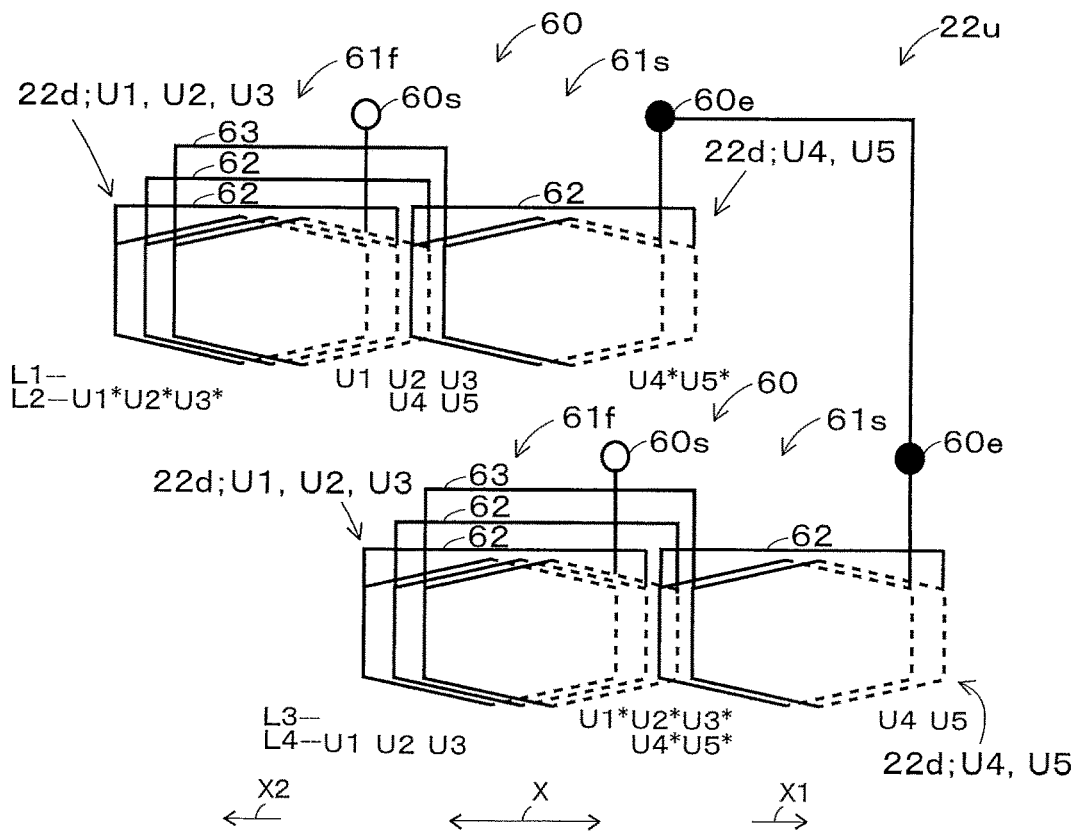
FIG. 7B is a schematic diagram illustrating a configuration example of a phase unit coil.

A method of configuring the phase unit coil 22u is not limited. As illustrated in FIG. 7B, for example, the winding end portion 60e of a single pole pair coil 60 of the first basic coil 51 is electrically connected to the winding end portion 60e of a single pole pair coil 60 of the second basic coil 52 such that the phase unit coil 22u is formed. In this case, the type of pole pair coil 60 forming the phase unit coil 22u is one type, and the type of pole pair coil 60 can be minimized. Therefore, it is possible to remove complexity of manufacturing a plurality of types of pole pair coils 60.

Figure 7C:
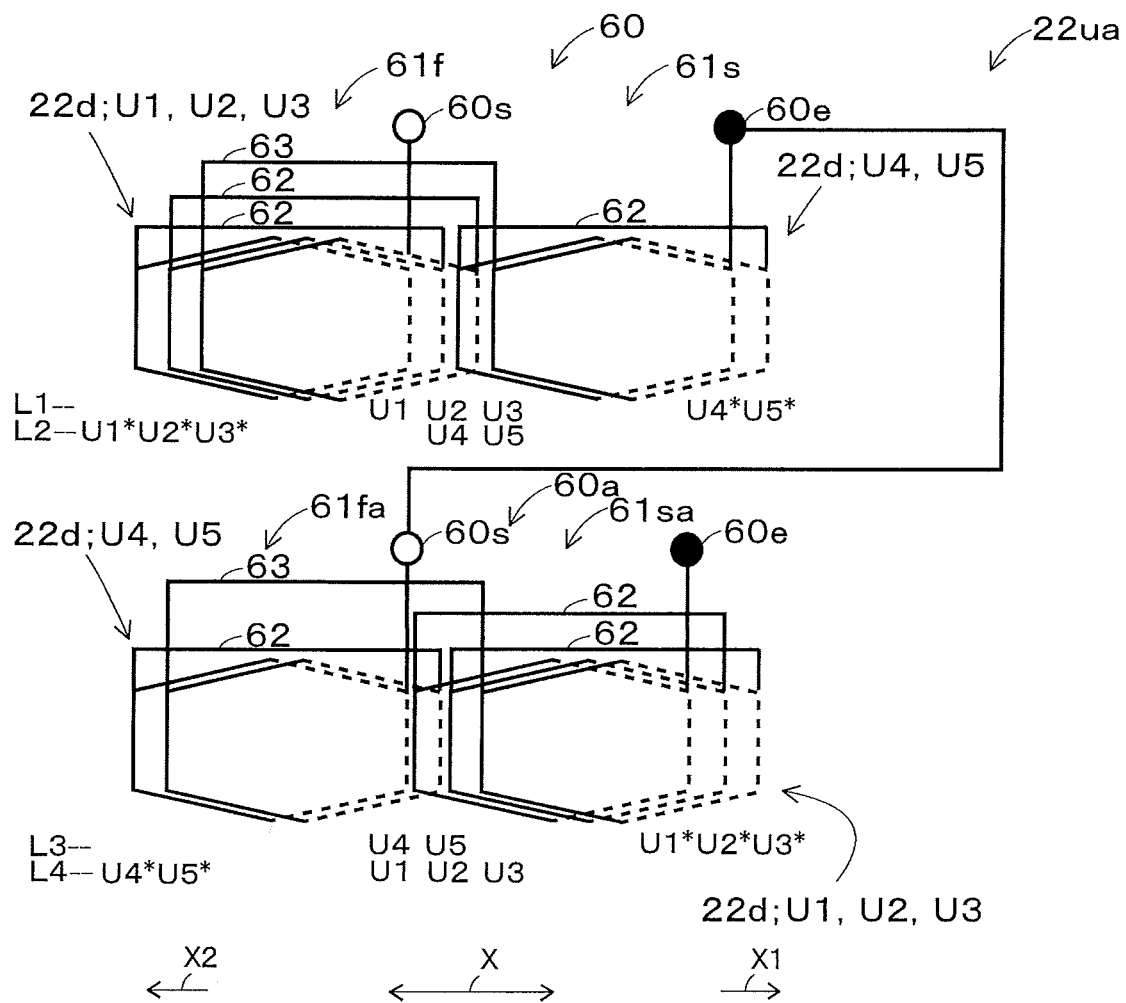
FIG. 7C is a schematic diagram illustrating another configuration example of the phase unit coil.

On the other hand, in the form illustrated in FIG. 7C, a single pole pair coil 60 of the first basic coil 51 is the pole pair coil 60 having the same configuration as that of the pole pair coil 60 illustrated in FIG. 7A. However, a single pole pair coil 60a of the second basic coil 52 includes a first pole coil 61fa and a second pole coil 61sa, and thus has a configuration which is different from that of the pole pair coil 60 illustrated in FIG. 7A. The first pole coil 61fa has the unit coil 22d with the U4 phase and the unit coil 22d with the U5 phase which are electrically connected in series to each other via the inter-coil connection portion 62. The second pole coil 61sa has the unit coil 22d with the U1 phase, the unit coil 22d with the U2 phase, and the unit coil 22d with the U3 phase which are electrically connected in series to each other in this order via the inter-coil connection portions 62. The first pole coil 61fa and the second pole coil 61sa are electrically connected to each other via the inter-pole coil connection portion 63.

In the form illustrated in FIG. 7C, the winding end portion 60e of a single pole pair coil 60 of the first basic coil 51 is electrically connected to the winding start portion 60s of a single pole pair coil 60a of the second basic coil 52 such that a phase unit coil 22ua is formed. In this form, types of pole pair coils 60 and 60a forming the phase unit coil 22ua are two types, and the types of pole pair coils 60 and 60a are increased more than in the form illustrated in FIG. 7B. However, in this form, in a case where the number of second basic coils 52 increases, routing for connecting the pole pair coils 60 to each other is easily uniform. As mentioned above, in the present specification, a configuration example of the stator winding 22 has been described by exemplifying two-layer double windings, but, in either case of coaxial winding and wave winding, the stator winding 22 may be formed. In any form which will be described later, the stator winding 22 can be formed in the same manner as in the form illustrated in FIG. 7B or 7C.

Second Embodiment

The present embodiment is different from the first embodiment in that the stator winding 22 includes a plurality of (three) basic coils 50. In the present embodiment, differences from the first embodiment will be focused.

Figure 8A:
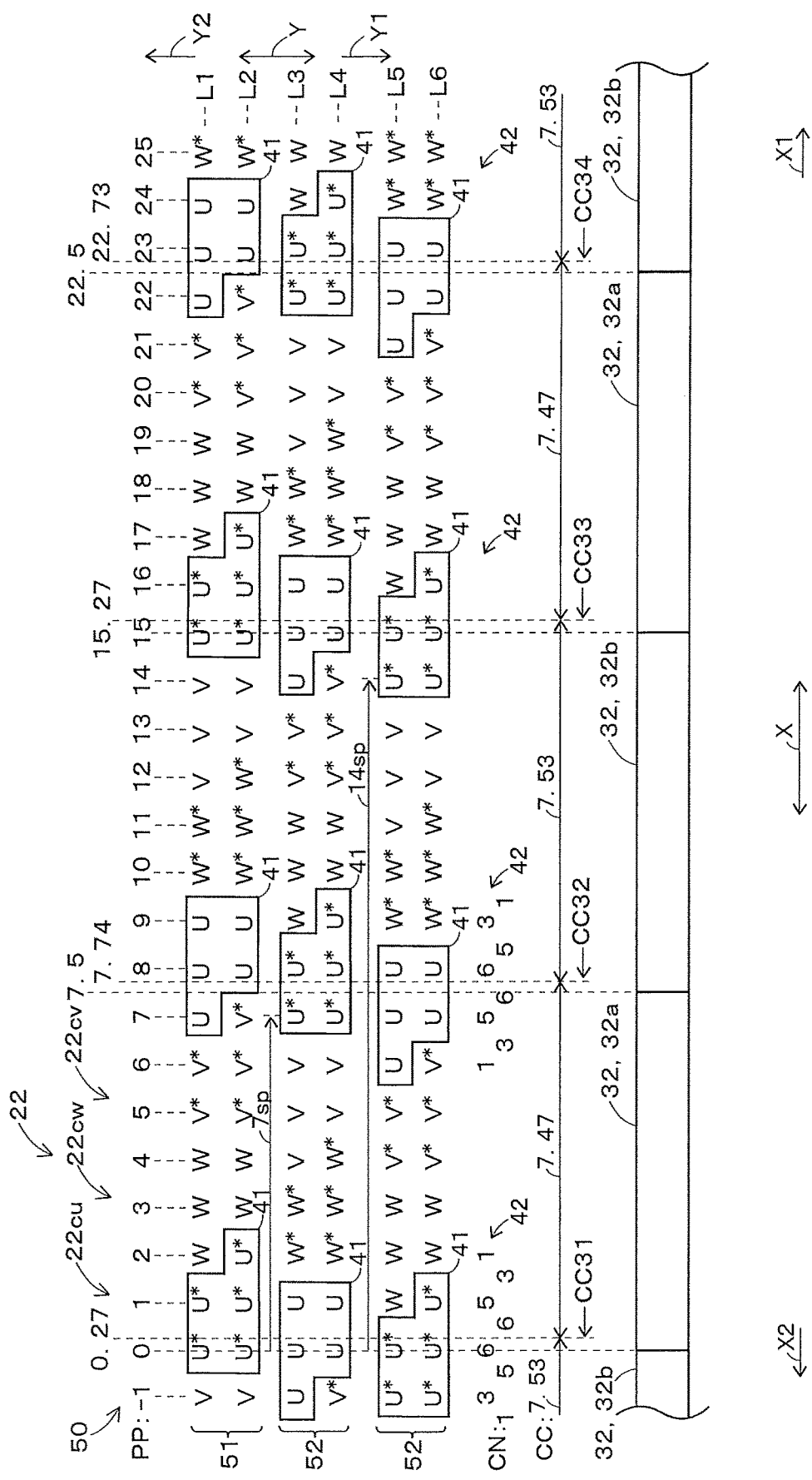
FIG. 8A is a schematic diagram illustrating an example of phase arrangement of a stator winding according to a second embodiment.

As illustrated in FIG. 8A, the stator winding 22 includes a plurality of (three) basic coils 50. Each of a plurality of (three) basic coils 50 has the same configuration as that of the above-described basic coil 50. A plurality of (three) basic coils 50 include a first basic coil 51 and a plurality of (two) second basic coils 52. Also in the present embodiment, each of a plurality of (two) second basic coils 52 is disposed at a position moved by a predetermined slot pitch in the movement direction (first direction (arrow X direction)) of the movable element 30 with respect to the first basic coil 51. Each of a plurality of (two) second basic coils 52 is disposed at a position moved in one direction (arrow X1 direction)) of the first direction (arrow X direction) with respect to the first basic coil 51. Consequently, the stator winding 22 of the present embodiment is formed in eight layers such as a first layer L1 to a sixth layer L6.

Also in the present embodiment, a movement unit amount is set to a 7-slot pitch. However, in one second basic coil 52 (the second basic coil 52 formed in the third layer L3 and the fourth layer L4) of a plurality of (two) second basic coils 52, a predetermined slot pitch is one time (7-slot pitch (7sp)) the 7-slot pitch which is the movement unit amount. In the other second basic coil 52 (the second basic coil 52 formed in the fifth layer L5 and the sixth layer L6) of a plurality of (two) second basic coils 52, a predetermined slot pitch is twice (14-slot pitch (14sp)) the 7-slot pitch which is the movement unit amount. As mentioned above, in the present embodiment, n for defining a predetermined slot pitch is 1 and 2. The first sequence of numbers includes all natural number multiples from one time (7-slot pitch (7sp)) to twice (14-slot pitch (14sp)) larger than the 7-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 7, 8, and 9 in the second basic coil 52 formed in the third layer L3 and the fourth layer L4. The one-phase band 41 of the U phase formed in a plurality of (three) slots 21c of which the position coordinates PP are 0, 1, and 2 in the first basic coil 51 is formed in a plurality of (three) slots 21c of which the position coordinates PP are 14, 15, and 16 in the second basic coil 52 formed in the fifth layer L5 and the sixth layer L6. The above-described content may be similarly applied to other one-phase bands 41.

In the present embodiment, the one-phase band 41 of the U phase of the first basic coil 51 is mixed with the U phase of a plurality of (two) second basic coils 52 such that the mixed one-phase band 42 of the U phase is formed. For example, the one-phase band 41 of the U phase of the first basic coil 51 is formed in a plurality of (three) slots 21c of which the position coordinates PP are 0, 1, and 2. The one-phase band 41 of the U phase of the second basic coil 52 formed in the third layer L3 and the fourth layer L4 is formed in a plurality of (three) slots 21c of which the position coordinates PP are −1, 0, and 1. The one-phase band 41 of the U phase of the second basic coil 52 formed in the fifth layer L5 and the sixth layer L6 is formed in a plurality of (three) slots 21c of which the position coordinates PP are −1, 0, and 1. In this case, the mixed one-phase band 42 of the U phase is formed in a plurality of (four) slots 21c of which the position coordinates PP are −1, 0, 1, and 2. The number (the number of coil sides CN) of a plurality of coil sides 22a forming the mixed one-phase band 42 of the U phase is fifteen.

A plurality of (three) coil sides 22a with the U phase are accommodated in the slot 21c of which the position coordinate PP is −1. A plurality of (six) coil sides 22a with the U phase are accommodated in the slot 21c of which the position coordinate PP is 0. A plurality of (five) coil sides 22a with the U phase are accommodated in the slot 21c of which the position coordinate PP is 1. A single coil side 22a with the U phase is accommodated in the slot 21c of which the position coordinate PP is 2. Therefore, the coil side center CC31 of the mixed one-phase band 42 of the U phase formed in a plurality of (four) slots 21c of which the position coordinates PP are −1, 0, 1, and 2 may be calculated, for example, on the basis of Equation 9 as follows, and the coil side center CC31 is 0.27.

$$CC31=(-1\times3+0\times6+1\times5+2\times1)/(3+6+5+1)=0.27 \quad \text{(Equation 9)}$$

Similarly, for example, the one-phase band 41 of the U phase of the first basic coil 51 is formed in a plurality of (three) slots 21c of which the position coordinates PP are 7, 8, and 9. The one-phase band 41 of the U phase of the second basic coil 52 formed in the third layer L3 and the fourth layer L4 is formed in a plurality of (three) slots 21c of which the position coordinates PP are 7, 8, and 9. The one-phase band 41 of the U phase of the second basic coil 52 formed in the fifth layer L5 and the sixth layer L6 is formed in a plurality of (three) slots 21c of which the position coordinates PP are 6, 7, and 8. In this case, the mixed one-phase band 42 of the U phase is formed in a plurality of (four) slots 21c of which the position coordinates PP are 6, 7, 8, and 9. The number (the number of coil sides CN) of a plurality of coil sides 22a forming the mixed one-phase band 42 of the U phase is fifteen.

A single coil side 22a with the U phase is accommodated in the slot 21c of which the position coordinate PP is 6. A plurality of (five) coil sides 22a with the U phase are accommodated in the slot 21c of which the position coordinate PP is 7. A plurality of (six) coil sides 22a with the U phase are accommodated in the slot 21c of which the position coordinate PP is 8. A plurality of (three) coil sides 22a with the U phase are accommodated in the slot 21c of which the position coordinate PP is 9. Therefore, the coil side center CC32 of the mixed one-phase band 42 of the U phase formed in a plurality of (four) slots 21c of which the position coordinates PP are 6, 7, 8, and 9 may be calculated, for example, on the basis of Equation 10 as follows, and the coil side center CC32 is 7.74.

$$CC32=(6\times1+7\times5+8\times6+9\times3)/(1+5+6+3)=7.74 \quad \text{(Equation 10)}$$

The same may apply to the mixed one-phase band 42 of the U phase formed in a plurality of (four) slots 21c of which the position coordinates PP are 14, 15, 16, and 17. Also in this case, the number (the number of coil sides CN) of a plurality of coil sides 22a forming the mixed one-phase band 42 of the U phase is fifteen. The coil side center CC33 of the mixed one-phase band 42 of the U phase in this case may be calculated, for example, on the basis of Equation 11 as follows, and the coil side center CC33 is 15.27.

$$CC33=(14\times3+15\times6+16\times5+17\times1)/(3+6+5+1)=15.27 \quad \text{(Equation 11)}$$

The same may apply to the mixed one-phase band 42 of the U phase formed in a plurality of (four) slots 21c of which the position coordinates PP are 21, 22, 23, and 24. Also in this case, the number (the number of coil sides CN) of a plurality of coil sides 22a forming the mixed one-phase band 42 of the U phase is fifteen. The coil side center CC34 of the mixed one-phase band 42 of the U phase in this case may be calculated, for example, on the basis of Equation 12 as follows, and the coil side center CC34 is 22.73.

$$CC34=(21\times1+22\times5+23\times6+24\times3)/(1+5+6+3)=22.73 \quad \text{(Equation 12)}$$

On the basis of the above-described calculation results, a distance between the coil side center C31 and the coil side center CC32 of the mixed one-phase band 42 of the U phase is 7.47 (=7.74−0.27). A distance between the coil side center C32 and the coil side center CC33 of the mixed one-phase band 42 of the U phase is 7.53 (=15.27−7.74). A distance between the coil side center C33 and the coil side center CC34 of the mixed one-phase band 42 of the U phase is 7.47 (=22.73−15.27). As mentioned above, 7.47 and 7.53 are repeated as a distance between the coil side centers CC of the mixed one-phase band 42 of the same phase (U phase) adjacent to each other in the first direction (arrow X direction).

In the present embodiment (a form in which the stator winding 22 includes a plurality of (three) basic coils 50), an adjacent coil side ratio is 0.992 (=7.47/7.53) and is thus sufficiently close to 1 compared with 0.973 (=7.4/7.6) which is an adjacent coil side ratio in the reference form (a form in which the stator winding 22 includes a single basic coil 50). Therefore, it can be said that a distance between the coil side centers CC of the mixed one-phase band 42 of the same phase (U phase) adjacent to each other in the first direction (arrow X direction) is uniform in each of a plurality of (eight) movable element magnetic poles 32.

In the present embodiment, the number (the number of coil sides CN) of a plurality of coil sides 22a forming the mixed one-phase band 42 of the U phase is all fifteen, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the present embodiment can achieve the same effects as those described in the first embodiment.

Figure 8B:
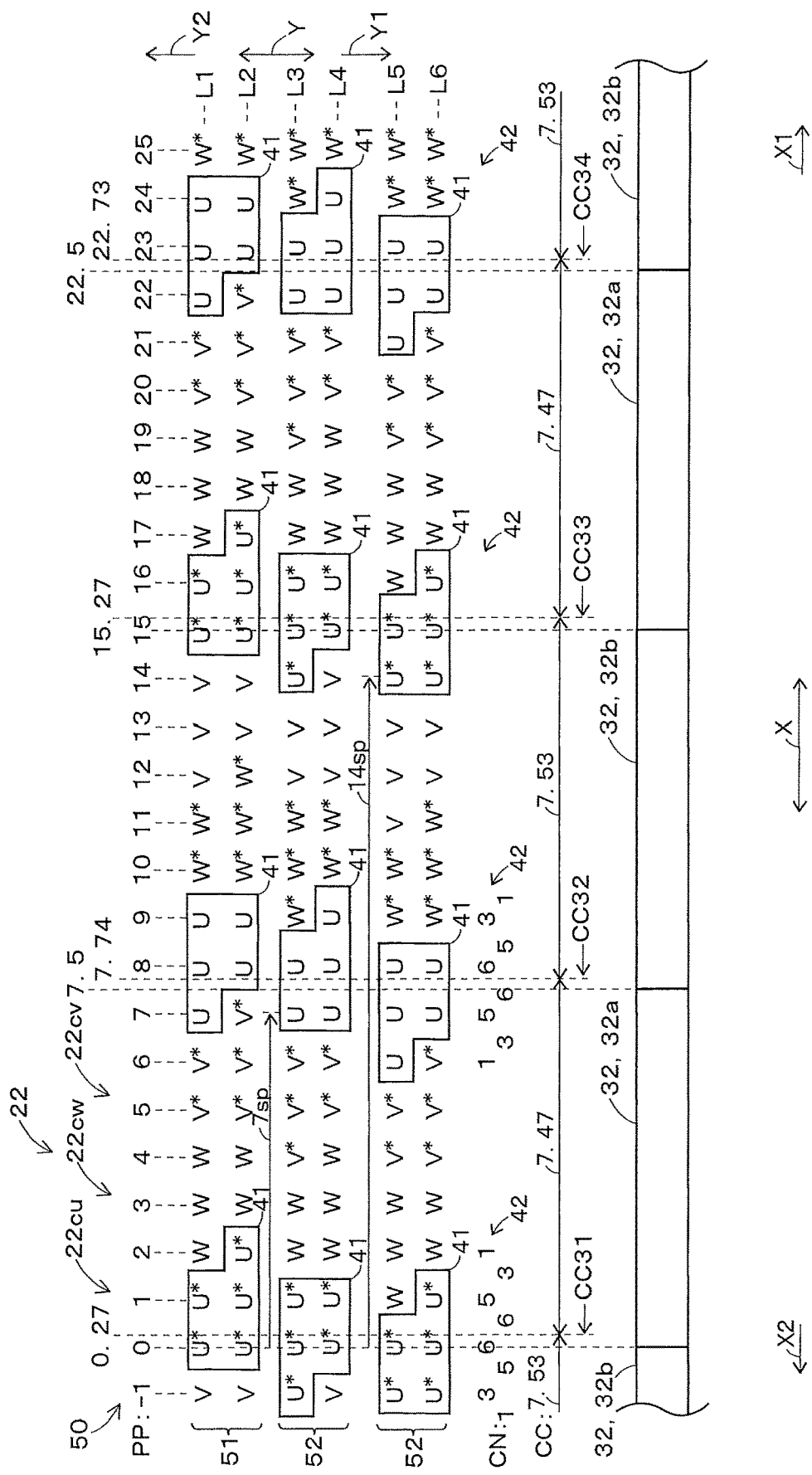
FIG. 8B is a schematic diagram illustrating an example of phase arrangement of the stator winding in which conduction directions of a plurality of coil sides are corrected in a second basic coil illustrated in FIG. 8A.

In the phase arrangement illustrated in FIG. 8A, coil sides 22a having different conduction directions are mixed in a plurality of coil sides 22a with the same phase accommodated in the same slot 21c. Thus, as illustrated in FIG. 8B, it is necessary to correct conduction directions of a plurality of coil sides 22a. For example, in the second basic coil 52 formed in the third layer L3 and the fourth layer L4 illustrated in FIG. 8B, conduction directions of a plurality of (five) coil sides 22a with the U phase accommodated in a plurality of (three) slots 21c of which the position coordinates PP are 7, 8, and 9 are inversed to the conduction directions illustrated in FIG. 8A. The above-described content may be similarly applied to other one-phase bands 41 of the second basic coil 52 formed in the third layer L3 and the fourth layer L4 illustrated in FIG. 8B. In the second basic coil 52 formed in the fifth layer L5 and the sixth layer L6, conduction directions of the coil sides 22a are correct, and thus the conduction directions of the coil sides 22a are not required to be inversed.

Figure 8C:
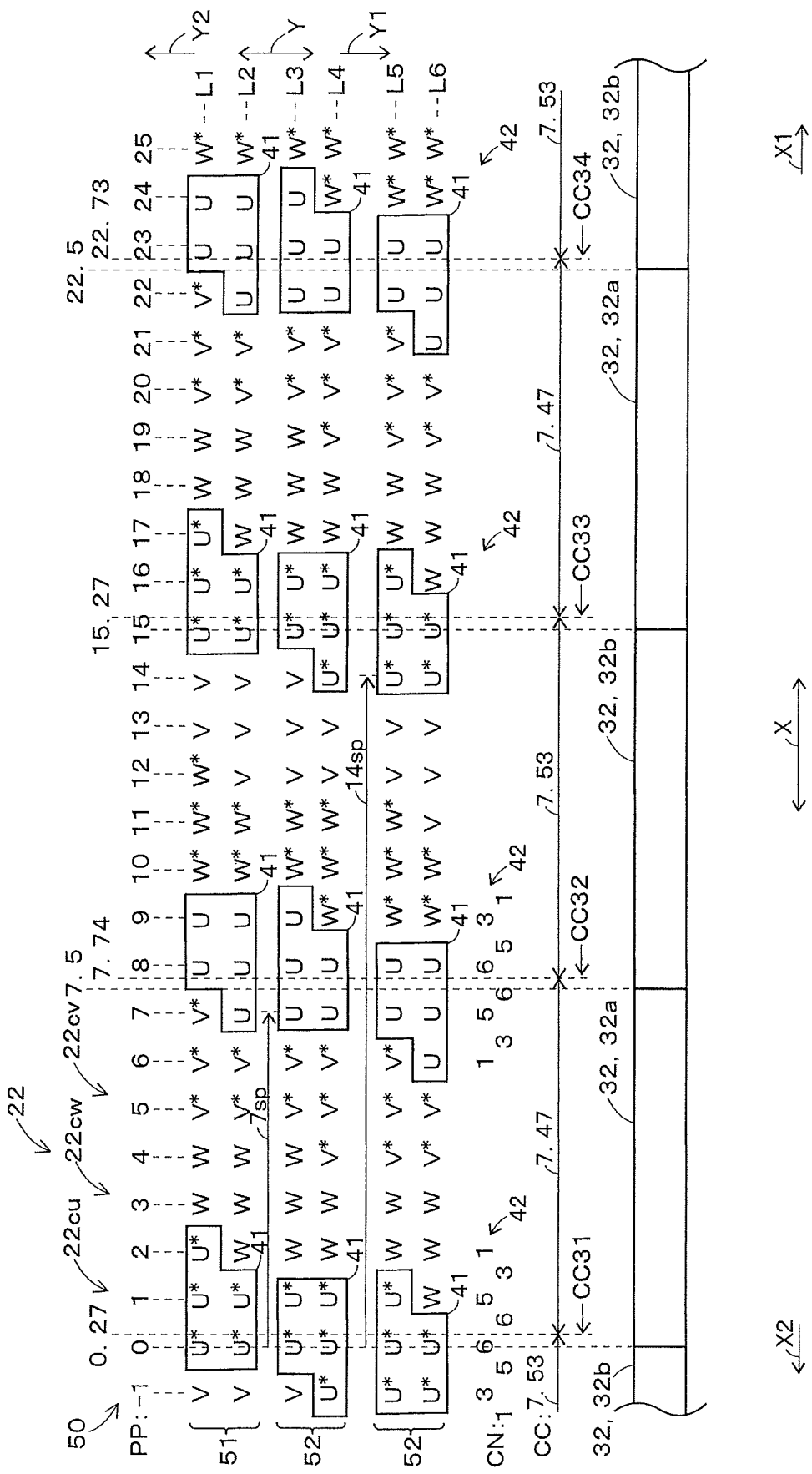
FIG. 8C is a schematic diagram illustrating an example of phase arrangement of the stator winding in which arrangement in a slot of the plurality of coil sides accommodated in the same slot is changed according to a modification form.

As illustrated in FIG. 8C, arrangement of a plurality of coil sides 22a accommodated in the same slot 21c may be changed in the slot 21c. For example, in the second basic coil 52 formed in the third layer L3 and the fourth layer L4, the coil side 22a with the U phase accommodated in the slot 21c of which the position coordinate PP is −1 is moved from the third layer L3 to the fourth layer L4. In the second basic coil 52 formed in the fifth layer L5 and the sixth layer L6, the coil side 22a with the U phase accommodated in the slot 21c of which the position coordinate PP is 1 is moved from the sixth layer L6 to the fifth layer L5. In the first basic coil 51, the coil side 22a with the U phase accommodated in the slot 21c of which the position coordinate PP is 2 is moved from the second layer L2 to the first layer L1. The above-described content may be similarly applied to other mixed one-phase bands 42.

A coil side distribution width of the mixed one-phase band 42 of the U phase formed in a plurality of (four) slots 21c of which the position coordinates PP are −1, 0, 1, and 2 is four slots. A coil side distribution width of the mixed one-phase band 42 of the U phase formed in a plurality of (four) slots 21c of which the position coordinates PP are 6, 7, 8, and 9 is four slots. An effective coil side distribution width of the mixed one-phase band 42 of the U phase formed in a plurality of (four) slots 21c of which the position coordinates PP are −1, 0, 1, and 2 is 4.5 slots. An effective coil side distribution width of the mixed one-phase band 42 of the U phase formed in a plurality of (four) slots 21c of which the position coordinates PP are 6, 7, 8, and 9 is 4.5 slots.

As mentioned above, the effective coil side distribution width (4.5 slots) of the present embodiment is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 9:
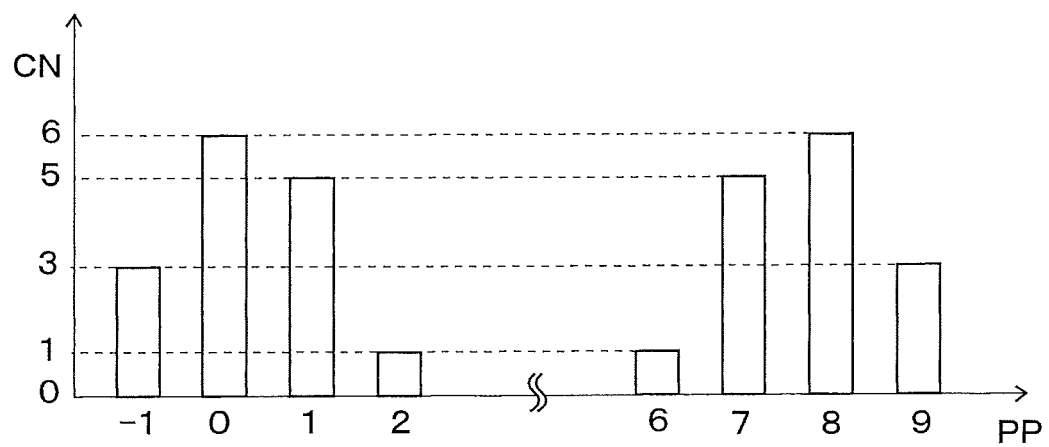
FIG. 9 is a schematic diagram illustrating an example of a coil side distribution according to the second embodiment.

FIG. 9 illustrates an example of a coil side distribution of the present embodiment (a form in which the stator winding 22 includes a plurality of (three) basic coils 50). As illustrated in FIG. 8A, for example, a plurality of (three) coil sides 22a with the U phase are accommodated in the slot 21c of which the position coordinate PP is −1. Thus, as illustrated in FIG. 9, the number (the number of coil sides CN) of coil sides 22a with the U phase at the position coordinate PP of −1 is three. Similarly, a plurality of (six) coil sides 22a with the U phase are accommodated in the slot 21c of which the position coordinate PP is 0, and the number (the number of coil sides CN) of coil sides 22a with the U phase at the position coordinate PP of 0 is six. A plurality of (five) coil sides 22a with the U phase are accommodated in the slot 21c of which the position coordinate PP is 1, and the number (the number of coil sides CN) of coil sides 22a with the U phase at the position coordinate PP of 1 is five. A single coil side 22a with the U phase is accommodated in the slot 21c of which the position coordinate PP is 2, and the number (the number of coil sides CN) of coil sides 22a with the U phase at the position coordinate PP of 2 is one.

A single coil side 22a with the U phase is accommodated in the slot 21c of which the position coordinate PP is 6, and the number (the number of coil sides CN) of coil sides 22a with the U phase at the position coordinate PP of 6 is one. A plurality of (five) coil sides 22a with the U phase are accommodated in the slot 21c of which the position coordinate PP is 7, and the number (the number of coil sides CN) of coil sides 22a with the U phase at the position coordinate PP of 7 is five. Similarly, a plurality of (six) coil sides 22a with the U phase are accommodated in the slot 21c of which the position coordinate PP is 8, and the number (the number of coil sides CN) of coil sides 22a with the U phase at the position coordinate PP of 8 is six. A plurality of (three) coil sides 22a with the U phase are accommodated in the slot 21c of which the position coordinate PP is 9, and the number (the number of coil sides CN) of coil sides 22a with the U phase at the position coordinate PP of 9 is three.

The coil side distribution of the present embodiment illustrated in FIG. 9 is wider in the first direction (arrow X direction) and is gentler than the coil side distribution of the reference form illustrated in FIG. 5A. The coil side distribution of the present embodiment is closer to a sine wave than in the reference form. Therefore, the rotating electric machine 10 of the present embodiment can achieve the same effects as those described in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by a 7-slot pitch in the first direction (arrow X direction) with respect to the one-phase band 41 of the first basic coil 51 is formed in a plurality of (three) slots 21c of which the position coordinates PP are 7, 8, and 9, and occupies 2.5 slots. The one-phase band 41 of the U phase of the second basic coil 52 disposed at a position moved by a 14-slot pitch in the first direction (arrow X direction) with respect to the one-phase band 41 of the first basic coil 51 is formed in a plurality of (three) slots 21c of which the position coordinates PP are 14, 15, and 16, and occupies 2.5 slots. Therefore, the second coil side conductor number may be expressed by all 2.5×t0. In other words, in the present embodiment, the first coil side conductor number and the second coil side conductor number are uniform. The above-described content may be similarly applied to other one-phase bands 41.

Third Embodiment

The present embodiment is different from the first embodiment in that the stator winding 22 includes a plurality of (four) basic coils 50. In the present embodiment, differences from the first embodiment will be focused.

Figure 10A:
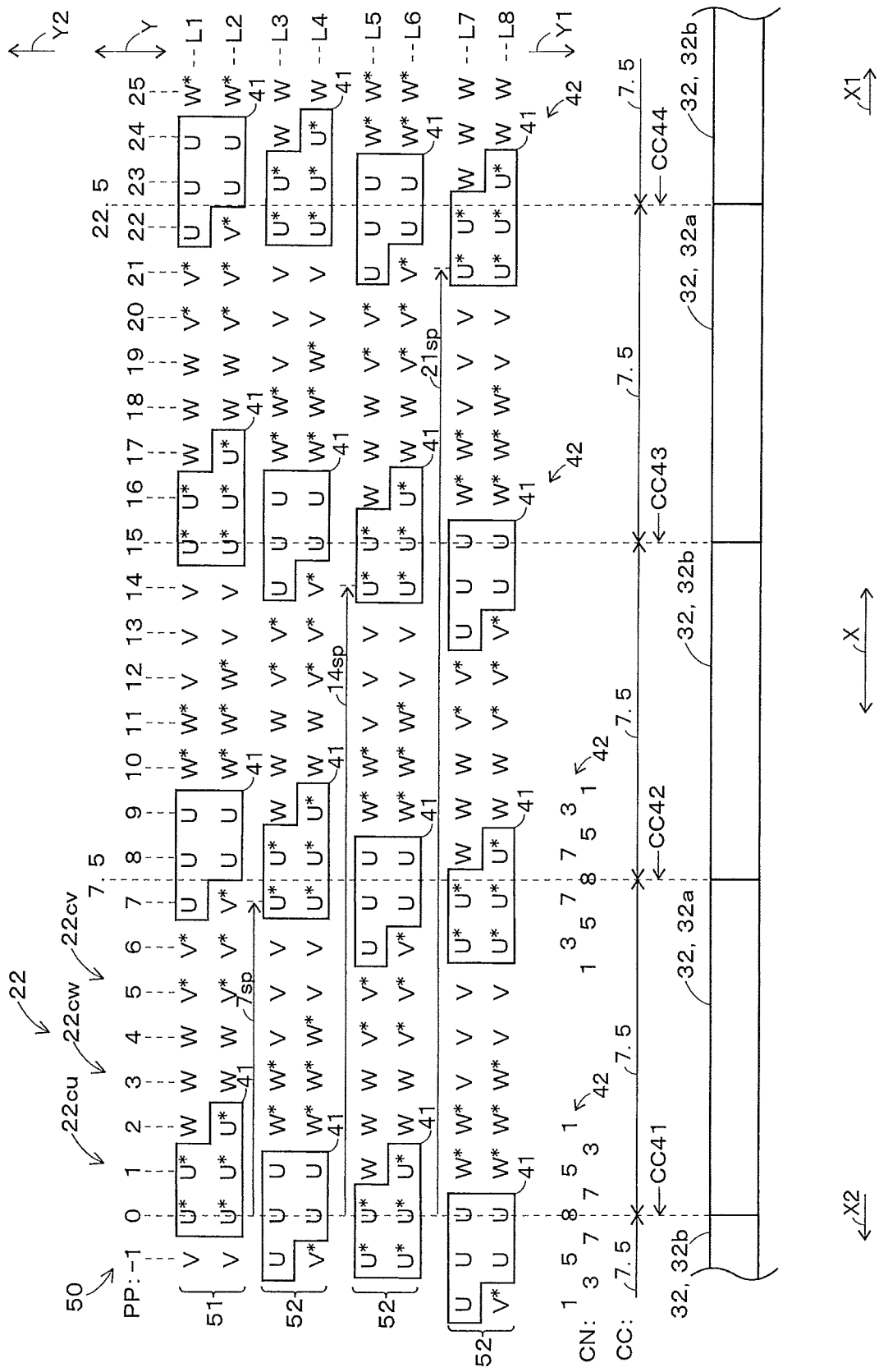
FIG. 10A is a schematic diagram illustrating an example of phase arrangement of a stator winding according to a third embodiment.

As illustrated in FIG. 10A, the stator winding 22 includes a plurality of (four) basic coils 50. Each of a plurality of (four) basic coils 50 has the same configuration as that of the above-described basic coil 50. A plurality of (four) basic coils 50 include a first basic coil 51 and a plurality of (three) second basic coils 52. Also in the present embodiment, each of a plurality of (three) second basic coils 52 is disposed at a position moved by a predetermined slot pitch in the movement direction (first direction (arrow X direction)) of the movable element 30 with respect to the first basic coil 51. Each of a plurality of (three) second basic coils 52 is disposed at a position moved in one direction (arrow X1 direction)) of the first direction (arrow X direction) with respect to the first basic coil 51. Consequently, the stator winding 22 of the present embodiment is formed in six layers such as a first layer L1 to an eighth layer L8.

Also in the present embodiment, a movement unit amount is set to a 7-slot pitch. However, in one second basic coil 52 (the second basic coil 52 formed in the third layer L3 and the fourth layer L4) of a plurality of (three) second basic coils 52, a predetermined slot pitch is one time (7-slot pitch (7sp)) the 7-slot pitch which is the movement unit amount. In another second basic coil 52 (the second basic coil 52 formed in the fifth layer L5 and the sixth layer L6) of a plurality of (three) second basic coils 52, a predetermined slot pitch is twice (14-slot pitch (14sp)) the 7-slot pitch which is the movement unit amount. In the other second basic coil 52 (the second basic coil 52 formed in the seventh layer L7 and the eighth layer L8) of a plurality of (three) second basic coils 52, a predetermined slot pitch is three times (21-slot pitch (21sp)) the 7-slot pitch which is the movement unit amount. As mentioned above, in the present embodiment, n for defining a predetermined slot pitch is 1, 2, and 3. The first sequence of numbers includes all natural number multiples from one time (7-slot pitch (7sp)) to three times (21-slot pitch (21sp)) larger than the 7-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 7, 8, and 9 in the second basic coil 52 formed in the third layer L3 and the fourth layer L4. The one-phase band 41 of the U phase formed in a plurality of (three) slots 21c of which the position coordinates PP are 0, 1, and 2 in the first basic coil 51 is formed in a plurality of (three) slots 21c of which the position coordinates PP are 14, 15, and 16 in the second basic coil 52 formed in the fifth layer L5 and the sixth layer L6.

The one-phase band 41 of the U phase formed in a plurality of (three) slots 21c of which the position coordinates PP are 0, 1, and 2 in the first basic coil 51 is formed in a plurality of (three) slots 21c of which the position coordinates PP are 21, 22, and 23 in the second basic coil 52 formed in the seventh layer L7 and the eighth layer L8. The above-described content may be similarly applied to other one-phase bands 41 of the U phase.

In the present embodiment, the one-phase band 41 of the U phase of the first basic coil 51 is mixed with a plurality of (three) one-phase bands 41 of the U phase of plurality of (three) second basic coils 52 such that the mixed one-phase band 42 of the U phase is formed. For example, the one-phase band 41 of the U phase of the first basic coil 51 is formed in a plurality of (three) slots 21c of which the position coordinates PP are 0, 1, and 2. The one-phase band 41 of the U phase of the second basic coil 52 formed in the third layer L3 and the fourth layer L4 is formed in a plurality of (three) slots 21c of which the position coordinates PP are −1, 0, and 1. The one-phase band 41 of the U phase of the second basic coil 52 formed in the fifth layer L5 and the sixth layer L6 is formed in a plurality of (three) slots 21c of which the position coordinates PP are −1, 0, and 1.

The one-phase band 41 of the U phase of the second basic coil 52 formed in the seventh layer L7 and the eighth layer L8 is formed in a plurality of (three) slots 21c of which the position coordinates PP are −2, −1, and 0. In this case, the mixed one-phase band 42 of the U phase is formed in a plurality of (five) slots 21c of which the position coordinates PP are −2, −1, 0, 1, and 2. The number (the number of coil sides CN) of a plurality of coil sides 22a forming the mixed one-phase band 42 of the U phase is twenty.

A single coil side 22a with the U phase is accommodated in the slot 21c of which the position coordinate PP is −2. A plurality of (five) coil sides 22a with the U phase are accommodated in the slot 21c of which the position coordinate PP is −1. A plurality of (eight) coil sides 22a with the U phase are accommodated in the slot 21c of which the position coordinate PP is 0. A plurality of (five) coil sides 22a with the U phase are accommodated in the slot 21c of which the position coordinate PP is 1. A single coil side 22a with the U phase is accommodated in the slot 21c of which the position coordinate PP is 2. Therefore, the coil side center CC41 of the mixed one-phase band 42 of the U phase formed in a plurality of (five) slots 21c of which the position coordinates PP are −2, −1, 0, 1, and 2 may be calculated, for example, on the basis of Equation 13 as follows, and the coil side center CC41 is 0.

$$CC41=(-2\times1+-1\times5+0\times8+1\times5+2\times1)/(1+5+8+5+1)=0 \quad \text{(Equation 13)}$$

Similarly, for example, the one-phase band 41 of the U phase of the first basic coil 51 is formed in a plurality of (three) slots 21c of which the position coordinates PP are 7, 8, and 9. The one-phase band 41 of the U phase of the second basic coil 52 formed in the third layer L3 and the fourth layer L4 is formed in a plurality of (three) slots 21c of which the position coordinates PP are 7, 8, and 9. The one-phase band 41 of the U phase of the second basic coil 52 formed in the fifth layer L5 and the sixth layer L6 is formed in a plurality of (three) slots 21c of which the position coordinates PP are 6, 7, and 8.

The one-phase band 41 of the U phase of the second basic coil 52 formed in the seventh layer L7 and the eighth layer L8 is formed in a plurality of (three) slots 21c of which the position coordinates PP are 6, 7, and 8. In this case, the mixed one-phase band 42 of the U phase is formed in a plurality of (four) slots 21c of which the position coordinates PP are 6, 7, 8, and 9. The number (the number of coil sides CN) of a plurality of coil sides 22a forming the mixed one-phase band 42 of the U phase is twenty.

A plurality of (three) coil sides 22a with the U phase are accommodated in the slot 21c of which the position coordinate PP is 6. A plurality of (seven) coil sides 22a with the U phase are accommodated in the slot 21c of which the position coordinate PP is 7. A plurality of (seven) coil sides 22a with the U phase are accommodated in the slot 21c of which the position coordinate PP is 8. A plurality of (three) coil sides 22a with the U phase are accommodated in the slot 21c of which the position coordinate PP is 9. Therefore, the coil side center CC42 of the mixed one-phase band 42 of the U phase formed in a plurality of (four) slots 21c of which the position coordinates PP are 6, 7, 8, and 9 may be calculated, for example, on the basis of Equation 14 as follows, and the coil side center CC42 is 7.5.

$$CC42=(6\times3+7\times7+8\times7+9\times3)/(3+7+7+3)=7.5 \quad \text{(Equation 14)}$$

The same may apply to the mixed one-phase band 42 of the U phase formed in a plurality of (five) slots 21c of which the position coordinates PP are 13, 14, 15, 16, and 17. Also in this case, the number (the number of coil sides CN) of a plurality of coil sides 22a forming the mixed one-phase band 42 of the U phase is twenty. The coil side center CC43 of the mixed one-phase band 42 of the U phase in this case may be calculated, for example, on the basis of Equation 15 as follows, and the coil side center CC43 is 15.

$$CC43=(13\times1+14\times5+15\times8+16\times5+17\times1)/(1+5+8+5+1)=15 \quad \text{(Equation 15)}$$

The same may apply to the mixed one-phase band 42 of the U phase formed in a plurality of (four) slots 21c of which the position coordinates PP are 21, 22, 23, and 24. Also in this case, the number (the number of coil sides CN) of a plurality of coil sides 22a forming the mixed one-phase band 42 of the U phase is twenty. The coil side center CC44 of the mixed one-phase band 42 of the U phase in this case may be calculated, for example, on the basis of Equation 16 as follows, and the coil side center CC44 is 22.5.

$$CC44=(21\times3+22\times7+23\times7+24\times3)/(3+7+7+3)=22.5 \quad \text{(Equation 16)}$$

On the basis of the above-described calculation results, a distance between the coil side center CC41 and the coil side center CC42 of the mixed one-phase band 42 of the U phase is 7.5 (=7.5−0). A distance between the coil side center CC42 and the coil side center CC43 of the mixed one-phase band 42 of the U phase is 7.5 (=15−7.5). A distance between the coil side center CC43 and the coil side center CC44 of the mixed one-phase band 42 of the U phase is 7.5 (=22.5−15). As mentioned above, a distance between the coil side centers CC of the mixed one-phase bands 42 of the same phase (U phase) adjacent to each other in the movement direction (first direction (arrow X direction)) is 7.5, and is uniform. An adjacent coil side ratio in the present embodiment is 1 (=7.5/7.5). In other words, a distance between the coil side centers CC of the mixed one-phase band 42 of the same phase (U phase) adjacent to each other in the first direction (arrow X direction) is uniform.

In the present embodiment, the number (the number of coil sides CN) of a plurality of coil sides 22a forming the mixed one-phase band 42 of the U phase is all twenty, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the present embodiment can achieve the same effects as those described in the first embodiment.

Figure 10B:
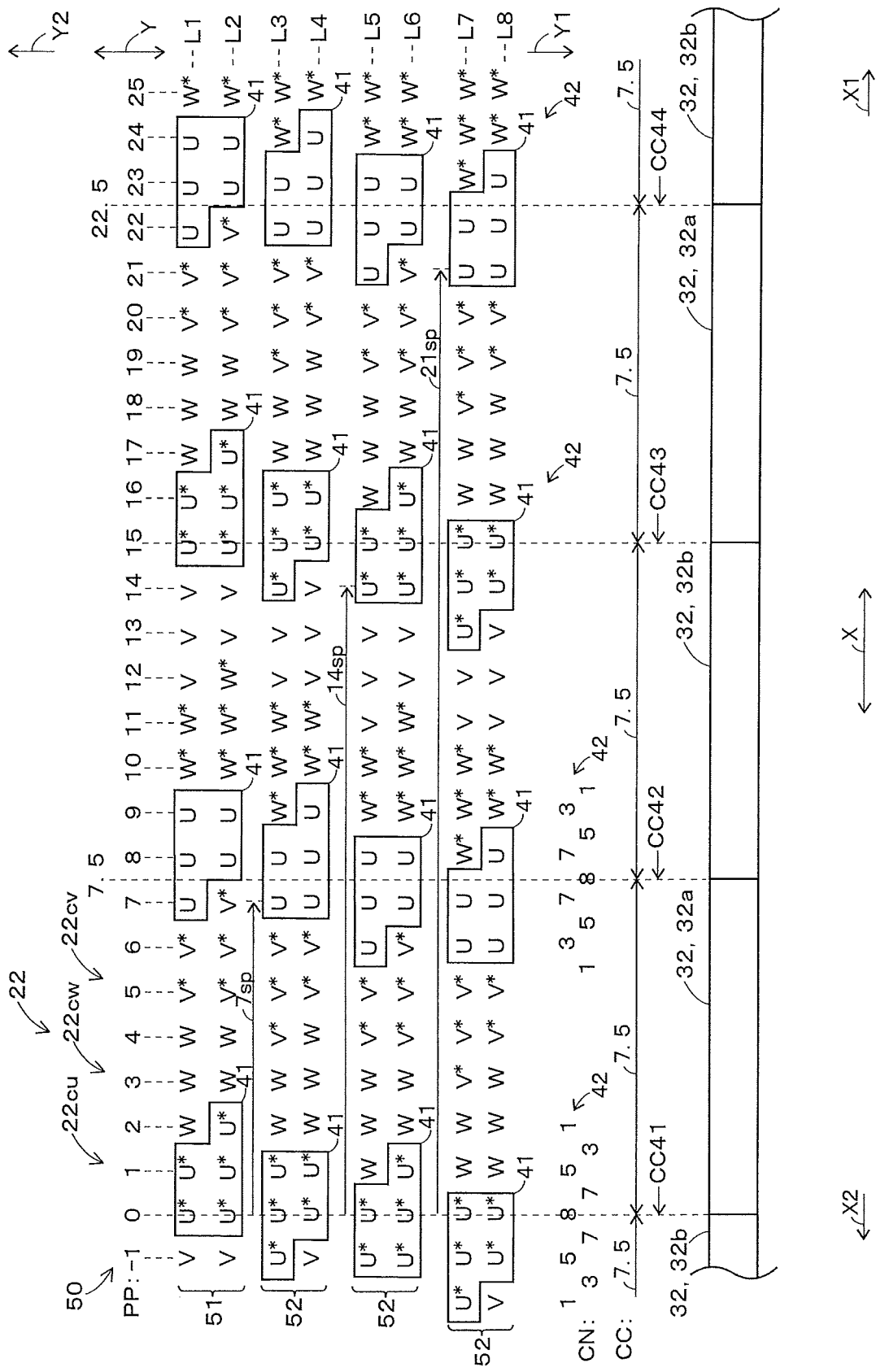
FIG. 10B is a schematic diagram illustrating an example of phase arrangement of the stator winding in which conduction directions of a plurality of coil sides are corrected in a second basic coil illustrated in FIG. 10A.

In the phase arrangement illustrated in FIG. 10A, coil sides 22a having different conduction directions are mixed in a plurality of coil sides 22a with the same phase accommodated in the same slot 21c. Thus, as illustrated in FIG. 10B, it is necessary to correct conduction directions of a plurality of coil sides 22a. For example, in the second basic coil 52 formed in the third layer L3 and the fourth layer L4 illustrated in FIG. 10B, conduction directions of a plurality of (five) coil sides 22a with the U phase accommodated in a plurality of (three) slots 21c of which the position coordinates PP are 7, 8, and 9 are inversed to the conduction directions illustrated in FIG. 10A.

In the second basic coil 52 formed in the seventh layer L7 and the eighth layer L8 illustrated in FIG. 10B, conduction directions of a plurality of (five) coil sides 22a with the U phase accommodated in a plurality of (three) slots 21c of which the position coordinates PP are 21, 22, and 23 are inversed to the conduction directions illustrated in FIG. 10A. The above-described content may be similarly applied to other one-phase bands 41 of the second basic coil 52 formed in the third layer L3 and the fourth layer L4 illustrated in FIG. 10B. The above-described content may be similarly applied to other one-phase bands 41 of the second basic coil 52 formed in the seventh layer L7 and the eighth layer L8 illustrated in FIG. 10B. In the second basic coil 52 formed in the fifth layer L5 and the sixth layer L6, conduction directions of the coil sides 22a are correct, and thus the conduction directions of the coil sides 22a are not required to be inversed.

As illustrated in FIG. 10C, arrangement of a plurality of coil sides 22a accommodated in the same slot 21c may be changed in the slot 21c. For example, in the second basic coil 52 formed in the third layer L3 and the fourth layer L4, the coil side 22a with the U phase accommodated in the slot 21c of which the position coordinate PP is −1 is moved from the third layer L3 to the fourth layer L4. In the second basic coil 52 formed in the seventh layer L7 and the eighth layer L8, the coil side 22a with the U phase accommodated in the slot 21c of which the position coordinate PP is −2 is moved from the seventh layer L7 to the eighth layer L8.

In the second basic coil 52 formed in the fifth layer L5 and the sixth layer L6, the coil side 22a with the U phase accommodated in the slot 21c of which the position coordinate PP is 1 is moved from the sixth layer L6 to the fifth layer L5. In the first basic coil 51, the coil side 22a with the U phase accommodated in the slot 21c of which the position coordinate PP is 2 is moved from the second layer L2 to the first layer L1. The above-described content may be similarly applied to other mixed one-phase bands 42.

A coil side distribution width of the mixed one-phase band 42 of the U phase formed in a plurality of (five) slots 21c of which the position coordinates PP are −2, −1, 0, 1, and 2 is five slots. A coil side distribution width of the mixed one-phase band 42 of the U phase formed in a plurality of (four) slots 21c of which the position coordinates PP are 6, 7, 8, and 9 is four slots. An effective coil side distribution width of the mixed one-phase band 42 of the U phase formed in a plurality of (five) slots 21c of which the position coordinates PP are −2, −1, 0, 1, and 2 is five slots. An effective coil side distribution width of the mixed one-phase band 42 of the U phase formed in a plurality of (four) slots 21c of which the position coordinates PP are 6, 7, 8, and 9 is five slots.

As mentioned above, the effective coil side distribution width (five slots) of the present embodiment is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 11:
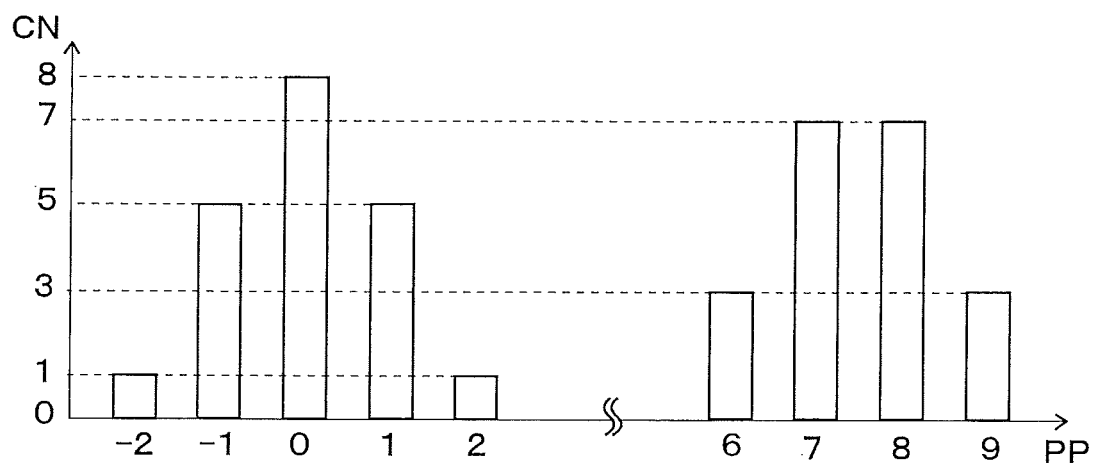
FIG. 11 is a schematic diagram illustrating an example of a coil side distribution according to the third embodiment.

FIG. 11 illustrates an example of a coil side distribution of the present embodiment (a form in which the stator winding 22 includes a plurality of (four) basic coils 50). As illustrated in FIG. 10A, for example, a single coil side 22a with the U phase is accommodated in the slot 21c of which the position coordinate PP is −2. Thus, as illustrated in FIG. 11, the number (the number of coil sides CN) of coil sides 22a with the U phase at the position coordinate PP of −2 is one. Similarly, a plurality of (five) coil sides 22a with the U phase are accommodated in the slot 21c of which the position coordinate PP is −1, and the number (the number of coil sides CN) of coil sides 22a with the U phase at the position coordinate PP of −1 is five.

A plurality of (eight) coil sides 22a with the U phase are accommodated in the slot 21c of which the position coordinate PP is 0, and the number (the number of coil sides CN) of coil sides 22a with the U phase at the position coordinate PP of 0 is eight. A plurality of (five) coil sides 22a with the U phase are accommodated in the slot 21c of which the position coordinate PP is 1, and the number (the number of coil sides CN) of coil sides 22a with the U phase at the position coordinate PP of 1 is five. A single coil side 22a with the U phase is accommodated in the slot 21c of which the position coordinate PP is 2, and the number (the number of coil sides CN) of coil sides 22a with the U phase at the position coordinate PP of 2 is one.

A plurality of (three) coil sides 22a with the U phase are accommodated in the slot 21c of which the position coordinate PP is 6, and the number (the number of coil sides CN) of coil sides 22a with the U phase at the position coordinate PP of 6 is three. A plurality of (seven) coil sides 22a with the U phase are accommodated in the slot 21c of which the position coordinate PP is 7, and the number (the number of coil sides CN) of coil sides 22a with the U phase at the position coordinate PP of 7 is seven. A plurality of (seven) coil sides 22a with the U phase are accommodated in the slot 21c of which the position coordinate PP is 8, and the number (the number of coil sides CN) of coil sides 22a with the U phase at the position coordinate PP of 8 is seven. A plurality of (three) coil sides 22a with the U phase are accommodated in the slot 21c of which the position coordinate PP is 9, and the number (the number of coil sides CN) of coil sides 22a with the U phase at the position coordinate PP of 9 is three.

The coil side distribution of the present embodiment illustrated in FIG. 11 is wider in the first direction (arrow X direction) and is gentler than the coil side distribution of the reference form illustrated in FIG. 5A. The coil side distribution of the present embodiment is closer to a sine wave than in the reference form. Therefore, the rotating electric machine 10 of the present embodiment can achieve the same effects as those described in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by a 7-slot pitch in the first direction (arrow X direction) with respect to the one-phase band 41 of the first basic coil 51 is formed in a plurality of (three) slots 21c of which the position coordinates PP are 7, 8, and 9, and occupies 2.5 slots. The one-phase band 41 of the U phase of the second basic coil 52 disposed at a position moved by a 14-slot pitch in the first direction (arrow X direction) with respect to the one-phase band 41 of the first basic coil 51 is formed in a plurality of (three) slots 21c of which the position coordinates PP are 14, 15, and 16, and occupies 2.5 slots.

The one-phase band 41 of the U phase of the second basic coil 52 disposed at a position moved by a 21-slot pitch in the first direction (arrow X direction) with respect to the one-phase band 41 of the first basic coil 51 is formed in a plurality of (three) slots 21c of which the position coordinates PP are 21, 22, and 23, and occupies 2.5 slots. Therefore, the second coil side conductor number may be expressed by all 2.5×t0. In other words, in the present embodiment, the first coil side conductor number is the same as the second coil side conductor number. The above-described content may be similarly applied to other one-phase bands 41.

Fourth Embodiment

The present embodiment is different from the first embodiment in that the stator winding 22 includes a plurality of (four) basic coils 50. The present embodiment is different from the third embodiment in terms of a predetermined slot pitch. In the present embodiment, differences from the first embodiment and the third embodiment will be focused.

Figure 12A:
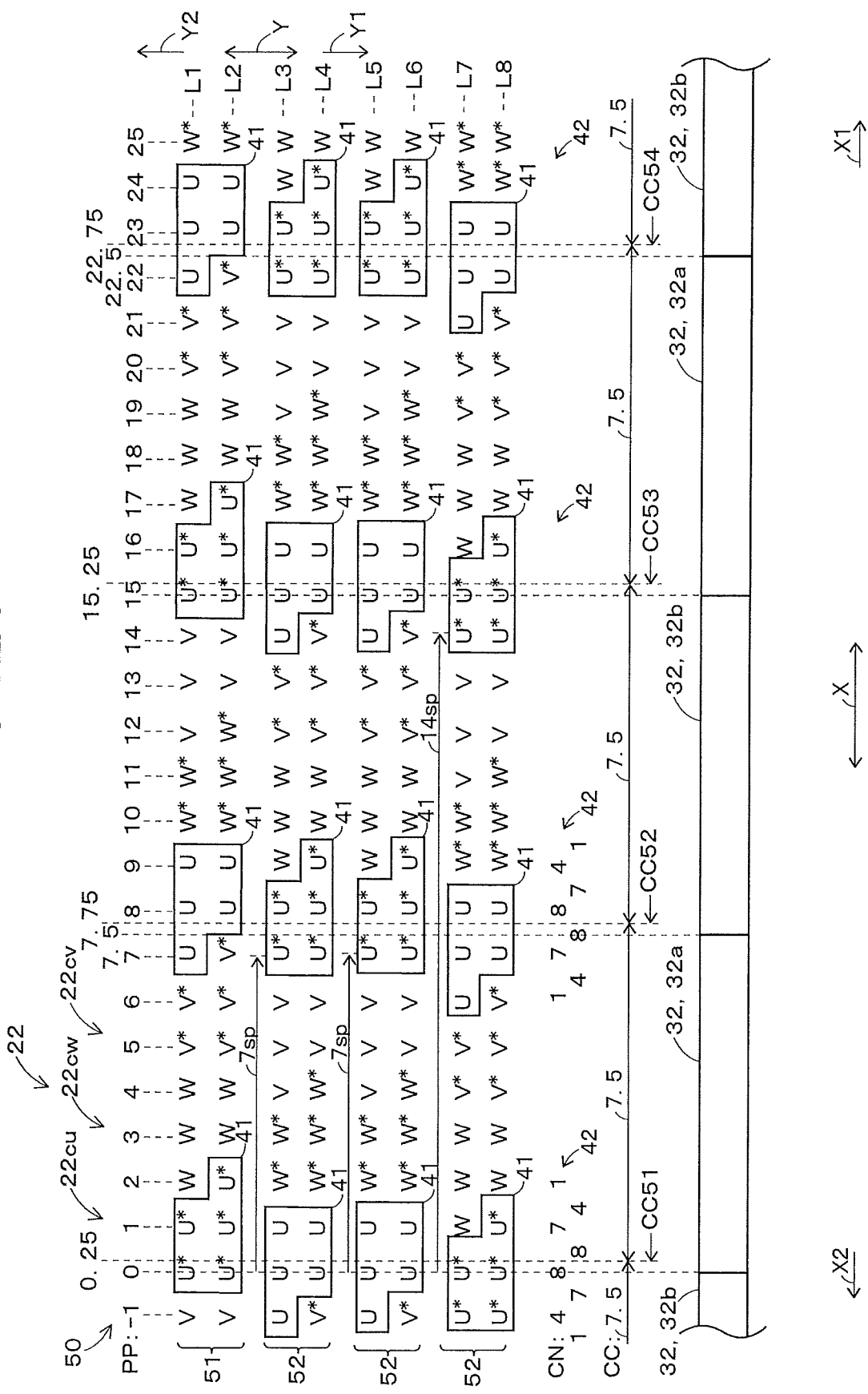
FIG. 12A is a schematic diagram illustrating an example of phase arrangement of a stator winding according to a fourth embodiment.

As illustrated in FIG. 12A, the stator winding 22 includes a plurality of (four) basic coils 50. Each of a plurality of (four) basic coils 50 has the same configuration as that of the above-described basic coil 50. A plurality of (four) basic coils 50 include a first basic coil 51 and a plurality of (three) second basic coils 52. Also in the present embodiment, each of a plurality of (three) second basic coils 52 is disposed at a position moved by a predetermined slot pitch in the movement direction (first direction (arrow X direction)) of the movable element 30 with respect to the first basic coil 51. Each of a plurality of (three) second basic coils 52 is disposed at a position moved in one direction (arrow X1 direction)) of the first direction (arrow X direction) with respect to the first basic coil 51. Consequently, the stator winding 22 of the present embodiment is formed in eight layers such as a first layer L1 to an eighth layer L8.

Also in the present embodiment, a movement unit amount is set to a 7-slot pitch. However, in one second basic coil 52 (the second basic coil 52 formed in the third layer L3 and the fourth layer L4) of a plurality of (three) second basic coils 52, a predetermined slot pitch is one time (7-slot pitch (7sp)) the 7-slot pitch which is the movement unit amount. In another second basic coil 52 (the second basic coil 52 formed in the fifth layer L5 and the sixth layer L6) of a plurality of (three) second basic coils 52, a predetermined slot pitch is one time (7-slot pitch (7sp)) the 7-slot pitch which is the movement unit amount. In the other second basic coil 52 (the second basic coil 52 formed in the seventh layer L7 and the eighth layer L8) of a plurality of (three) second basic coils 52, a predetermined slot pitch is twice (14-slot pitch (14sp)) the 7-slot pitch which is the movement unit amount. As mentioned above, in the present embodiment, n for defining a predetermined slot pitch is 1 and 2. The first sequence of numbers includes all natural number multiples from one time (7-slot pitch (7sp)) to twice (14-slot pitch (14sp)) larger than the 7-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 7, 8, and 9 in the second basic coil 52 formed in the third layer L3 and the fourth layer L4. For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 7, 8, and 9 in the second basic coil 52 formed in the fifth layer L5 and the sixth layer L6.

The one-phase band 41 of the U phase formed in a plurality of (three) slots 21c of which the position coordinates PP are 0, 1, and 2 in the first basic coil 51 is formed in a plurality of (three) slots 21c of which the position coordinates PP are 14, 15, and 16 in the second basic coil 52 formed in the seventh layer L7 and the eighth layer L8. The above-described content may be similarly applied to other one-phase bands 41 of the U phase.

In the present embodiment, the one-phase band 41 of the U phase of the first basic coil 51 is mixed with a plurality of (three) one-phase bands 41 of the U phase of plurality of (three) second basic coils 52 such that the mixed one-phase band 42 of the U phase is formed. For example, the one-phase band 41 of the U phase of the first basic coil 51 is formed in a plurality of (three) slots 21c of which the position coordinates PP are 0, 1, and 2. The one-phase band 41 of the U phase of the second basic coil 52 formed in the third layer L3 and the fourth layer L4 is formed in a plurality of (three) slots 21c of which the position coordinates PP are −1, 0, and 1. The one-phase band 41 of the U phase of the second basic coil 52 formed in the fifth layer L5 and the sixth layer L6 is formed in a plurality of (three) slots 21c of which the position coordinates PP are −1, 0, and 1.

The one-phase band 41 of the U phase of the second basic coil 52 formed in the seventh layer L7 and the eighth layer L8 is formed in a plurality of (three) slots 21c of which the position coordinates PP are −1, 0, and 1. In this case, the mixed one-phase band 42 of the U phase is formed in a plurality of (four) slots 21$c$ of which the position coordinates PP are −1, 0, 1, and 2. The number (the number of coil sides CN) of a plurality of coil sides 22$a$ forming the mixed one-phase band 42 of the U phase is twenty.

A plurality of (four) coil sides 22$a$ with the U phase are accommodated in the slot 21$c$ of which the position coordinate PP is −1. A plurality of (eight) coil sides 22$a$ with the U phase are accommodated in the slot 21$c$ of which the position coordinate PP is 0. A plurality of (seven) coil sides 22$a$ with the U phase are accommodated in the slot 21$c$ of which the position coordinate PP is 1. A single coil side 22$a$ with the U phase is accommodated in the slot 21$c$ of which the position coordinate PP is 2. Therefore, the coil side center CC51 of the mixed one-phase band 42 of the U phase formed in a plurality of (four) slots 21$c$ of which the position coordinates PP are −1, 0, 1, and 2 may be calculated, for example, on the basis of Equation 17 as follows, and the coil side center CC51 is 0.25.

$$CC51=(-1\times4+0\times8+1\times7+2\times1)/(4+8+7+1)=0.25 \quad \text{(Equation 17)}$$

Similarly, for example, the one-phase band 41 of the U phase of the first basic coil 51 is formed in a plurality of (three) slots 21$c$ of which the position coordinates PP are 7, 8, and 9. The one-phase band 41 of the U phase of the second basic coil 52 formed in the third layer L3 and the fourth layer L4 is formed in a plurality of (three) slots 21$c$ of which the position coordinates PP are 7, 8, and 9. The one-phase band 41 of the U phase of the second basic coil 52 formed in the fifth layer L5 and the sixth layer L6 is formed in a plurality of (three) slots 21$c$ of which the position coordinates PP are 7, 8, and 9.

The one-phase band 41 of the U phase of the second basic coil 52 formed in the seventh layer L7 and the eighth layer L8 is formed in a plurality of (three) slots 21$c$ of which the position coordinates PP are 6, 7, and 8. In this case, the mixed one-phase band 42 of the U phase is formed in a plurality of (four) slots 21$c$ of which the position coordinates PP are 6, 7, 8, and 9. The number (the number of coil sides CN) of a plurality of coil sides 22$a$ forming the mixed one-phase band 42 of the U phase is twenty.

A single coil side 22$a$ with the U phase is accommodated in the slot 21$c$ of which the position coordinate PP is 6. A plurality of (seven) coil sides 22$a$ with the U phase are accommodated in the slot 21$c$ of which the position coordinate PP is 7. A plurality of (eight) coil sides 22$a$ with the U phase are accommodated in the slot 21$c$ of which the position coordinate PP is 8. A plurality of (four) coil sides 22$a$ with the U phase are accommodated in the slot 21$c$ of which the position coordinate PP is 9. Therefore, the coil side center CC52 of the mixed one-phase band 42 of the U phase formed in a plurality of (four) slots 21$c$ of which the position coordinates PP are 6, 7, 8, and 9 may be calculated, for example, on the basis of Equation 18 as follows, and the coil side center CC52 is 7.75.

$$CC52=(6\times1+7\times7+8\times8+9\times4)/(1+7+8+4)=7.75 \quad \text{(Equation 18)}$$

The same may apply to the mixed one-phase band 42 of the U phase formed in a plurality of (four) slots 21$c$ of which the position coordinates PP are 14, 15, 16, and 17. Also in this case, the number (the number of coil sides CN) of a plurality of coil sides 22$a$ forming the mixed one-phase band 42 of the U phase is twenty. The coil side center CC53 of the mixed one-phase band 42 of the U phase in this case may be calculated, for example, on the basis of Equation 19 as follows, and the coil side center CC53 is 15.25.

$$CC53=(14\times4+15\times8+16\times7+17\times1)/(4+8+7+1)=15.25 \quad \text{(Equation 19)}$$

The same may apply to the mixed one-phase band 42 of the U phase formed in a plurality of (four) slots 21$c$ of which the position coordinates PP are 21, 22, 23, and 24. Also in this case, the number (the number of coil sides CN) of a plurality of coil sides 22$a$ forming the mixed one-phase band 42 of the U phase is twenty. The coil side center CC54 of the mixed one-phase band 42 of the U phase in this case may be calculated, for example, on the basis of Equation 20 as follows, and the coil side center CC54 is 22.75.

$$CC54=(21\times1+22\times7+23\times8+24\times4)/(1+7+8+4)=22.75 \quad \text{(Equation 20)}$$

On the basis of the above-described calculation results, a distance between the coil side center C51 and the coil side center CC52 of the mixed one-phase band 42 of the U phase is 7.5 (=7.75−0.25). A distance between the coil side center C52 and the coil side center CC53 of the mixed one-phase band 42 of the U phase is 7.5 (=15.25−7.75). A distance between the coil side center C53 and the coil side center CC54 of the mixed one-phase band 42 of the U phase is 7.5 (=22.75−15.25). As mentioned above, a distance between the coil side centers CC of the mixed one-phase bands 42 of the same phase (U phase) adjacent to each other in the movement direction (first direction (arrow X direction)) is 7.5, and is uniform. An adjacent coil side ratio in the present embodiment is 1 (=7.5/7.5). In other words, a distance between the coil side centers CC of the mixed one-phase band 42 of the same phase (U phase) adjacent to each other in the first direction (arrow X direction) is uniform.

In the present embodiment, the number (the number of coil sides CN) of a plurality of coil sides 22$a$ forming the mixed one-phase band 42 of the U phase is all twenty, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the present embodiment can achieve the same effects as those described in the first embodiment.

Figure 12B:
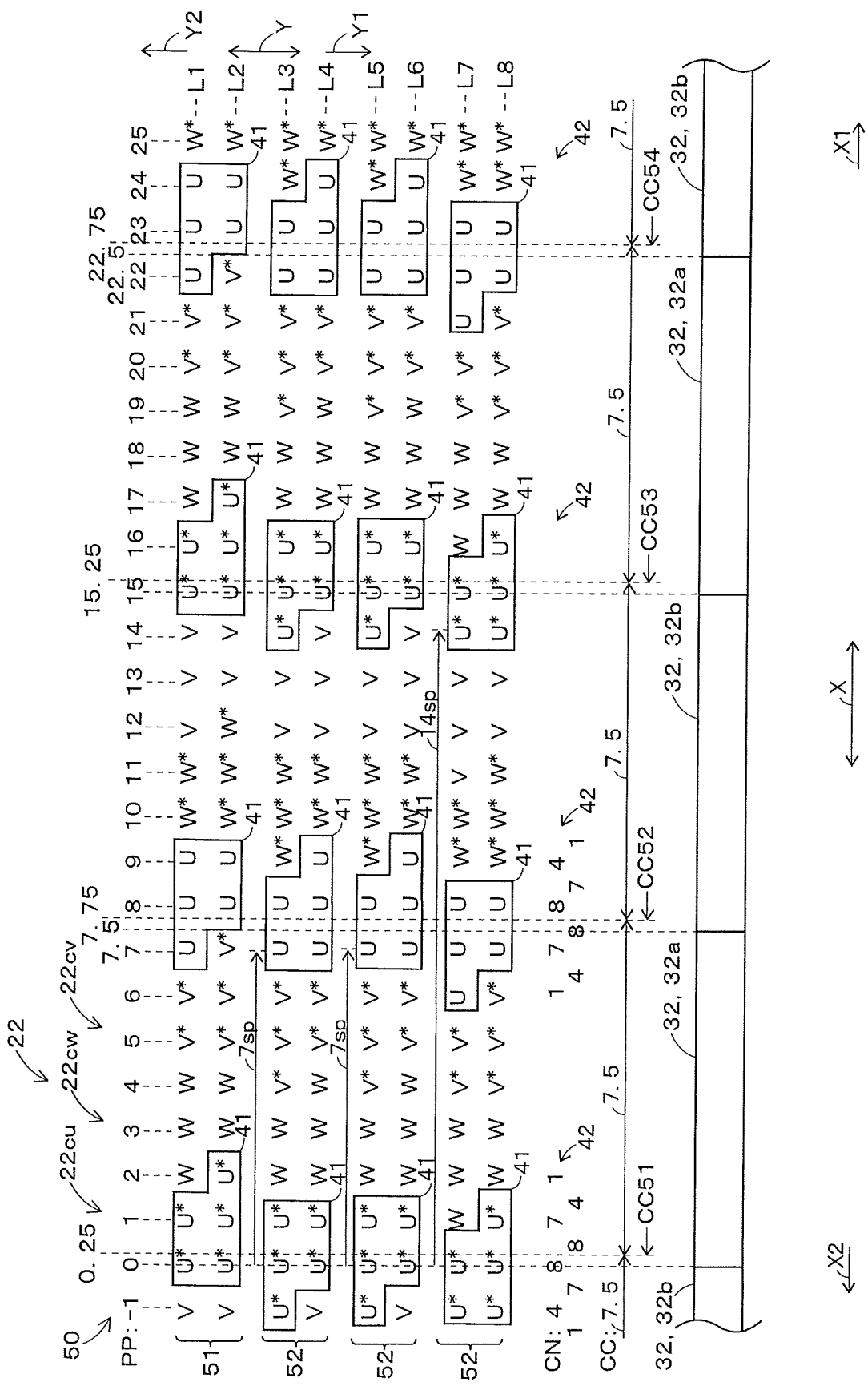
FIG. 12B is a schematic diagram illustrating an example of phase arrangement of the stator winding in which conduction directions of a plurality of coil sides are corrected in a second basic coil illustrated in FIG. 12A.

In the phase arrangement illustrated in FIG. 12A, coil sides 22$a$ having different conduction directions are mixed in a plurality of coil sides 22$a$ with the same phase accommodated in the same slot 21$c$. Thus, as illustrated in FIG. 12B, it is necessary to correct conduction directions of a plurality of coil sides 22$a$. For example, in the second basic coil 52 formed in the third layer L3 and the fourth layer L4 illustrated in FIG. 12B, conduction directions of a plurality of (five) coil sides 22$a$ with the U phase accommodated in a plurality of (three) slots 21$c$ of which the position coordinates PP are 7, 8, and 9 are inversed to the conduction directions illustrated in FIG. 12A.

In the second basic coil 52 formed in the fifth layer L5 and the sixth layer L6 illustrated in FIG. 12B, conduction directions of a plurality of (five) coil sides 22$a$ with the U phase accommodated in a plurality of (three) slots 21$c$ of which the position coordinates PP are 7, 8, and 9 are inversed to the conduction directions illustrated in FIG. 12A. The above-described content may be similarly applied to other one-phase bands 41 of the second basic coil 52 formed in the third layer L3 and the fourth layer L4 illustrated in FIG. 12B. The above-described content may be similarly applied to other one-phase bands 41 of the second basic coil 52 formed in the fifth layer L5 and the sixth layer L6 illustrated in FIG. 12B. In the second basic coil 52 formed in the seventh layer L7 and the eighth layer L8, conduction directions of the coil sides 22a are correct, and thus the conduction directions of the coil sides 22a are not required to be inversed.

Figure 12C:
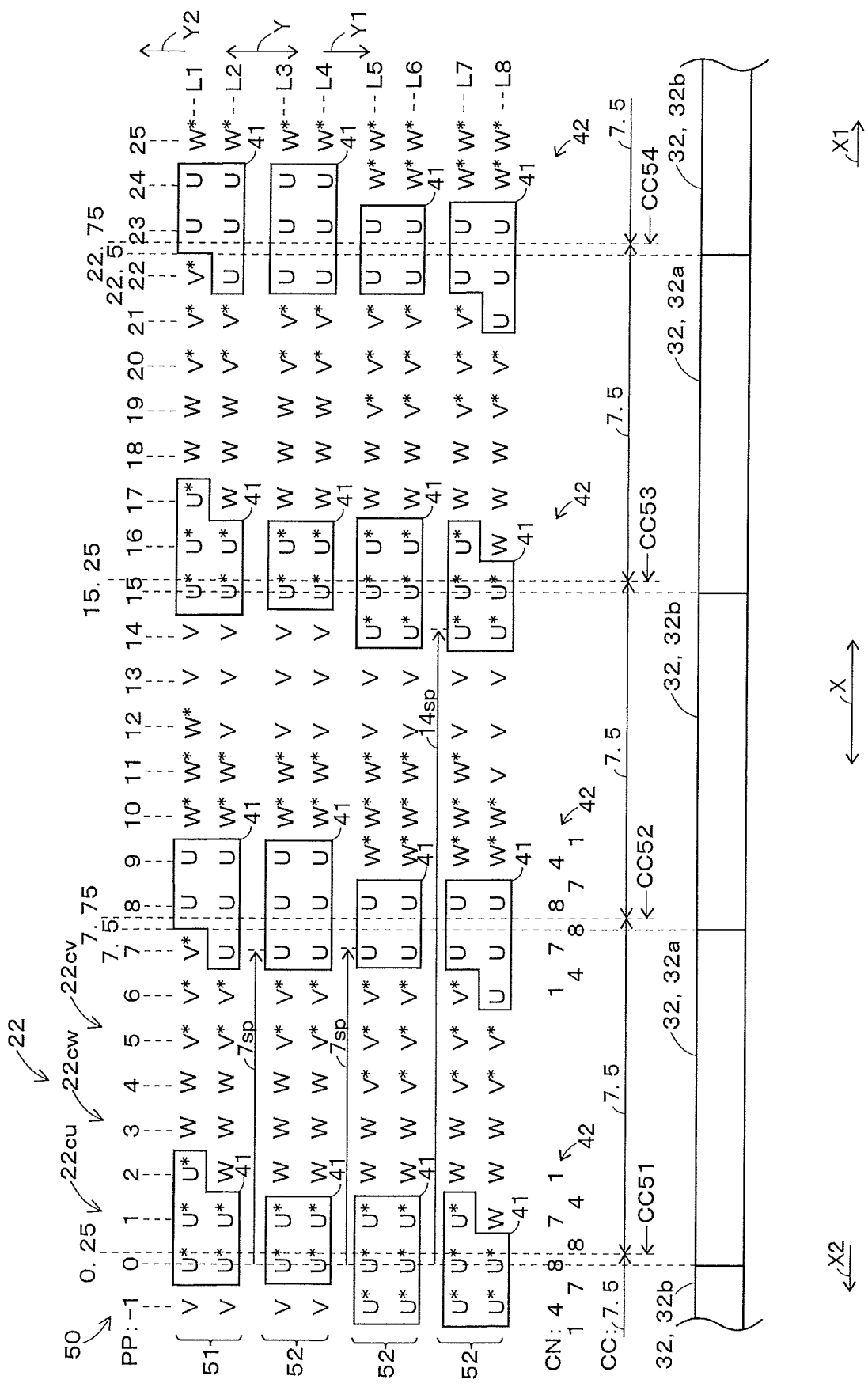
FIG. 12C is a schematic diagram illustrating an example of phase arrangement of the stator winding in which arrangement in a slot of the plurality of coil sides accommodated in the same slot is changed according to a modification form.

As illustrated in FIG. 12C, arrangement of a plurality of coil sides 22a accommodated in the same slot 21c may be changed in the slot 21c. For example, in the second basic coil 52 formed in the fifth layer L5 and the sixth layer L6, the coil side 22a with the U phase accommodated in the slot 21c of which the position coordinate PP is −1 is moved from the fifth layer L5 to the sixth layer L6. In the second basic coil 52 formed in the third layer L3 and the fourth layer L4, the coil side 22a with the U phase accommodated in the slot 21c of which the position coordinate PP is −1 is moved from the third layer L3 to the fifth layer L5.

In the second basic coil 52 formed in the seventh layer L7 and the eighth layer L8, the coil side 22a with the U phase accommodated in the slot 21c of which the position coordinate PP is 1 is moved from the eighth layer L8 to the seventh layer L7. In the first basic coil 51, the coil side 22a with the U phase accommodated in the slot 21c of which the position coordinate PP is 2 is moved from the second layer L2 to the first layer L1. The above-described content may be similarly applied to other mixed one-phase bands 42.

A coil side distribution width of the mixed one-phase band 42 of the U phase formed in a plurality of (four) slots 21c of which the position coordinates PP are −1, 0, 1, and 2 is four slots. A coil side distribution width of the mixed one-phase band 42 of the U phase formed in a plurality of (four) slots 21c of which the position coordinates PP are 6, 7, 8, and 9 is four slots. An effective coil side distribution width of the mixed one-phase band 42 of the U phase formed in a plurality of (four) slots 21c of which the position coordinates PP are −1, 0, 1, and 2 is 4.5 slots. An effective coil side distribution width of the mixed one-phase band 42 of the U phase formed in a plurality of (four) slots 21c of which the position coordinates PP are 6, 7, 8, and 9 is 4.5 slots.

As mentioned above, the effective coil side distribution width (4.5 slots) of the present embodiment is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 13:
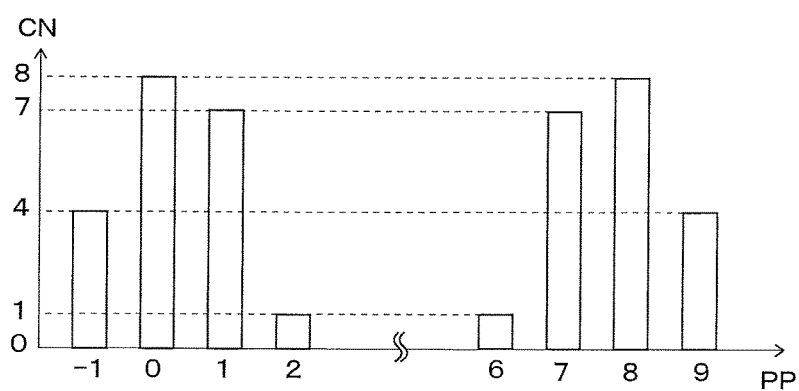
FIG. 13 is a schematic diagram illustrating an example of a coil side distribution according to the fourth embodiment.

FIG. 13 illustrates an example of a coil side distribution of the present embodiment (a form in which the stator winding 22 includes a plurality of (four) basic coils 50). As illustrated in FIG. 12A, for example, a plurality of (four) coil sides 22a with the U phase are accommodated in the slot 21c of which the position coordinate PP is −1. Thus, as illustrated in FIG. 13, the number (the number of coil sides CN) of coil sides 22a with the U phase at the position coordinate PP of −1 is four.

Similarly, a plurality of (eight) coil sides 22a with the U phase are accommodated in the slot 21c of which the position coordinate PP is 0, and the number (the number of coil sides CN) of coil sides 22a with the U phase at the position coordinate PP of 0 is eight. A plurality of (seven) coil sides 22a with the U phase are accommodated in the slot 21c of which the position coordinate PP is 1, and the number (the number of coil sides CN) of coil sides 22a with the U phase at the position coordinate PP of 1 is seven. A single coil side 22a with the U phase is accommodated in the slot 21c of which the position coordinate PP is 2, and the number (the number of coil sides CN) of coil sides 22a with the U phase at the position coordinate PP of 2 is one.

A single coil side 22a with the U phase is accommodated in the slot 21c of which the position coordinate PP is 6, and the number (the number of coil sides CN) of coil sides 22a with the U phase at the position coordinate PP of 6 is one. A plurality of (seven) coil sides 22a with the U phase are accommodated in the slot 21c of which the position coordinate PP is 7, and the number (the number of coil sides CN) of coil sides 22a with the U phase at the position coordinate PP of 7 is seven. A plurality of (eight) coil sides 22a with the U phase are accommodated in the slot 21c of which the position coordinate PP is 8, and the number (the number of coil sides CN) of coil sides 22a with the U phase at the position coordinate PP of 8 is eight. A plurality of (four) coil sides 22a with the U phase are accommodated in the slot 21c of which the position coordinate PP is 9, and the number (the number of coil sides CN) of coil sides 22a with the U phase at the position coordinate PP of 9 is four.

The coil side distribution of the present embodiment illustrated in FIG. 13 is wider in the first direction (arrow X direction) and is gentler than the coil side distribution of the reference form illustrated in FIG. 5A. The coil side distribution of the present embodiment is closer to a sine wave than in the reference form. Therefore, the rotating electric machine 10 of the present embodiment can achieve the same effects as those described in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by a 7-slot pitch in the first direction (arrow X direction) with respect to the one-phase band 41 of the first basic coil 51 is formed in a plurality of (three) slots 21c of which the position coordinates PP are 7, 8, and 9, and occupies five (=2.5×2) slots. The one-phase band 41 of the U phase of the second basic coil 52 disposed at a position moved by a 14-slot pitch in the first direction (arrow X direction) with respect to the one-phase band 41 of the first basic coil 51 is formed in a plurality of (three) slots 21c of which the position coordinates PP are 14, 15, and 16, and occupies 2.5 slots.

As mentioned above, in the present embodiment, one second coil side conductor number (in this case, expressed by 2.5×t0) of a plurality of (two) second coil side conductor numbers is the same as the first coil side conductor number. In contrast, the other second coil side conductor number (in this case, expressed by 5×t0) of a plurality of (two) second coil side conductor numbers is different from the first coil side conductor number, and is twice the first coil side conductor number. The above-described content may be similarly applied to other one-phase bands 41.

Here, a sequence of numbers in which the number of elements is m (where m is a natural number of 3 or more) is referred to as a second sequence of numbers, the elements such as enumerated coil side conductor numbers including the first coil side conductor number and at least one second coil side conductor number (in the present embodiment, a plurality of (two) second coil side conductor numbers) in which predetermined slot pitches are enumerated in an ascending order for each predetermined slot pitch. In the present embodiment, m is 3, and the number of elements of the second sequence of numbers is three. Elements of the second sequence of numbers may be enumerated as 2.5×t0, 5×t0, and 2.5×t0, and a ratio among the respective elements of the second sequence of numbers is 1:2:1.

In the present embodiment, in the second sequence of numbers, a coil side conductor number of a k-th (where k is a natural number of m/2 or less) element is the same as a coil side conductor number of a (m−k+1)-th element. Specifically, in the present embodiment, m is 3, and thus k is 1. A coil side conductor number of the first element is 2.5×t0. A coil side conductor number of the third (=3−1+1) element is 2.5×t0. Therefore, the coil side conductor number of the first element is the coil side conductor number of the third element. In the second sequence of numbers, the coil side conductor number (5×t0) of the second element is set to be twice the coil side conductor number (2.5×t0) of the first element and the coil side conductor number of the third element.

In the present embodiment, in the second sequence of numbers, a coil side conductor number increases from the first element to a j-th (where j is m/2, and is a natural number obtained by rounding up a decimal place when m/2 is not a natural number), and a coil side conductor number decreases from the j-th element to the m-th element. Specifically, in the present embodiment, m is 3, and thus j is 2. The coil side conductor number of the first element is 2.5×t0, and the coil side conductor number of the second element is 5×t0. Therefore, in the second sequence of numbers, the coil side conductor number increases from the first element to the second element. On the other hand, the coil side conductor number of the second element is 5×t0, and the coil side conductor number of the third element is 2.5×t0. Therefore, in the second sequence of numbers, the coil side conductor number decreases from the second element to the third element.

The above-described content may be similarly applied to a natural number of 4 or more. For example, a case where m is 6 is supposed. A first element to a sixth element of the second sequence of numbers are assumed to be an element EL1, an element EL2, an element EL3, an element EL4, an element EL5, and an element EL6 in this order. Here, it is assumed that the element EL1 and the element EL6 are the same as each other in terms of a coil side conductor number, the element EL2 and the element EL5 are the same as each other in terms of a coil side conductor number, and the element EL3 and the element EL4 are the same as each other in terms of a coil side conductor number. It is assumed that the coil side conductor number increases from the first element EL1 to the third element EL3, and the coil side conductor number decreases from the fourth element EL4 to the sixth element EL6.

Since m is 6, k is a natural number of 3 (=6/2) or less. As is assumed above, the coil side conductor numbers of the first element EL1 and the sixth (=6−1+1) element EL6 are the same as each other. The coil side conductor numbers of the second element EL2 and the fifth (=6−2+1) element EL5 are the same as each other. The coil side conductor numbers of the third element EL3 and the fourth (=6−3+1) element EL4 are the same as each other. Since m is 6, j is 3. As is assumed above, the coil side conductor number increases from the first element EL1 to the third element EL3. On the other hand, the coil side conductor number decreases from the fourth element EL4 to the sixth element EL6.

As mentioned above, in the second sequence of numbers, preferably, a coil side conductor number of a k-th (where k is a natural number of m/2 or less) element is the same as a coil side conductor number of a (m−k+1)-th element. Preferably, in the second sequence of numbers, a coil side conductor number increases from the first element to a j-th (where j is m/2, and is a natural number obtained by rounding up a decimal place when m/2 is not a natural number), and a coil side conductor number decreases from the j-th element to the m-th element. In the present embodiment, m is 3. In this case, in the second sequence of numbers, preferably, a coil side conductor number of the second element is set to be twice the coil side conductor number of the first element and the coil side conductor number of the third element.

Figure 14:
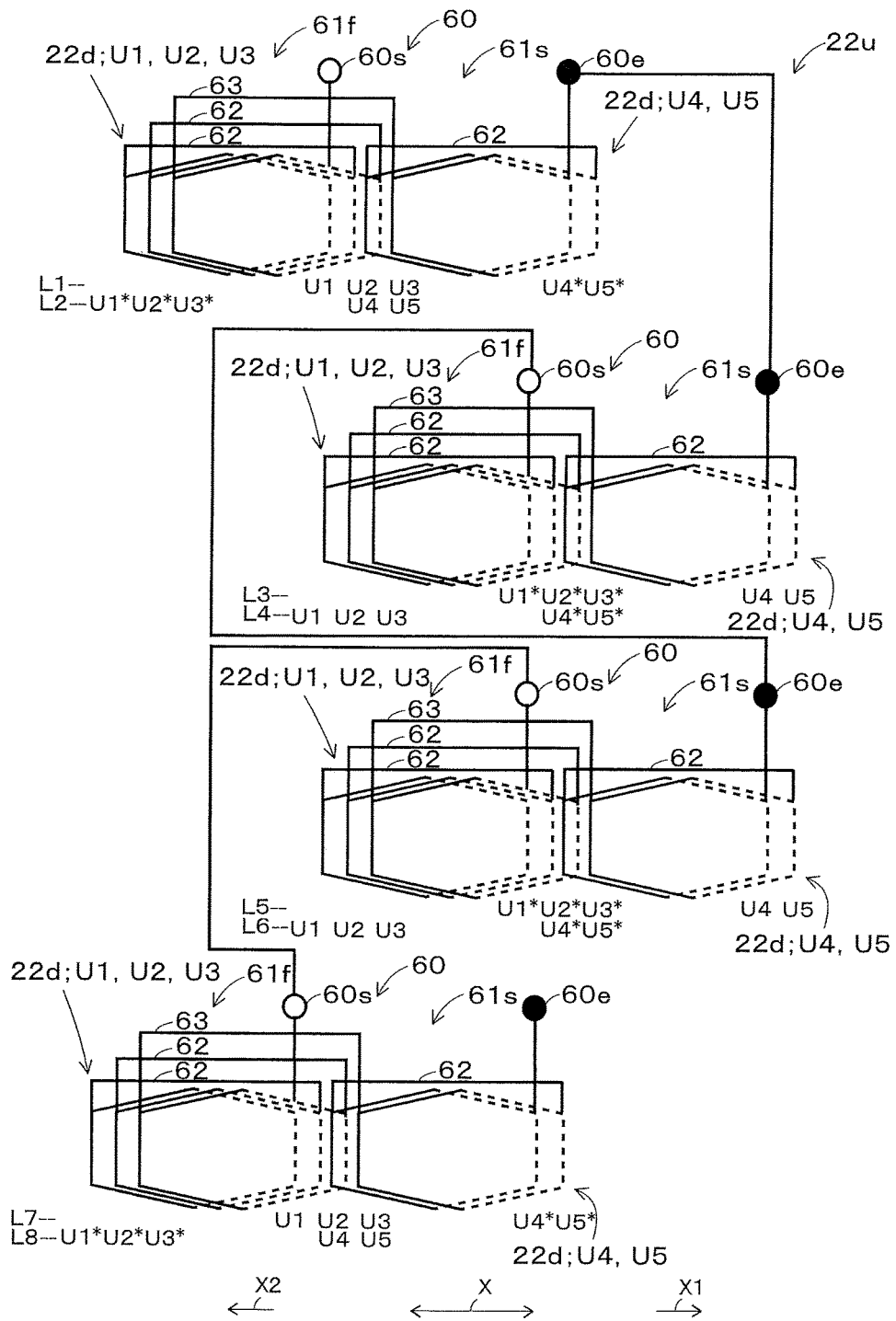
FIG. 14 is a schematic diagram illustrating a configuration example of a phase unit coil based on two-layer double windings according to the fourth embodiment.

In the present embodiment, a case is supposed in which the phase unit coil $22u$ is formed on the basis of two-layer double windings. In this case, as illustrated in FIG. 14, in the phase unit coil $22u$, a plurality of (four) pole pair coils 60 are connected in series to each other. For example, in the phase unit coil $22u$, the winding end portion $60e$ of a single pole pair coil 60 of the first basic coil 51 is electrically connected to the winding end portion $60e$ of a single pole pair coil 60 of the second basic coil 52 formed in the third layer L3 and the fourth layer L4. The winding start portion $60s$ of a single pole pair coil 60 of the second basic coil 52 formed in the third layer L3 and the fourth layer L4 is electrically connected to the winding end portion $60e$ of a single pole pair coil 60 of the second basic coil 52 formed in the fifth layer L5 and the sixth layer L6. The winding start portion $60s$ of a single pole pair coil 60 of the second basic coil 52 formed in the fifth layer L5 and the sixth layer L6 is electrically connected to the winding start portion $60s$ of a single pole pair coil 60 of the second basic coil 52 formed in the seventh layer L7 and the eighth layer L8. Consequently, a plurality of (twenty) unit coils $22d$ are connected in series to each other.

The second basic coil 52 formed in the third layer L3 and the fourth layer L4 and the second basic coil 52 formed in the fifth layer L5 and the sixth layer L6 are inserted into a plurality of the same slots $21c$. Thus, a serial conductor number of the two second basic coils 52 may be twice the serial conductor number of the second basic coil 52 formed in the third layer L3 and the fourth layer L4. Therefore, a ratio among a serial conductor number of a single pole pair coil 60 of the first basic coil 51 and serial conductor numbers of pole pair coils 60 of a plurality of respective (three) second basic coils 52 is 1:2:1. Here, the serial conductor number is obtained by enumerating predetermined slot pitches in an ascending order for each predetermined slot pitch when a predetermined slot pitch of the first basic coil 51 is set to 0. A ratio among serial conductor numbers matches a ratio among the respective elements of the second sequence of numbers.

The phase unit coil $22u$ may be formed to have the same configuration as that of the phase unit coil $22ua$ (a configuration using two types of pole pair coils 60 and $60a$) illustrated in FIG. 7C. In this case, for example, the first basic coil 51 formed in the first layer L1 and the second layer L2 and the second basic coil 52 formed in the seventh layer L7 and the eighth layer L8 may be formed by using the pole pair coils 60. The second basic coil 52 formed in the third layer L3 and the fourth layer L4 and the second basic coil 52 formed in the fifth layer L5 and the sixth layer L6 may be formed by using the pole pair coils $60a$ illustrated in FIG. 7C.

Fifth Embodiment

The present embodiment is different from the first embodiment in that a movement unit amount is an 8-slot pitch. In the present embodiment, differences from the first embodiment will be focused.

Figure 15A:
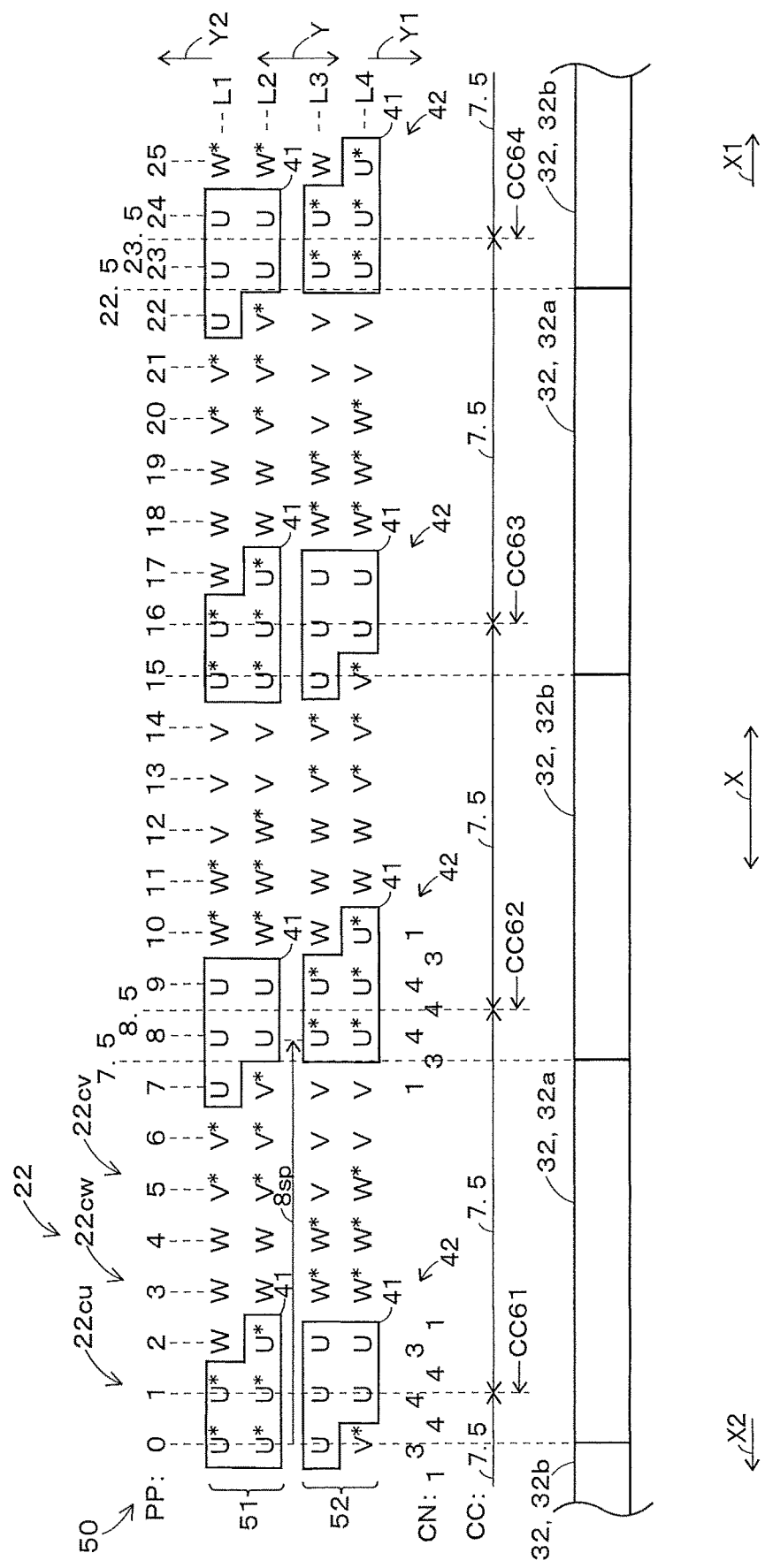
FIG. 15A is a schematic diagram illustrating an example of phase arrangement of a stator winding according to a fifth embodiment.

As illustrated in FIG. 15A, the stator winding 22 includes a plurality of (two) basic coils 50. Each of a plurality of (two) basic coils 50 has the same configuration as that of the described basic coil 50. A plurality of (two) basic coils 50 include a first basic coil 51 and a single second basic coil 52. Also in the present embodiment, the single second basic coil 52 is disposed at a position moved by a predetermined slot pitch in the movement direction (first direction (arrow X direction)) of the movable element 30 with respect to the first basic coil 51. The single second basic coil 52 is disposed at a position moved in one direction (arrow X1 direction) of the first direction (arrow X direction) with respect to the first basic coil 51. Consequently, the stator winding 22 of the present embodiment is formed in four layers such as the first layer L1 to the fourth layer L4.

In the present embodiment, the movement unit amount is set to an 8-slot pitch which is an integer greater than and closest to the number of slots per pole (in the present embodiment, 7.5). The predetermined slot pitch is one time (8-slot pitch (8sp)) the 8-slot pitch which is the movement unit amount. As mentioned above, n for defining a predetermined slot pitch is 1. The first sequence of numbers includes one time (8-slot pitch (8sp)) the 8-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 7, 8, and 9 in the single second basic coil 52. The above-described content may be similarly applied to other one-phase bands 41 of the U phase. In this case, the mixed one-phase band 42 of the U phase is formed in a plurality of (three) slots 21c of which the position coordinates PP are 0, 1, and 2. The number (the number of coil sides CN) of a plurality of coil sides 22a forming the mixed one-phase band 42 of the U phase is ten. The coil side center CC61 of the mixed one-phase band 42 may be calculated, for example, on the basis of Equation 21 as follows, and the coil side center CC61 is 1.

$$CC61=(0\times3+1\times4+2\times3)/(3+4+3)=1 \quad \text{(Equation 21)}$$

The mixed one-phase band 42 of the U phase is formed in a plurality of (four) slots 21c of which the position coordinates PP are 7, 8, 9, and 10. The number (the number of coil sides CN) of a plurality of coil sides 22a forming the mixed one-phase band 42 of the U phase is ten. The coil side center CC62 of the mixed one-phase band 42 may be calculated, for example, on the basis of Equation 22 as follows, and the coil side center CC62 is 8.5.

$$CC62=(7\times1+8\times4+9\times4+10\times1)/(1+4+4+1)=8.5 \quad \text{(Equation 22)}$$

In this case, the mixed one-phase band 42 of the U phase is formed in a plurality of (three) slots 21c of which the position coordinates PP are 15, 16, and 17. The number (the number of coil sides CN) of a plurality of coil sides 22a forming the mixed one-phase band 42 of the U phase is ten. The coil side center CC63 of the mixed one-phase band 42 may be calculated, for example, on the basis of Equation 23 as follows, and the coil side center CC63 is 16.

$$CC63=(15\times3+16\times4+17\times3)/(3+4+3)=16 \quad \text{(Equation 23)}$$

The mixed one-phase band 42 of the U phase is formed in a plurality of (four) slots 21c of which the position coordinates PP are 22, 23, 24, and 25. The number (the number of coil sides CN) of a plurality of coil sides 22a forming the mixed one-phase band 42 of the U phase is ten. The coil side center CC64 of the mixed one-phase band 42 may be calculated, for example, on the basis of Equation 24 as follows, and the coil side center CC64 is 23.5.

$$CC64=(22\times1+23\times4+24\times4+25\times1)/(1+4+4+1)=23.5 \quad \text{(Equation 24)}$$

On the basis of the above-described calculation results, a distance between the coil side center CC61 and the coil side center CC62 of the mixed one-phase band 42 of the U phase is 7.5 (=8.5−1). A distance between the coil side center CC62 and the coil side center CC63 of the mixed one-phase band 42 of the U phase is 7.5 (=16−8.5). A distance between the coil side center CC63 and the coil side center CC64 of the mixed one-phase band 42 of the U phase is 7.5 (=23.5−16). As mentioned above, a distance between the coil side centers CC of the mixed one-phase bands 42 of the same phase (U phase) adjacent to each other in the movement direction (first direction (arrow X direction)) is 7.5, and is uniform. An adjacent coil side ratio in the present embodiment is 1 (=7.5/7.5). In other words, a distance between the coil side centers CC of the mixed one-phase band 42 of the same phase (U phase) adjacent to each other in the first direction (arrow X direction) is uniform.

In the present embodiment, the number (the number of coil sides CN) of a plurality of coil sides 22a forming the mixed one-phase band 42 of the U phase is all ten, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the present embodiment can achieve the same effects as those described in the first embodiment.

Figure 15B:
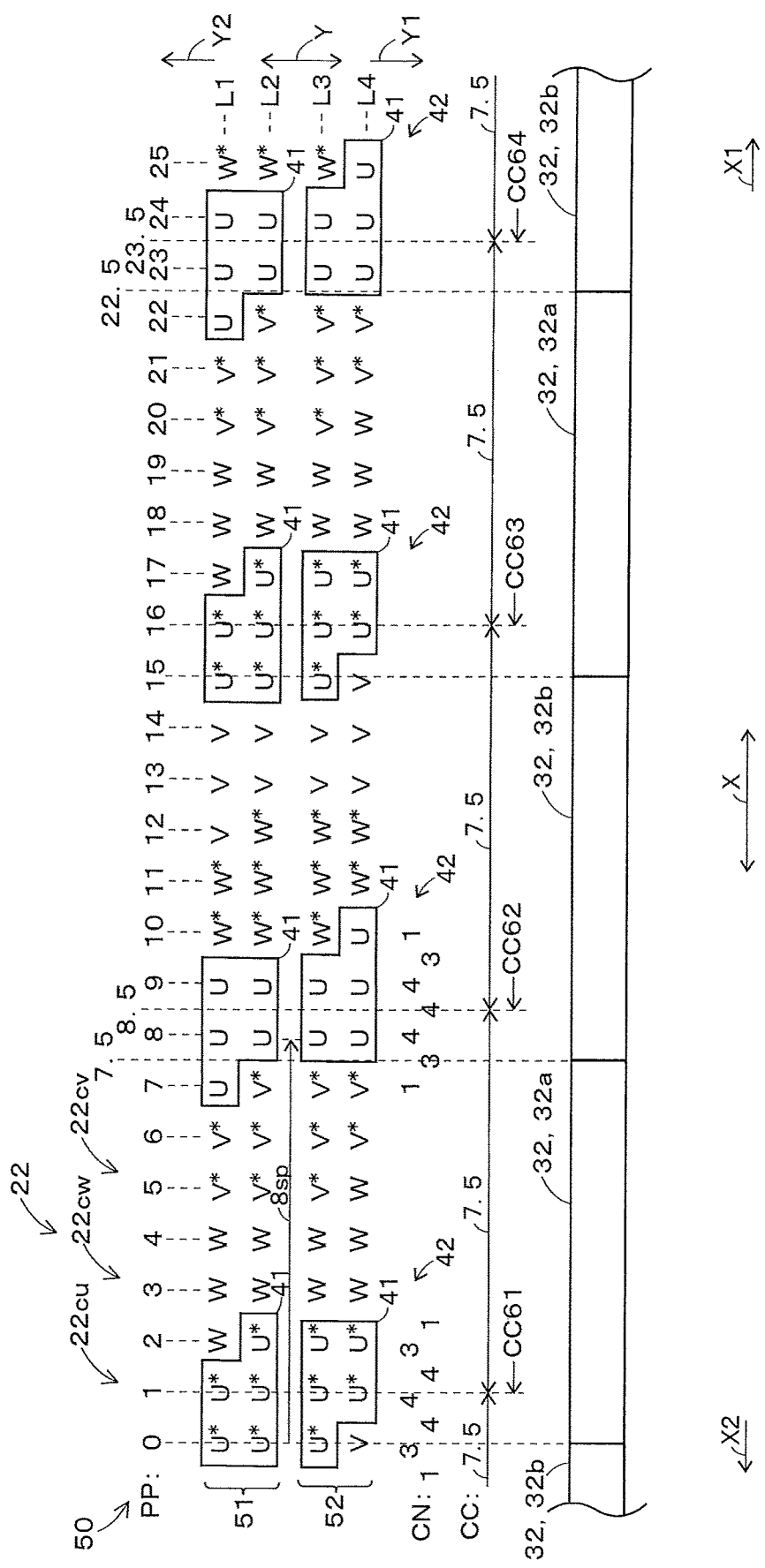
FIG. 15B is a schematic diagram illustrating an example of phase arrangement of the stator winding in which conduction directions of a plurality of coil sides are corrected in a second basic coil illustrated in FIG. 15A.

In the phase arrangement illustrated in FIG. 15A, coil sides 22a having different conduction directions are mixed in a plurality of coil sides 22a with the same phase accommodated in the same slot 21c. Thus, as illustrated in FIG. 15B, it is necessary to correct conduction directions of a plurality of coil sides 22a. For example, in the second basic coil 52 formed in the third layer L3 and the fourth layer L4 illustrated in FIG. 15B, conduction directions of a plurality of (five) coil sides 22a with the U phase accommodated in a plurality of (three) slots 21c of which the position coordinates PP are 8, 9, and 10 are inversed to the conduction directions illustrated in FIG. 15A. The above-described content may be similarly applied to other one-phase bands 41 of the second basic coil 52 formed in the third layer L3 and the fourth layer L4 illustrated in FIG. 15B.

A coil side distribution width of the mixed one-phase band 42 of the U phase formed in a plurality of (three) slots 21c of which the position coordinates PP are 0, 1, and 2 is three slots. A coil side distribution width of the mixed one-phase band 42 of the U phase formed in a plurality of (four) slots 21c of which the position coordinates PP are 7, 8, 9, and 10 is four slots. An effective coil side distribution width of the mixed one-phase band 42 of the U phase formed in a plurality of (three) slots 21c of which the position coordinates PP are 0, 1, and 2 is four slots. An effective coil side distribution width of the mixed one-phase band 42 of the U phase formed in a plurality of (four) slots 21c of which the position coordinates PP are 7, 8, 9, and 10 is four slots.

As mentioned above, the effective coil side distribution width (four slots) of the present embodiment is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 16:
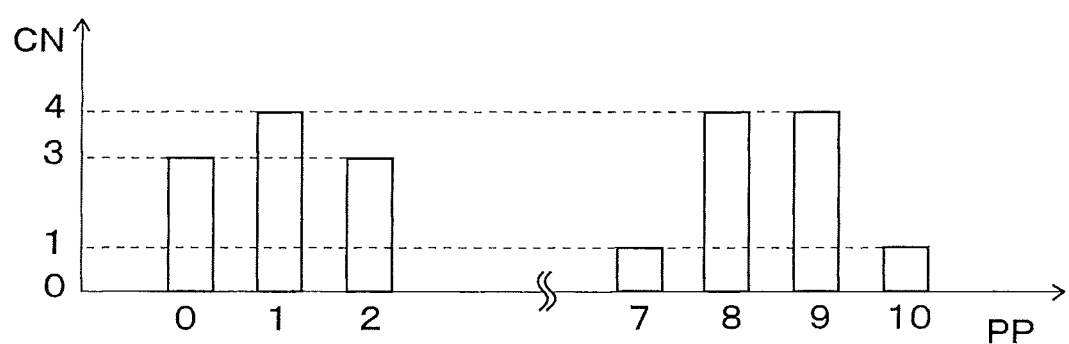
FIG. 16 is a schematic diagram illustrating an example of a coil side distribution according to the fifth embodiment.

FIG. 16 illustrates an example of a coil side distribution of the present embodiment. As illustrated in FIG. 15A, for example, a plurality of (three) coil sides 22a with the U phase are accommodated in the slot 21c of which the position coordinate PP is 0. Thus, as illustrated in FIG. 16, the number (the number of coil sides CN) of coil sides 22a with the U phase at the position coordinate PP of 0 is three. Similarly, a plurality of (four) coil sides 22a with the U phase are accommodated in the slot 21c of which the position coordinate PP is 1, and the number (the number of coil sides CN) of coil sides 22a with the U phase at the position coordinate PP of 1 is four. A plurality of (three) coil sides 22a with the U phase are accommodated in the slot 21c of which the position coordinate PP is 2, and the number (the number of coil sides CN) of coil sides 22a with the U phase at the position coordinate PP of 2 is three.

A single coil side 22a with the U phase is accommodated in the slot 21c of which the position coordinate PP is 7, and the number (the number of coil sides CN) of coil sides 22a with the U phase at the position coordinate PP of 7 is one. A plurality of (four) coil sides 22a with the U phase are accommodated in the slot 21c of which the position coordinate PP is 8, and the number (the number of coil sides CN) of coil sides 22a with the U phase at the position coordinate PP of 8 is four. A plurality of (four) coil sides 22a with the U phase are accommodated in the slot 21c of which the position coordinate PP is 9, and the number (the number of coil sides CN) of coil sides 22a with the U phase at the position coordinate PP of 9 is four. A single coil side 22a with the U phase is accommodated in the slot 21c of which the position coordinate PP is 10, and the number (the number of coil sides CN) of coil sides 22a with the U phase at the position coordinate PP of 10 is one.

The coil side distribution of the present embodiment illustrated in FIG. 16 is wider in the first direction (arrow X direction) and is gentler than the coil side distribution of the reference form illustrated in FIG. 5A. The coil side distribution of the present embodiment is closer to a sine wave than in the reference form. Therefore, the rotating electric machine 10 of the present embodiment can achieve the same effects as those described in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by an 8-slot pitch in the first direction (arrow X direction) with respect to the one-phase band 41 of the first basic coil 51 is formed in a plurality of (three) slots 21c of which the position coordinates PP are 8, 9, and 10, and occupies 2.5 slots. Therefore, the second coil side conductor number may be expressed by 2.5×t0. In other words, also in the present embodiment, the first coil side conductor number is the same as the second coil side conductor number. The above-described content may be similarly applied to other one-phase bands 41.

Figure 17A:
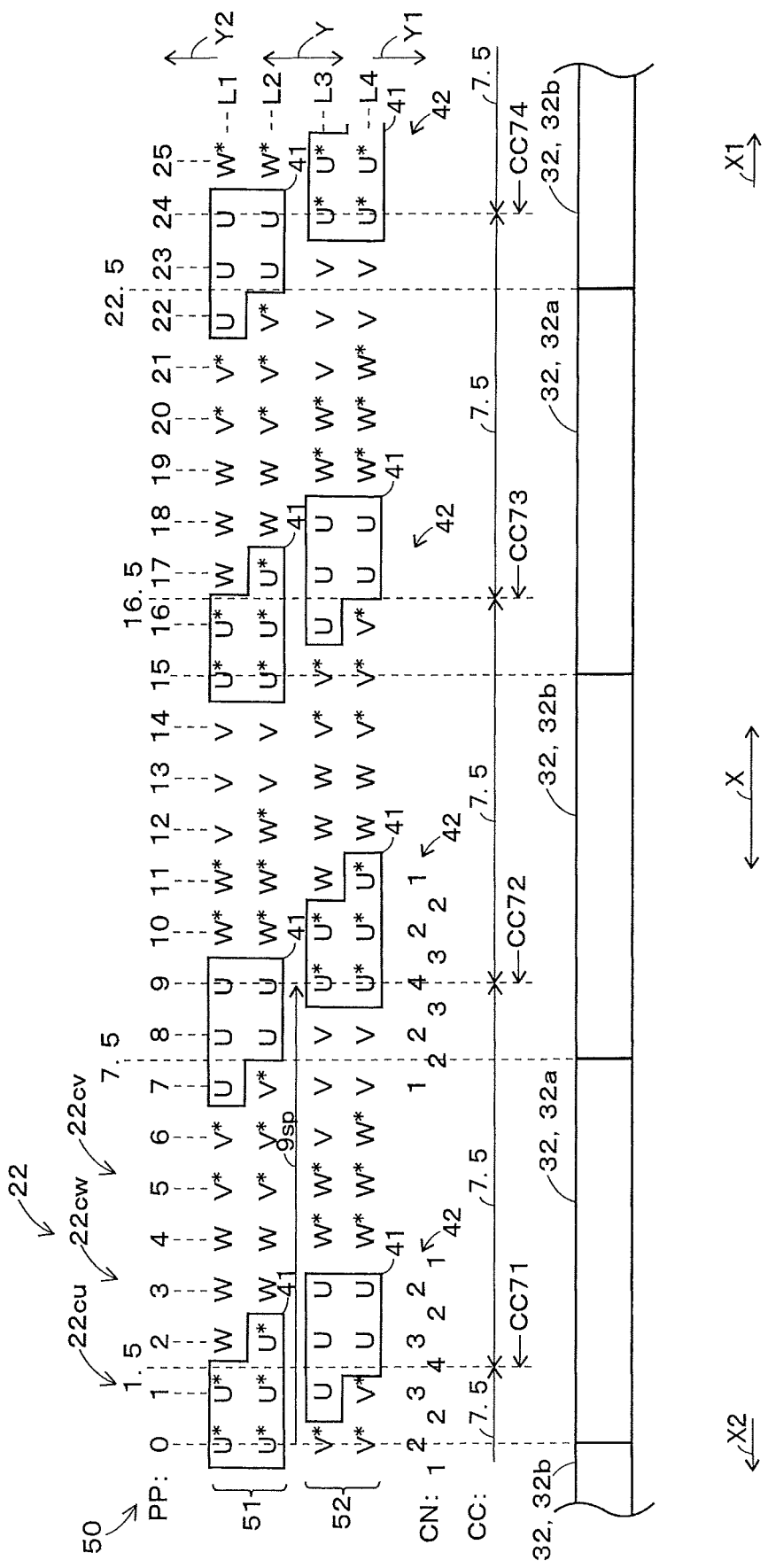
FIG. 17A is a schematic diagram illustrating an example of phase arrangement of a stator winding according to a comparison form.

As illustrated in FIG. 17A, a stator winding 22 of a comparison form includes a plurality of (two) basic coils 50. Each of a plurality of (two) basic coils 50 has the same configuration as that of the described basic coil 50. A plurality of (two) basic coils 50 include a first basic coil 51 and a single second basic coil 52. Also in the comparison form, the single second basic coil 52 is disposed at a position moved by a predetermined slot pitch in the movement direction (first direction (arrow X direction)) of the movable element 30 with respect to the first basic coil 51. The single second basic coil 52 is disposed at a position moved in one direction (arrow X1 direction) of the first direction (arrow X direction) with respect to the first basic coil 51. Consequently, the stator winding 22 of the comparison form is formed in four layers such as the first layer L1 to the fourth layer L4.

In the present embodiment, the movement unit amount is set to a 9-slot pitch which is an integer greater than an integer closest to the number of slots per pole (in the reference form, 7.5). The predetermined slot pitch is one time (9-slot pitch (9sp)) the 9-slot pitch which is the movement unit amount. As mentioned above, in the comparison form, n for defining a predetermined slot pitch is 1. The first sequence of numbers includes one time (9-slot pitch (9sp)) the 9-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 9, 10, and 11 in the single second basic coil 52. The above-described content may be similarly applied to other one-phase bands 41 of the U phase. In this case, the mixed one-phase band 42 of the U phase is formed in a plurality of (four) slots 21c of which the position coordinates PP are 0, 1, 2, and 3. The number (the number of coil sides CN) of a plurality of coil sides 22a forming the mixed one-phase band 42 of the U phase is ten. The coil side center CC71 of the mixed one-phase band 42 may be calculated, for example, on the basis of Equation 25 as follows, and the coil side center CC71 is 1.5.

$$CC71=(0\times2+1\times3+2\times3+3\times2)/(2+3+3+2)=1.5 \quad \text{(Equation 25)}$$

The mixed one-phase band 42 of the U phase is formed in a plurality of (five) slots 21c of which the position coordinates PP are 7, 8, 9, 10, and 11. The number (the number of coil sides CN) of a plurality of coil sides 22a forming the mixed one-phase band 42 of the U phase is ten. The coil side center CC72 of the mixed one-phase band 42 may be calculated, for example, on the basis of Equation 26 as follows, and the coil side center CC72 is 9.

$$CC72=(7\times1+8\times2+9\times4+10\times2+11\times1)/(1+2+4+2+1)=9 \quad \text{(Equation 26)}$$

In this case, the mixed one-phase band 42 of the U phase is formed in a plurality of (four) slots 21c of which the position coordinates PP are 15, 16, 17, and 18. The number (the number of coil sides CN) of a plurality of coil sides 22a forming the mixed one-phase band 42 of the U phase is ten. The coil side center CC73 of the mixed one-phase band 42 may be calculated, for example, on the basis of Equation 27 as follows, and the coil side center CC73 is 16.5.

$$CC73=(15\times2+16\times3+17\times3+18\times2)/(2+3+3+2)=16.5 \quad \text{(Equation 27)}$$

The mixed one-phase band 42 of the U phase is formed in a plurality of (five) slots 21c of which the position coordinates PP are 22, 23, 24, 25, and 26. The number (the number of coil sides CN) of a plurality of coil sides 22a forming the mixed one-phase band 42 of the U phase is ten. The coil side center CC74 of the mixed one-phase band 42 may be calculated, for example, on the basis of Equation 28 as follows, and the coil side center CC74 is 24.

$CC74=(22\times1+23\times2+24\times4+25\times2+26\times1)/(1+2+4+2+1)=24$ (Equation 28)

On the basis of the above-described calculation results, a distance between the coil side center CC71 and the coil side center CC72 of the mixed one-phase band 42 of the U phase is 7.5 (=9-1.5). A distance between the coil side center CC72 and the coil side center CC73 of the mixed one-phase band 42 of the U phase is 7.5 (=16.5-9). A distance between the coil side center CC73 and the coil side center CC74 of the mixed one-phase band 42 of the U phase is 7.5 (=24-16.5). As mentioned above, a distance between the coil side centers CC of the mixed one-phase bands 42 of the same phase (U phase) adjacent to each other in the movement direction (first direction (arrow X direction)) is 7.5, and is uniform. An adjacent coil side ratio in the present embodiment is 1 (=7.5/7.5). In other words, a distance between the coil side centers CC of the mixed one-phase band 42 of the same phase (U phase) adjacent to each other in the first direction (arrow X direction) is uniform.

In the comparison form, the number (the number of coil sides CN) of a plurality of coil sides 22a forming the mixed one-phase band 42 of the U phase is all ten, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the comparison form can achieve the same effects as those described in the first embodiment.

Figure 17B:
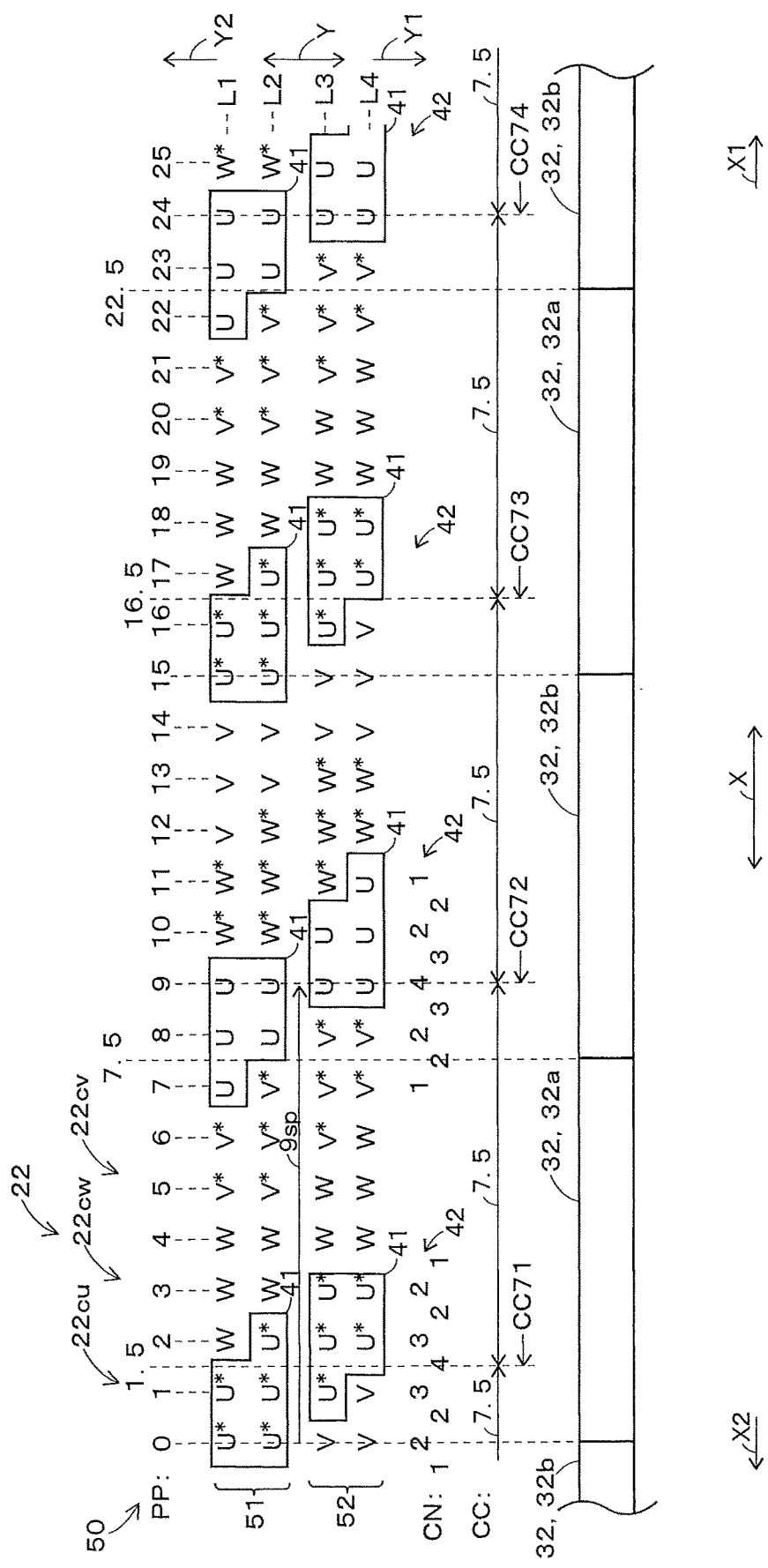
FIG. 17B is a schematic diagram illustrating an example of phase arrangement of the stator winding in which conduction directions of a plurality of coil sides are corrected in a second basic coil illustrated in FIG. 17A.

In the phase arrangement illustrated in FIG. 17A, coil sides 22a having different conduction directions are mixed in a plurality of coil sides 22a with the same phase accommodated in the same slot 21c. Thus, as illustrated in FIG. 17B, it is necessary to correct conduction directions of a plurality of coil sides 22a. For example, in the second basic coil 52 formed in the third layer L3 and the fourth layer L4 illustrated in FIG. 17B, conduction directions of a plurality of (five) coil sides 22a with the U phase accommodated in a plurality of (three) slots 21c of which the position coordinates PP are 9, 10, and 11 are inversed to the conduction directions illustrated in FIG. 17A. The above-described content may be similarly applied to other one-phase bands 41 of the second basic coil 52 formed in the third layer L3 and the fourth layer L4 illustrated in FIG. 17B.

A coil side distribution width of the mixed one-phase band 42 of the U phase formed in a plurality of (four) slots 21c of which the position coordinates PP are 0, 1, 2, and 3 is four slots. A coil side distribution width of the mixed one-phase band 42 of the U phase formed in a plurality of (five) slots 21c of which the position coordinates PP are 7, 8, 9, 10, and 11 is five slots. An effective coil side distribution width of the mixed one-phase band 42 of the U phase formed in a plurality of (four) slots 21c of which the position coordinates PP are 0, 1, 2, and 3 is five slots. An effective coil side distribution width of the mixed one-phase band 42 of the U phase formed in a plurality of (five) slots 21c of which the position coordinates PP are 7, 8, 9, 10, and 11 is five slots.

As mentioned above, the effective coil side distribution width (five slots) of the comparison form is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 18:
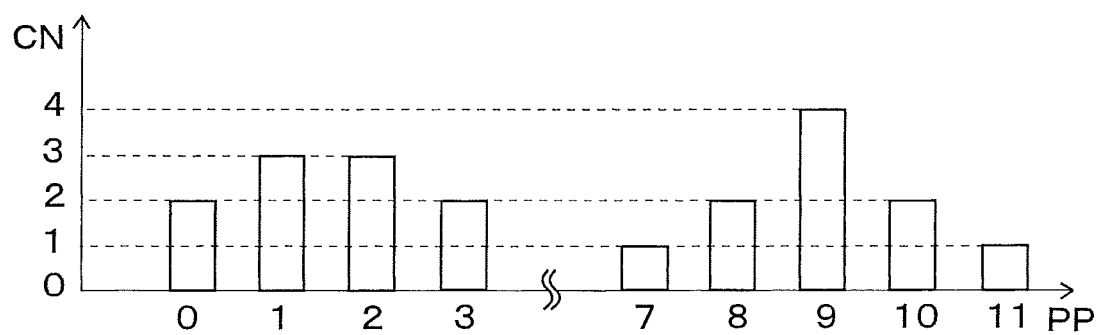
FIG. 18 is a schematic diagram illustrating an example of a coil side distribution according to a modification form.

FIG. 18 illustrates an example of a coil side distribution of the present embodiment. As illustrated in FIG. 17A, for example, a plurality of (two) coil sides 22a with the U phase are accommodated in the slot 21c of which the position coordinate PP is O. Thus, as illustrated in FIG. 18, the number (the number of coil sides CN) of coil sides 22a with the U phase at the position coordinate PP of 0 is two. Similarly, a plurality of (three) coil sides 22a with the U phase are accommodated in the slot 21c of which the position coordinate PP is 1, and the number (the number of coil sides CN) of coil sides 22a with the U phase at the position coordinate PP of 1 is three. A plurality of (three) coil sides 22a with the U phase are accommodated in the slot 21c of which the position coordinate PP is 2, and the number (the number of coil sides CN) of coil sides 22a with the U phase at the position coordinate PP of 2 is three. A plurality of (two) coil sides 22a with the U phase are accommodated in the slot 21c of which the position coordinate PP is 3, and the number (the number of coil sides CN) of coil sides 22a with the U phase at the position coordinate PP of 3 is two.

A single coil side 22a with the U phase is accommodated in the slot 21c of which the position coordinate PP is 7, and the number (the number of coil sides CN) of coil sides 22a with the U phase at the position coordinate PP of 7 is one. A plurality of (two) coil sides 22a with the U phase are accommodated in the slot 21c of which the position coordinate PP is 8, and the number (the number of coil sides CN) of coil sides 22a with the U phase at the position coordinate PP of 8 is two. A plurality of (four) coil sides 22a with the U phase are accommodated in the slot 21c of which the position coordinate PP is 9, and the number (the number of coil sides CN) of coil sides 22a with the U phase at the position coordinate PP of 9 is four. A plurality of (two) coil sides 22a with the U phase are accommodated in the slot 21c of which the position coordinate PP is 10, and the number (the number of coil sides CN) of coil sides 22a with the U phase at the position coordinate PP of 10 is two. A single coil side 22a with the U phase is accommodated in the slot 21c of which the position coordinate PP is 11, and the number (the number of coil sides CN) of coil sides 22a with the U phase at the position coordinate PP of 11 is one.

The coil side distribution of the comparison form illustrated in FIG. 18 is wider in the first direction (arrow X direction) and is gentler than the coil side distribution of the reference form illustrated in FIG. 5A. The coil side distribution of the comparison form is closer to a sine wave than in the reference form. Therefore, the rotating electric machine 10 of the comparison form can achieve the same effects as those described in the first embodiment.

As mentioned above, if an effective coil side distribution width increases, and a coil side distribution is widened in the first direction (arrow X direction), output torque of the rotating electric machine 10 is reduced. The effective coil side distribution width (five slots) of the comparison form increases more than the effective coil side distribution width (four slots) of the first embodiment. Thus, output torque of the rotating electric machine 10 of the comparison form is reduced more than in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by a 9-slot pitch in the first direction (arrow X direction) with respect to the one-phase band 41 of the first basic coil 51 is formed in a plurality of (three) slots 21c of which the position coordinates PP are 9, 10, and 11, and occupies 2.5 slots. Therefore, the second coil side conductor number may be expressed by 2.5×t0. In other words, also in the comparison form, the first coil side conductor number is the same as the second coil side conductor number. The above-described content may be similarly applied to other one-phase bands 41.

As illustrated in FIG. 19A, a stator winding 22 of another comparison form includes a plurality of (two) basic coils 50. Each of a plurality of (two) basic coils 50 has the same configuration as that of the described basic coil 50. A plurality of (two) basic coils 50 include a first basic coil 51 and a single second basic coil 52. Also in the comparison form, the single second basic coil 52 is disposed at a position moved by a predetermined slot pitch in the movement direction (first direction (arrow X direction)) of the movable element 30 with respect to the first basic coil 51. The single second basic coil 52 is disposed at a position moved in one direction (arrow X1 direction) of the first direction (arrow X direction) with respect to the first basic coil 51. Consequently, the stator winding 22 of the comparison form is formed in four layers such as the first layer L1 to the fourth layer L4.

In the present embodiment, the movement unit amount is set to a 6-slot pitch which is an integer smaller than and closest to the number of slots per pole (in the reference form, 7.5). The predetermined slot pitch is one time (6-slot pitch (6sp)) the 6-slot pitch which is the movement unit amount. As mentioned above, in the comparison form, n for defining a predetermined slot pitch is 1. The first sequence of numbers includes one time (6-slot pitch (6sp)) the 6-slot pitch which is the movement unit amount.

For example, the one-phase band 41 of the U phase formed in a plurality of (three) slots 21c of which the position coordinates PP are 0, 1, and 2 in the first basic coil 51 is formed in a plurality of (three) slots 21c of which the position coordinates PP are 6, 7, and 8 in the single second basic coil 52. The above-described content may be similarly applied to other one-phase bands 41 of the U phase. In this case, the mixed one-phase band 42 of the U phase is formed in a plurality of (five) slots 21c of which the position coordinates PP are −2, −1, 0, 1, and 2. The number (the number of coil sides CN) of a plurality of coil sides 22a forming the mixed one-phase band 42 of the U phase is ten. The coil side center CC81 of the mixed one-phase band 42 may be calculated, for example, on the basis of Equation 29 as follows, and the coil side center CC81 is 0.

$$CC81=(-2\times 1-1\times 2+0\times 4+1\times 2+2\times 1)/(1+2+4+2+1)=0 \quad \text{(Equation 29)}$$

The mixed one-phase band 42 of the U phase is formed in a plurality of (four) slots 21c of which the position coordinates PP are 6, 7, 8, and 9. The number (the number of coil sides CN) of a plurality of coil sides 22a forming the mixed one-phase band 42 of the U phase is ten. The coil side center CC82 of the mixed one-phase band 42 may be calculated, for example, on the basis of Equation 30 as follows, and the coil side center CC82 is 7.5.

$$CC82=(6\times 2+7\times 3+8\times 3+9\times 2)/(2+3+3+2)=7.5 \quad \text{(Equation 30)}$$

In this case, the mixed one-phase band 42 of the U phase is formed in a plurality of (five) slots 21c of which the position coordinates PP are 13, 14, 15, 16, and 17. The number (the number of coil sides CN) of a plurality of coil sides 22a forming the mixed one-phase band 42 of the U phase is ten. The coil side center CC83 of the mixed one-phase band 42 may be calculated, for example, on the basis of Equation 31 as follows, and the coil side center CC83 is 15.

$$CC83=(13\times 1+14\times 2+15\times 4+16\times 2+17\times 1)/(1+2+4+2+1)$$
$$=15 \quad \text{(Equation 31)}$$

The mixed one-phase band 42 of the U phase is formed in a plurality of (four) slots 21c of which the position coordinates PP are 21, 22, 23, and 24. The number (the number of coil sides CN) of a plurality of coil sides 22a forming the mixed one-phase band 42 of the U phase is ten. The coil side center CC84 of the mixed one-phase band 42 may be calculated, for example, on the basis of Equation 32 as follows, and the coil side center CC84 is 22.5.

$$CC84=(21\times 2+22\times 3+23\times 3+24\times 2)/(2+3+3+2)=22.5 \quad \text{(Equation 32)}$$

On the basis of the above-described calculation results, a distance between the coil side center CC81 and the coil side center CC82 of the mixed one-phase band 42 of the U phase is 7.5 (=7.5−0). A distance between the coil side center CC82 and the coil side center CC83 of the mixed one-phase band 42 of the U phase is 7.5 (=15−7.5). A distance between the coil side center CC83 and the coil side center CC84 of the mixed one-phase band 42 of the U phase is 7.5 (=22.5−15). As mentioned above, a distance between the coil side centers CC of the mixed one-phase bands 42 of the same phase (U phase) adjacent to each other in the movement direction (first direction (arrow X direction)) is 7.5, and is uniform. An adjacent coil side ratio in the present embodiment is 1 (=7.5/7.5). In other words, a distance between the coil side centers CC of the mixed one-phase band 42 of the same phase (U phase) adjacent to each other in the first direction (arrow X direction) is uniform.

In the comparison form, the number (the number of coil sides CN) of a plurality of coil sides 22a forming the mixed one-phase band 42 of the U phase is all ten, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. Rotational symmetry of the magnetomotive force distribution is improved. Therefore, the rotating electric machine 10 of the comparison form can achieve the same effects as those described in the first embodiment.

Figure 19B:
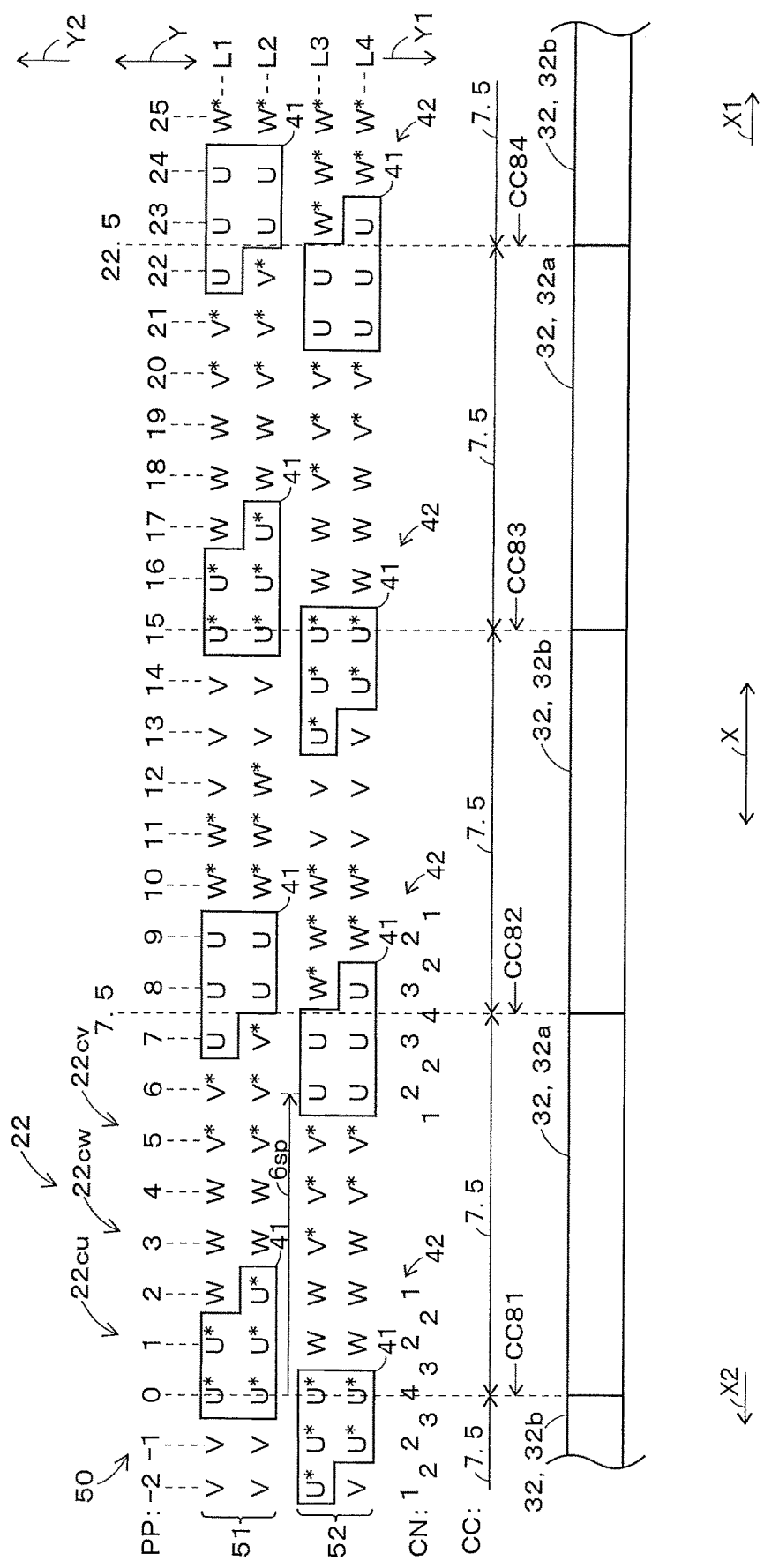
FIG. 19B is a schematic diagram illustrating an example of phase arrangement of the stator winding in which conduction directions of a plurality of coil sides are corrected in a second basic coil illustrated in FIG. 19A.

In the phase arrangement illustrated in FIG. 19A, coil sides 22a having different conduction directions are mixed in a plurality of coil sides 22a with the same phase accommodated in the same slot 21c. Thus, as illustrated in FIG. 19B, it is necessary to correct conduction directions of a plurality of coil sides 22a. For example, in the second basic coil 52 formed in the third layer L3 and the fourth layer L4 illustrated in FIG. 19B, conduction directions of a plurality of (five) coil sides 22a with the U phase accommodated in a plurality of (three) slots 21c of which the position coordinates PP are 6, 7, and 8 are inversed to the conduction directions illustrated in FIG. 19A. The above-described content may be similarly applied to other one-phase bands 41 of the second basic coil 52 formed in the third layer L3 and the fourth layer L4 illustrated in FIG. 19B. In the comparison form, in the same manner as in the form illustrated in FIG. 4C, arrangement in a slot 21c of a plurality of coil sides 22a accommodated in the same slot 21c may be changed.

A coil side distribution width of the mixed one-phase band 42 of the U phase formed in a plurality of (five) slots 21c of which the position coordinates PP are −2, −1, 0, 1, and 2 is five slots. A coil side distribution width of the mixed one-phase band 42 of the U phase formed in a plurality of (four) slots 21c of which the position coordinates PP are 6, 7, 8, and 9 is four slots. An effective coil side distribution width of the mixed one-phase band 42 of the U phase formed in a plurality of (five) slots 21c of which the position coordinates PP are −2, −1, 0, 1, and 2 is five slots. An effective coil side distribution width of the mixed one-phase band 42 of the U phase formed in a plurality of (four) slots 21c of which the position coordinates PP are 6, 7, 8, and 9 is five slots.

As mentioned above, the effective coil side distribution width (five slots) of the comparison form is increased compared with the effective coil side distribution width (3.5 slots) of the reference form (a form in which the stator winding 22 includes a single basic coil 50). Thus, a magnetomotive force distribution of the present embodiment is gentler than a magnetomotive force distribution of the reference form.

Figure 20:
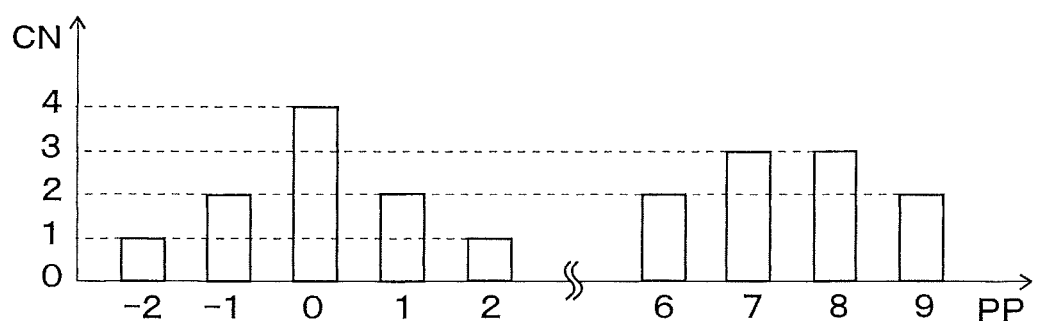
FIG. 20 is a schematic diagram illustrating an example of a coil side distribution according to another modification form.

FIG. 20 illustrates an example of a coil side distribution of the present embodiment. As illustrated in FIG. 19A, for example, a single coil side 22a with the U phase is accommodated in the slot 21c of which the position coordinate PP is −2. Thus, as illustrated in FIG. 20, the number (the number of coil sides CN) of coil sides 22a with the U phase at the position coordinate PP of −2 is one. Similarly, a plurality of (two) coil sides 22a with the U phase are accommodated in the slot 21c of which the position coordinate PP is −1, and the number (the number of coil sides CN) of coil sides 22a with the U phase at the position coordinate PP of −1 is two. A plurality of (four) coil sides 22a with the U phase are accommodated in the slot 21c of which the position coordinate PP is 0, and the number (the number of coil sides CN) of coil sides 22a with the U phase at the position coordinate PP of 0 is four. A plurality of (two) coil sides 22a with the U phase are accommodated in the slot 21c of which the position coordinate PP is 1, and the number (the number of coil sides CN) of coil sides 22a with the U phase at the position coordinate PP of 1 is two. A single coil side 22a with the U phase is accommodated in the slot 21c of which the position coordinate PP is 2, and the number (the number of coil sides CN) of coil sides 22a with the U phase at the position coordinate PP of 2 is one.

A plurality of (two) coil sides 22a with the U phase are accommodated in the slot 21c of which the position coordinate PP is 6, and the number (the number of coil sides CN) of coil sides 22a with the U phase at the position coordinate PP of 6 is two. A plurality of (three) coil sides 22a with the U phase are accommodated in the slot 21c of which the position coordinate PP is 7, and the number (the number of coil sides CN) of coil sides 22a with the U phase at the position coordinate PP of 7 is three. A plurality of (three) coil sides 22a with the U phase are accommodated in the slot 21c of which the position coordinate PP is 8, and the number (the number of coil sides CN) of coil sides 22a with the U phase at the position coordinate PP of 8 is three. A plurality of (two) coil sides 22a with the U phase are accommodated in the slot 21c of which the position coordinate PP is 9, and the number (the number of coil sides CN) of coil sides 22a with the U phase at the position coordinate PP of 9 is two.

The coil side distribution of the comparison form illustrated in FIG. 20 is wider in the first direction (arrow X direction) and is gentler than the coil side distribution of the reference form illustrated in FIG. 5A. The coil side distribution of the comparison form is closer to a sine wave than in the reference form. Therefore, the rotating electric machine 10 of the comparison form can achieve the same effects as those described in the first embodiment.

As described above, if an effective coil side distribution width increases, and a coil side distribution is widened in the first direction (arrow X direction), output torque of the rotating electric machine 10 is reduced. The effective coil side distribution width (five slots) of the comparison form increases more than the effective coil side distribution width (four slots) of the first embodiment. Thus, output torque of the rotating electric machine 10 of the comparison form is reduced more than in the first embodiment.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by a 6-slot pitch in the first direction (arrow X direction) with respect to the one-phase band 41 of the first basic coil 51 is formed in a plurality of (three) slots 21c of which the position coordinates PP are 6, 7, and 8, and occupies 2.5 slots. Therefore, the second coil side conductor number may be expressed by 2.5×t0. In other words, also in the comparison form, the first coil side conductor number and the second coil side conductor number are uniform. The above-described content may be similarly applied to other one-phase bands 41.

As described in the two comparison forms, if a movement unit amount is increased or decreased to an integer (in this case, 7 or 8) closest to the number of slots per pole (in this case, 7.5), an effective coil side distribution width is further increased, and a coil side distribution is further widened in the first direction (arrow X direction). As a result, output torque of the rotating electric machine 10 is reduced. Thus, a movement unit amount is preferably an integer (in this case, 7 or 8) closest to the number of slots per pole (in this case, 7.5). In the first embodiment, a movement unit amount is set to a 7-slot pitch. In the present embodiment, a movement unit amount is set to an 8-slot pitch. In any of the second embodiment, the third embodiment, and the fourth embodiment, a movement unit amount may be set to an 8-slot pitch.

As illustrated in FIGS. 18 and 20, the coil side distributions have a relationship of being deviated relative to each other by electrical angles of 180° in terms of phase. This indicates that, if a conduction reference point is deviated by 180°, an equivalent state is realized. In other words, both of the comparison forms are different from each other in terms of movement unit amount, but can achieve the equivalent effect regarding a reduction of vibration and noise. Specifically, a movement unit amount in the comparison form illustrated in FIG. 18 is set to a 9-slot pitch which is one slot pitch larger than the 8-slot pitch which is integer closest to the number of slots per pole (7.5). A movement unit amount in the comparison form illustrated in FIG. 20 is set to a 6-slot pitch which is one slot pitch smaller than the 7-slot pitch which is integer closest to the number of slots per pole (7.5). As mentioned above, in a case where there are two integers (in this case, the 9-slot pitch or the 6-slot pitch) having the same difference from the number of slots per pole (7.5) as movement unit amount candidates, it is possible to achieve the same effect regarding a reduction of vibration and noise even if a movement unit amount is either of the two integers. However, as a difference between a movement unit amount and the number of slots per pole (7.5) increases, output torque of the rotating electric machine 10 is reduced.

Sixth Embodiment

The present embodiment is different from the first embodiment in that a movement unit amount is a 1-slot pitch. In the present embodiment, differences from the first embodiment will be focused.

Figure 21:
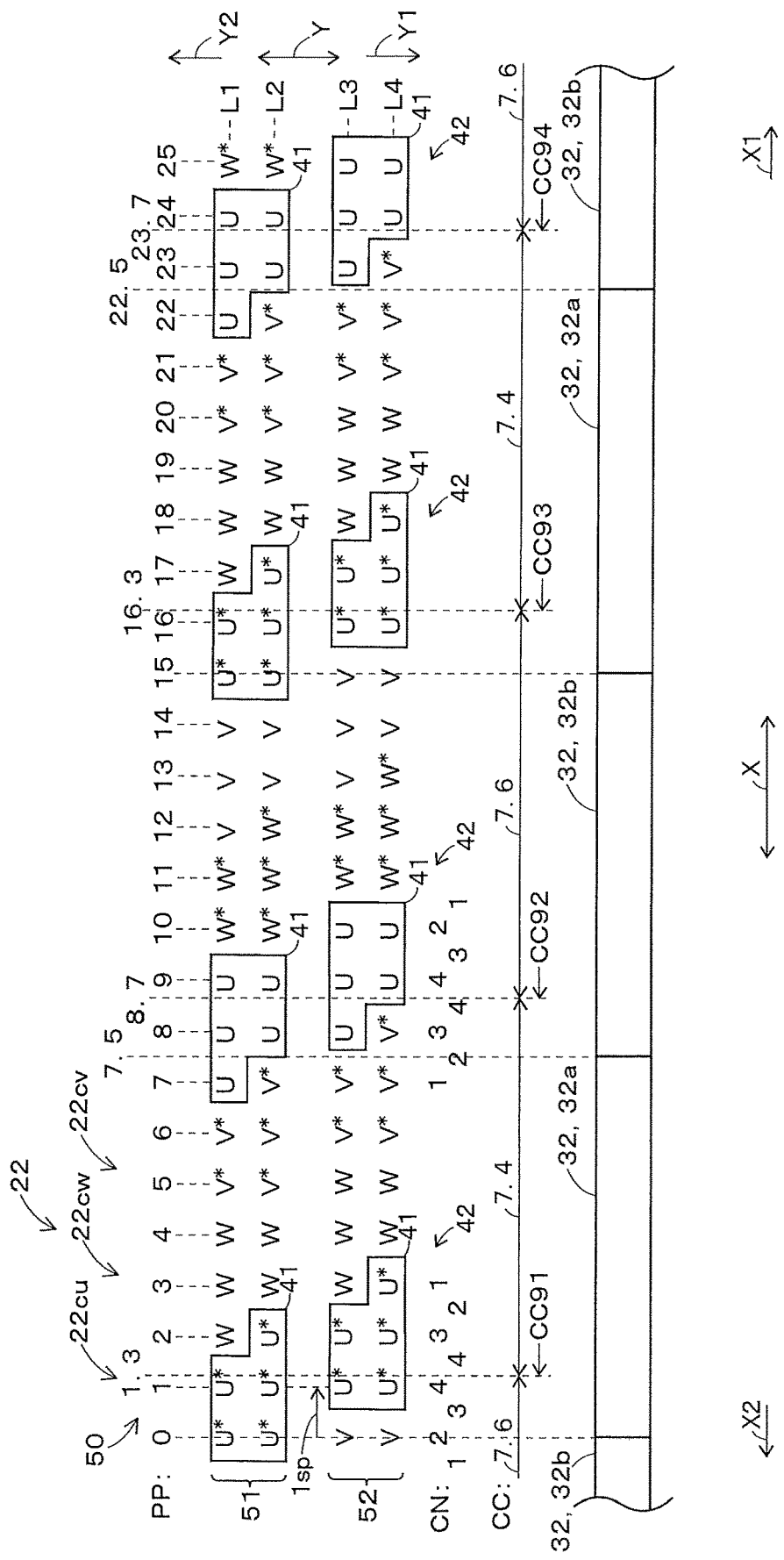
FIG. 21 is a schematic diagram illustrating an example of phase arrangement of a stator winding according to a sixth embodiment.

As illustrated in FIG. 21, the stator winding 22 includes a plurality of (two) basic coils 50. Each of a plurality of (two) basic coils 50 has the same configuration as that of the described basic coil 50. A plurality of (two) basic coils 50 include a first basic coil 51 and a single second basic coil 52. Also in the present embodiment, the single second basic coil 52 is disposed at a position moved by a predetermined slot pitch in the movement direction (first direction (arrow X direction)) of the movable element 30 with respect to the first basic coil 51. The single second basic coil 52 is disposed at a position moved in one direction (arrow X1 direction) of the first direction (arrow X direction) with respect to the first basic coil 51. Consequently, the stator winding 22 of the present embodiment is formed in four layers such as the first layer L1 to the fourth layer L4.

In the present embodiment, the movement unit amount is set to a 1-slot pitch. The predetermined slot pitch is one time (1-slot pitch (1sp)) the 1-slot pitch which is the movement unit amount. As mentioned above, n for defining a predetermined slot pitch is 1. The first sequence of numbers includes one time (1-slot pitch (1sp)) the 1-slot pitch which is the movement unit amount.

For example, the one-phase band 41 of the U phase formed in a plurality of (three) slots 21*c* of which the position coordinates PP are 0, 1, and 2 in the first basic coil 51 is formed in a plurality of (three) slots 21*c* of which the position coordinates PP are 1, 2, and 3 in the single second basic coil 52. The above-described content may be similarly applied to other one-phase bands 41 of the U phase. In this case, the mixed one-phase band 42 of the U phase is formed in a plurality of (four) slots 21*c* of which the position coordinates PP are 0, 1, 2, and 3. The number (the number of coil sides CN) of a plurality of coil sides 22*a* forming the mixed one-phase band 42 of the U phase is ten. The coil side center CC91 of the mixed one-phase band 42 may be calculated, for example, on the basis of Equation 33 as follows, and the coil side center CC91 is 1.3.

$CC91=(0\times2+1\times4+2\times3+3\times1)/(2+4+3+1)=1.3$ (Equation 33)

The mixed one-phase band 42 of the U phase is formed in a plurality of (four) slots 21*c* of which the position coordinates PP are 7, 8, 9, and 10. The number (the number of coil sides CN) of a plurality of coil sides 22*a* forming the mixed one-phase band 42 of the U phase is ten. The coil side center CC92 of the mixed one-phase band 42 may be calculated, for example, on the basis of Equation 34 as follows, and the coil side center CC92 is 8.7.

$CC92=(7\times1+8\times3+9\times4+1\times2)/(1+3+4+2)=8.7$ (Equation 34)

In this case, the mixed one-phase band 42 of the U phase is formed in a plurality of (four) slots 21*c* of which the position coordinates PP are 15, 16, 17, and 18. The number (the number of coil sides CN) of a plurality of coil sides 22*a* forming the mixed one-phase band 42 of the U phase is ten. The coil side center CC93 of the mixed one-phase band 42 may be calculated, for example, on the basis of Equation 35 as follows, and the coil side center CC93 is 16.3.

$CC93=(15\times2+16\times4+17\times3+18\times1)/(2+4+3+1)=16.3$ (Equation 35)

The mixed one-phase band 42 of the U phase is formed in a plurality of (four) slots 21*c* of which the position coordinates PP are 22, 23, 24, and 25. The number (the number of coil sides CN) of a plurality of coil sides 22*a* forming the mixed one-phase band 42 of the U phase is ten. The coil side center CC94 of the mixed one-phase band 42 may be calculated, for example, on the basis of Equation 36 as follows, and the coil side center CC94 is 23.7.

$CC94=(22\times1+23\times3+24\times4+25\times2)/(1+3+4+2)=23.7$ (Equation 36)

On the basis of the above-described calculation results, a distance between the coil side center CC91 and the coil side center CC92 of the mixed one-phase band 42 of the U phase is 7.4 (=8.7−1.3). A distance between the coil side center CC92 and the coil side center CC93 of the mixed one-phase band 42 of the U phase is 7.6 (=16.3−8.7). A distance between the coil side center CC93 and the coil side center CC94 of the mixed one-phase band 42 of the U phase is 7.4 (=23.7−16.3). As mentioned above, 7.4 and 7.6 are repeated as a distance between the coil side centers CC of the mixed one-phase band 42 of the same phase (U phase) adjacent to each other in the first direction (arrow X direction). Thus, a distance between the coil side centers CC of the mixed one-phase band 42 of the same phase (U phase) adjacent to each other in the first direction (arrow X direction) is not uniform in each of a plurality of (eight) movable element magnetic poles 32, and is uniform in each magnetic pole pair. An adjacent coil side ratio in the present embodiment is 0.97 (=7.4/7.6).

Figure 22:
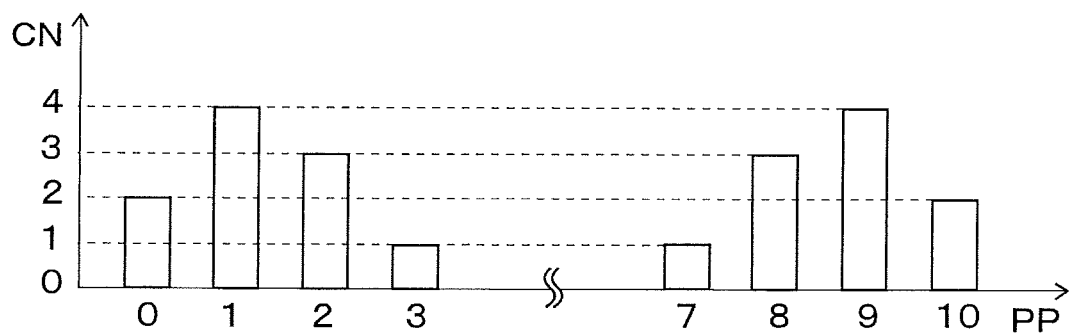
FIG. 22 is a schematic diagram illustrating an example of a coil side distribution according to the sixth embodiment.

FIG. 22 illustrates an example of a coil side distribution of the present embodiment. As illustrated in FIG. 21, for example, a plurality of (two) coil sides 22*a* with the U phase are accommodated in the slot 21*c* of which the position coordinate PP is O. Thus, as illustrated in FIG. 21, the number (the number of coil sides CN) of coil sides 22*a* with the U phase at the position coordinate PP of 0 is two. Similarly, a plurality of (four) coil sides 22*a* with the U phase are accommodated in the slot 21*c* of which the position coordinate PP is 1, and the number (the number of coil sides CN) of coil sides 22*a* with the U phase at the position coordinate PP of 1 is four. A plurality of (three) coil sides 22*a* with the U phase are accommodated in the slot 21*c* of which the position coordinate PP is 2, and the number (the number of coil sides CN) of coil sides 22*a* with the U phase at the position coordinate PP of 2 is three. A single coil side 22*a* with the U phase is accommodated in the slot 21*c* of which the position coordinate PP is 3, and the number (the number of coil sides CN) of coil sides 22*a* with the U phase at the position coordinate PP of 3 is one.

A single coil side 22*a* with the U phase is accommodated in the slot 21*c* of which the position coordinate PP is 7, and the number (the number of coil sides CN) of coil sides 22*a* with the U phase at the position coordinate PP of 7 is one. A plurality of (three) coil sides 22*a* with the U phase are accommodated in the slot 21*c* of which the position coordinate PP is 8, and the number (the number of coil sides CN) of coil sides 22*a* with the U phase at the position coordinate PP of 8 is three. A plurality of (four) coil sides 22*a* with the U phase are accommodated in the slot 21*c* of which the position coordinate PP is 9, and the number (the number of coil sides CN) of coil sides 22a with the U phase at the position coordinate PP of 9 is four. A plurality of (two) coil sides 22a with the U phase are accommodated in the slot 21c of which the position coordinate PP is 10, and the number (the number of coil sides CN) of coil sides 22a with the U phase at the position coordinate PP of 10 is two.

In the present embodiment, the number (the number of coil sides CN) of a plurality of coil sides 22a forming the mixed one-phase band 42 of the U phase is all ten, and is uniform in each of a plurality of (eight) movable element magnetic poles 32. Thus, the magnitude of magnetomotive force generated when the stator winding 22 is conducted is uniform in each of a plurality of (eight) movable element magnetic poles 32. However, since 7.4 and 7.6 are repeated as a distance between the coil side centers CC of the mixed one-phase band 42 of the same phase (U phase) adjacent to each other in the first direction (arrow X direction), a magnetomotive force distribution is not equivalent in each of a plurality of (eight) movable element magnetic poles 32, and is equivalent every other poles in each magnetic pole pair. In other words, the rotating electric machine 10 of the present embodiment has two types of magnetomotive force distributions in the same manner as in the reference form (a form in which the stator winding 22 includes a single basic coil 50). Thus, the rotating electric machine 10 of the present embodiment may not reduce noise and vibration of the rotating electric machine 10 due to phase arrangement of the stator winding 22.

However, in the present embodiment, a coil side distribution width of the mixed one-phase band 42 of the U phase formed in a plurality of (four) slots 21c of which the position coordinates PP are 0, 1, 2, and 3 is four slots. A coil side distribution width of the mixed one-phase band 42 of the U phase formed in a plurality of (four) slots 21c of which the position coordinates PP are 7, 8, 9, and 10 is four slots. An effective coil side distribution width of the mixed one-phase band 42 of the U phase formed in a plurality of (four) slots 21c of which the position coordinates PP are 0, 1, 2, and 3 is 4.5 slots. An effective coil side distribution width of the mixed one-phase band 42 of the U phase formed in a plurality of (four) slots 21c of which the position coordinates PP are 7, 8, 9, and 10 is 4.5 slots.

As mentioned above, the effective coil side distribution width (4.5 slots) of the comparison form is increased compared with the effective coil side distribution width (3.5 slots) of the reference form (a form in which the stator winding 22 includes a single basic coil 50). As a result, a magnetomotive force distribution generated when the stator winding 22 is conducted is distributed in the movement direction (first direction (arrow X direction)) of the movable element 30, and a magnetomotive force distribution of the present embodiment is gentler than a magnetomotive force distribution of the reference form. Therefore, an attraction force distribution between the stator 20 and the movable element 30 is also gentle, and thus a peak value (the amplitude of a fundamental wave component in the attraction force distribution) and a change amount of the attraction force are reduced compared with the reference form. Pitches in the movement direction (first direction (arrow X direction)) of the movable element 30 at positions where the peak value of the attraction force is the maximum are the same as each other. In other words, it is possible to reduce noise and vibration of the rotating electric machine 10 compared with the rotating electric machine 10 of the reference form. A magnetic flux waveform generated in the gap between the stator 20 and the movable element 30 comes closer to a sine wave than in the reference form, and thus the rotating electric machine 10 of the present embodiment can also reduce harmonic components (for example, fifth-order and seventh-order components) of magnetomotive force compared with the reference form. The above-described content may be applied to the coil side distribution of the present embodiment illustrated in FIG. 22 and the coil side distribution of the reference form illustrated in FIG. 5A. In any of the second embodiment, the third embodiment, and the fourth embodiment, a movement unit amount may be set to a 1-slot pitch.

In the present embodiment, conduction directions of a plurality of coil sides 22a with the same phase accommodated in the same slot 21c are aligned. Thus, in the present embodiment, it is not necessary to correct conduction directions of a plurality of coil sides 22a unlike in the above-described embodiments. In the present embodiment, an interface between phases is simplified (unevenness of the interface between the phases is minimized), and thus it is not necessary to change arrangement in a slot 21c of a plurality of coil sides 22a accommodated in the same slot 21c.

For example, in the first basic coil 51, the one-phase band 41 of the U phase formed in a plurality of (three) slots 21c of which the position coordinates PP are 0, 1, and 2 occupies 2.5 slots. In the same manner as in the first embodiment, if a serial converted conductor number of the coil sides 22a occupying a single slot 21c is referred to as a reference conductor number t0, the first coil side conductor number may be expressed by 2.5×t0.

The one-phase band 41 of the U phase of the second basic coil 52 disposed at a position moved by an 8-slot pitch in the first direction (arrow X direction) with respect to the one-phase band 41 of the first basic coil 51 is formed in a plurality of (three) slots 21c of which the position coordinates PP are 1, 2, and 3, and occupies 2.5 slots. Therefore, the second coil side conductor number may be expressed by 2.5×t0. In other words, also in the present embodiment, the first coil side conductor number is the same as the second coil side conductor number. The above-described content may be similarly applied to other one-phase bands 41.

Relationship Among Respective Embodiments

Figure 23A:
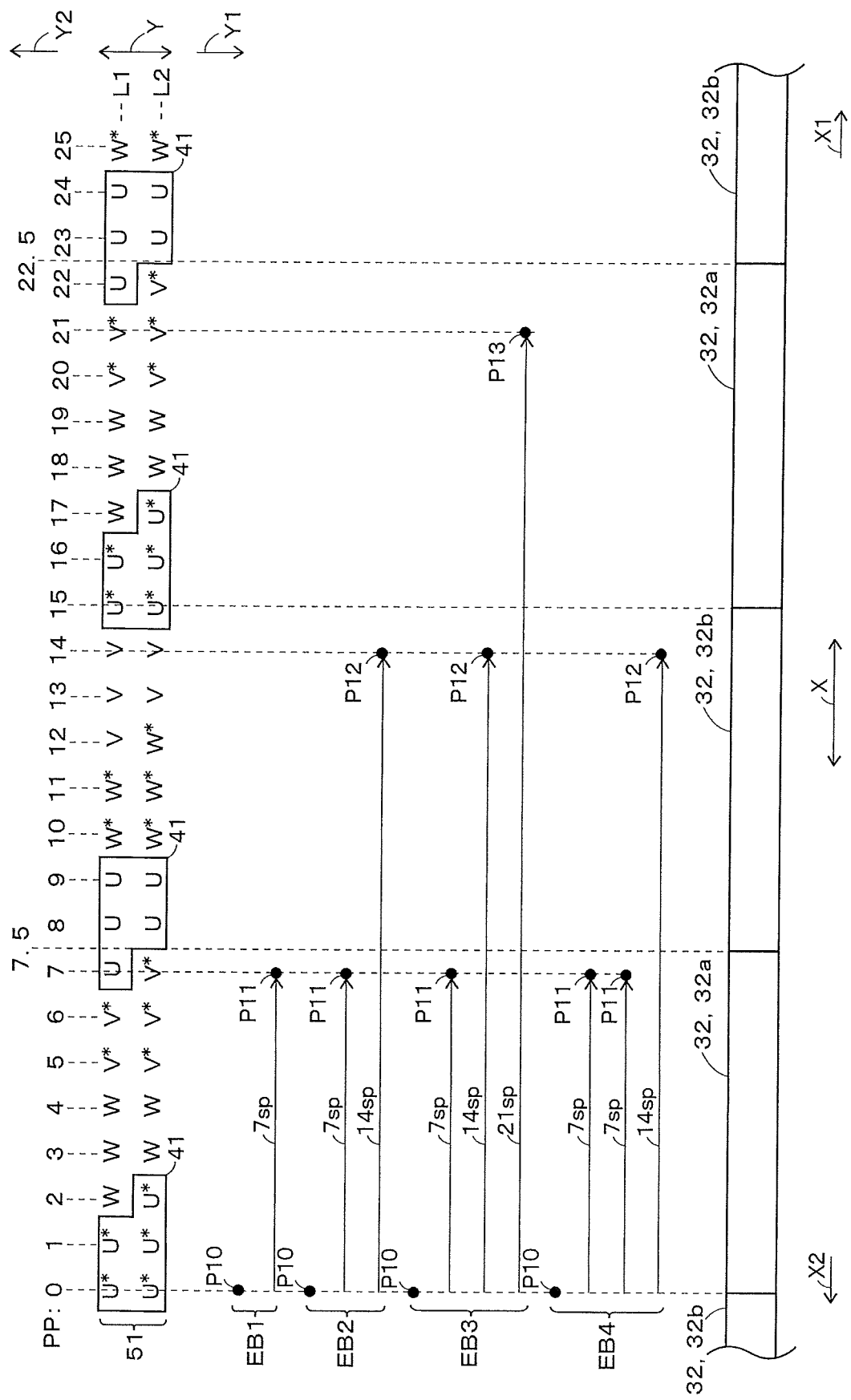
FIG. 23A is a schematic diagram illustrating an example of a relationship of a movement amount of a second basic coil in first direction (arrow X direction)

FIG. 23A illustrates an example of a relationship of a movement amount of the second basic coil 52 in the first direction (arrow X direction). A position P10 illustrated in FIG. 23A typifies a position in the first direction (arrow X direction) of the one-phase band 41 of the U phase formed in a plurality of (three) slots 21c of which the position coordinates PP are 0, 1, and 2 in the first basic coil 51. A position P11 indicates a position moved from the position P10 by a 7-slot pitch (7sp) in one direction (arrow X1 direction) of the first direction (arrow X direction). A position P12 indicates a position moved from the position P10 by a 14-slot pitch (14sp) in one direction (arrow X1 direction) of the first direction (arrow X direction). A position P13 indicates a position moved from the position P10 by a 21-slot pitch (21sp) in one direction (arrow X1 direction) of the first direction (arrow X direction).

The position P11 to position P13 can be said to indicate predetermined slot pitches when a movement unit amount is a 7-slot pitch. In a case of the position P11, n for defining a predetermined slot pitch is 1. In a case of the position P12, n for defining a predetermined slot pitch is 2. In a case of the position P13, n for defining a predetermined slot pitch is 3.

As described above, in the first embodiment, a plurality of (two) basic coils 50 include the first basic coil 51 and a single second basic coil 52. A configuration EB1 schematically illustrates a configuration of a plurality of (two) basic coils 50 of the first embodiment. In this case, the position P11 typifies a position in the first direction (arrow X direction) of the one-phase band 41 of the U phase formed in a plurality of (three) slots 21c of which the position coordinates PP are 7, 8, and 9 in the second basic coil 52 formed in the third layer L3 and the fourth layer L4.

In the second embodiment, a plurality of (three) basic coils 50 include the first basic coil 51 and a plurality of (two) second basic coils 52. A configuration EB2 schematically illustrates a configuration of a plurality of (three) basic coils 50 of the second embodiment. In this case, the position P11 typifies a position in the first direction (arrow X direction) of the one-phase band 41 of the U phase formed in a plurality of (three) slots 21c of the position coordinates PP are 7, 8, and 9 in the second basic coil 52 formed in the third layer L3 and the fourth layer L4. The position P12 typifies a position in the first direction (arrow X direction) of the one-phase band 41 of the U phase formed in a plurality of (three) slots 21c of the position coordinates PP are 14, 15, and 16 in the second basic coil 52 formed in the fifth layer L5 and the sixth layer L6.

In the third embodiment, a plurality of (four) basic coils 50 include the first basic coil 51 and a plurality of (three) second basic coils 52. A configuration EB3 schematically illustrates a configuration of a plurality of (four) basic coils 50 of the third embodiment. In this case, the position P11 typifies a position in the first direction (arrow X direction) of the one-phase band 41 of the U phase formed in a plurality of (three) slots 21c of the position coordinates PP are 7, 8, and 9 in the second basic coil 52 formed in the third layer L3 and the fourth layer L4. The position P12 typifies a position in the first direction (arrow X direction) of the one-phase band 41 of the U phase formed in a plurality of (three) slots 21c of the position coordinates PP are 14, 15, and 16 in the second basic coil 52 formed in the fifth layer L5 and the sixth layer L6. The position P13 typifies a position in the first direction (arrow X direction) of the one-phase band 41 of the U phase formed in a plurality of (three) slots 21c of the position coordinates PP are 21, 22, and 23 in the second basic coil 52 formed in the third seventh layer L7 and the eighth layer L8.

In the fourth embodiment, a plurality of (four) basic coils 50 include the first basic coil 51 and a plurality of (three) second basic coils 52. A configuration EB4 schematically illustrates a configuration of a plurality of (four) basic coils 50 of the second embodiment. In this case, one of the two positions P11 typifies a position in the first direction (arrow X direction) of the one-phase band 41 of the U phase formed in a plurality of (three) slots 21c of the position coordinates PP are 7, 8, and 9 in the second basic coil 52 formed in the third layer L3 and the fourth layer L4. In this case, the other of the two positions P11 typifies a position in the first direction (arrow X direction) of the one-phase band 41 of the U phase formed in a plurality of (three) slots 21c of the position coordinates PP are 7, 8, and 9 in the second basic coil 52 formed in the fifth layer L5 and the sixth layer L6. The position P12 typifies a position in the first direction (arrow X direction) of the one-phase band 41 of the U phase formed in a plurality of (three) slots 21c of the position coordinates PP are 14, 15, and 16 in the second basic coil 52 formed in the seventh layer L7 and the eighth layer L8.

In the configuration EB1, the first sequence of numbers which is a sequence of numbers in which predetermined slot pitches of each of at least one second basic coil 52 are enumerated includes one time (7-slot pitch (7sp)) the 7-slot pitch which is a movement unit amount. In the configuration EB2, the first sequence of numbers includes all natural number multiples from one time (7-slot pitch (7sp)) to twice (14-slot pitch (14sp)) the 7-slot pitch which is a movement unit amount. In the configuration EB3, the first sequence of numbers includes all natural number multiples from one time (7-slot pitch (7sp)) to three times (21-slot pitch (21sp)) the 7-slot pitch which is a movement unit amount. In the configuration EB4, the first sequence of numbers includes all natural number multiples from one time (7-slot pitch (7sp)) to twice (14-slot pitch (14sp)) the 7-slot pitch which is a movement unit amount.

As mentioned above, in any of the configuration EB1 to the configuration EB4, the first sequence of numbers includes all natural number multiples from one time (7-slot pitch (7sp)) to n times (7×n-slot pitch (7×nsp)) the 7-slot pitch which is a movement unit amount. Therefore, the configuration EB1 to the configuration EB4 can easily realize uniformization of magnetomotive force for each pole.

Figure 23B:
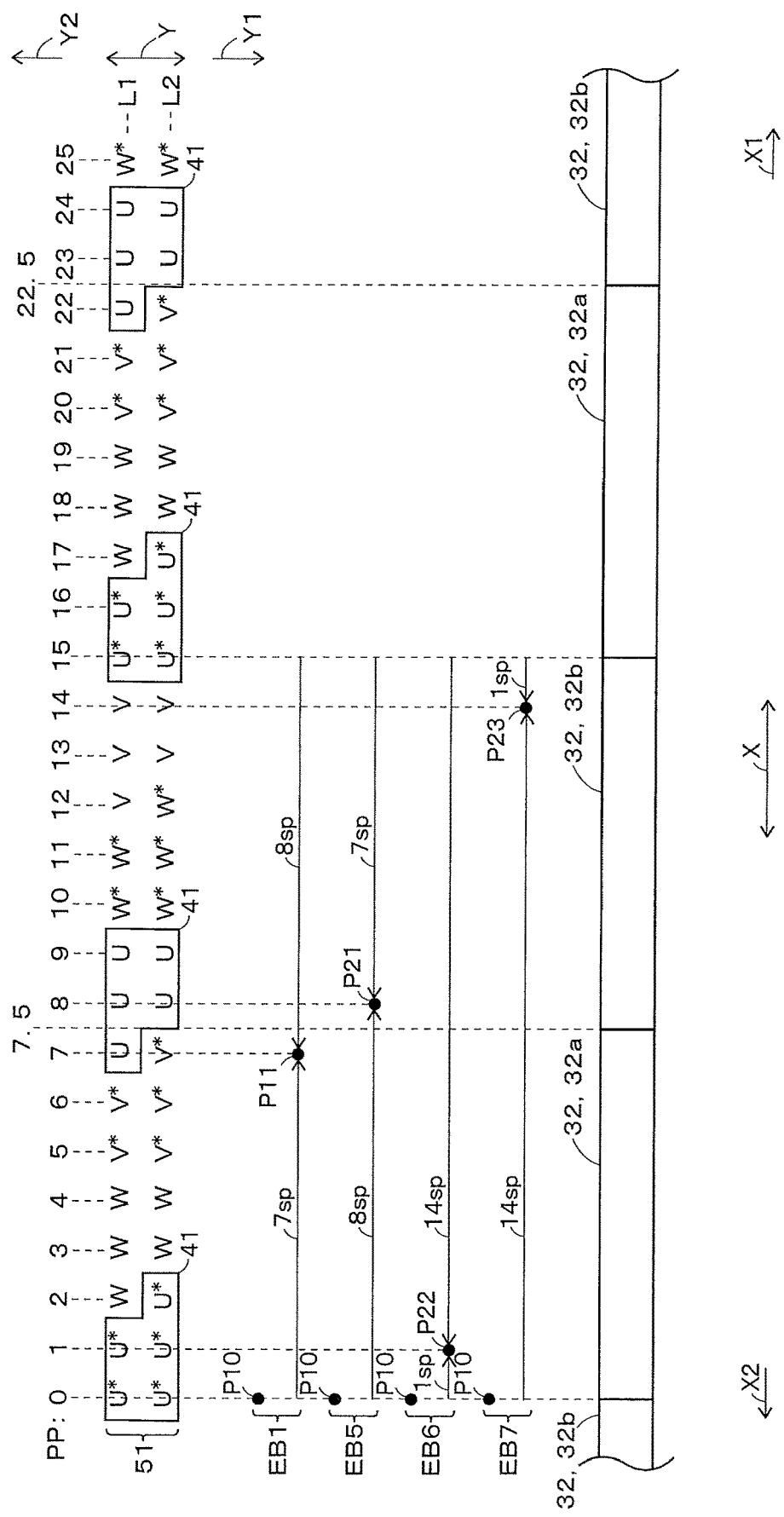
FIG. 23B is a schematic diagram illustrating another example of a relationship of a movement amount of the second basic coil in the first direction (arrow X direction).

FIG. 23B illustrates another example of a relationship of a movement amount of the second basic coil 52 in the first direction (arrow X direction). A position P10, a position P11, and a configuration EB1 are the same as described above. A position P21 indicates a position moved from the position P10 by an 8-slot pitch (8sp) in one direction (arrow X1 direction) of the first direction (arrow X direction). A position P22 indicates a position moved from the position P10 by a 1-slot pitch (1sp) in one direction (arrow X1 direction) of the first direction (arrow X direction). A position P23 indicates a position moved from the position P10 by a 14-slot pitch (14sp) in one direction (arrow X1 direction) of the first direction (arrow X direction).

The above-described embodiments relate to the ½-sequence rotating electric machine 10, and phase arrangement of the stator winding 22 is repeated for each magnetic pole pair of a plurality of (eight) movable element magnetic poles 32. Thus, a position of which the position coordinate PP is 0 is equivalent to a position of which the position coordinate PP is 15. Therefore, it can be said that the position P11 indicates a position moved from the position (equivalent position) of which the position coordinate PP is 15 by an 8-slot pitch (8sp) in the other direction (arrow X2 direction) of the first direction (arrow X direction). It can be said that the position P21 indicates a position moved from the position (equivalent position) of which the position coordinate PP is 15 by a 7-slot pitch (7sp) in the other direction (arrow X2 direction) of the first direction (arrow X direction). It can be said that the position P22 indicates a position moved from the position (equivalent position) of which the position coordinate PP is 15 by a 14-slot pitch (14sp) in the other direction (arrow X2 direction) of the first direction (arrow X direction). It can be said that the position P23 indicates a position moved from the position (equivalent position) of which the position coordinate PP is 15 by a 1-slot pitch (1sp) in the other direction (arrow X2 direction) of the first direction (arrow X direction).

As described above, in the fifth embodiment, a plurality of (two) basic coils 50 include the first basic coil 51 and a single second basic coil 52. A configuration EB5 schematically illustrates a configuration of a plurality of (two) basic coils 50 of the fifth embodiment. In this case, the position P21 typifies a position in the first direction (arrow X direction) of the one-phase band 41 of the U phase formed in a plurality of (three) slots 21c of which the position coordinates PP are 8, 9, and 10 in the second basic coil 52 formed in the third layer L3 and the fourth layer L4. In other words, the position P21 indicates a predetermined slot pitch when a movement unit amount is an 8-slot pitch, and n for defining a predetermined slot pitch is 1.

Here, in the first embodiment, a form is supposed in which the single second basic coil 52 is moved in the other direction (arrow X2 direction) of the first direction (arrow X direction) with respect to the first basic coil 51. In this case, the position P21 indicates a predetermined slot pitch when a movement unit amount is a 7-slot pitch, and n for defining a predetermined slot pitch is 1.

Conversely, in the fifth embodiment, a form is supposed in which the single second basic coil 52 is moved in the other direction (arrow X2 direction) of the first direction (arrow X direction) with respect to the first basic coil 51. In this case, the position P11 indicates a predetermined slot pitch when a movement unit amount is an 8-slot pitch, and n for defining a predetermined slot pitch is 1. As mentioned above, the other of the configuration EB1 and the configuration EB5 can be defined by using one of the configuration EB1 and the configuration EB5, and the configuration EB1 and the configuration EB5 are substantially equivalent to each other. The above-described content can also be seen from the coil side distribution of the first embodiment illustrated in FIG. 5B and the coil side distribution of the fifth embodiment illustrated in FIG. 16.

In the sixth embodiment, a plurality of (two) basic coils 50 include the first basic coil 51 and a single second basic coil 52. A configuration EB6 schematically illustrates a configuration of a plurality of (two) basic coils 50 of the sixth embodiment. In this case, the position P22 typifies a position in the first direction (arrow X direction) of the one-phase band 41 of the U phase formed in a plurality of (three) slots 21c of which the position coordinates PP are 1, 2, and 3 in the second basic coil 52 formed in the third layer L3 and the fourth layer L4. In other words, the position P22 indicates a predetermined slot pitch when a movement unit amount is a 1-slot pitch, and n for defining a predetermined slot pitch is 1.

Here, in the first embodiment, a form is supposed in which a predetermined slot pitch is set to be twice (14-slot pitch (14sp)) the 7-slot pitch which is a movement unit amount. A configuration EB7 schematically illustrates a configuration of the supposed form. In this case, the position P23 typifies a position in the first direction (arrow X direction) of the one-phase band 41 of the U phase formed in a plurality of (three) slots 21c of which the position coordinates PP are 14, 15, and 16 in the second basic coil 52 formed in the third layer L3 and the fourth layer L4. In other words, the position P23 indicates a predetermined slot pitch when a movement unit amount is a 7-slot pitch, and n for defining a predetermined slot pitch is 2.

Conversely, in the sixth embodiment, a form is supposed in which the single second basic coil 52 is moved in the other direction (arrow X2 direction) of the first direction (arrow X direction) with respect to the first basic coil 51. In this case, the position P23 indicates a predetermined slot pitch when a movement unit amount is a 1-slot pitch, and n for defining a predetermined slot pitch is 1. As mentioned above, the other of the configuration EB6 and the configuration EB7 can be defined by using one of the configuration EB6 and the configuration EB7, and the configuration EB6 and the configuration EB7 are substantially equivalent to each other.

In the ½-sequence rotating electric machine 10, a difference between the number of slots per pole (in the above-described embodiments, 7.5) and an integer (in the above-described embodiments, a 7-slot pitch or an 8-slot pitch) closest to the number of slots per pole is 0.5. In other words, if the integer (a 7-slot pitch or an 8-slot pitch) closest to the number of slots per pole is set as a movement unit amount, the movement unit amount corresponds to a movement unit amount by which the second basic coil 52 is moved from an electromagnetically substantially equivalent position (a position moved by an electrical angle of 180°) to a position which is separate by a 0.5-slot pitch. In other words, if twice (a 14-slot pitch or a 16-slot pitch) the integer closest to the number of slots per pole is set as a movement unit amount, the movement unit amount corresponds to a movement unit amount by which the second basic coil 52 is moved from an electromagnetically substantially equivalent position (a position moved by an electrical angle of) 180° to a position which is separate by a 1-slot pitch. It can also be seen therefrom that the configuration EB6 and the configuration EB7 are substantially equivalent to each other.

Examples of Effects

The rotating electric machine 10 related to an aspect 1 is a rotating electric machine having a fraction slot configuration in which the number of slots per pole per phase is not an integer. Here, a set of a plurality of coil sides 22a with the same phase and the same current direction, accommodated in a plurality of slots 21c which are continuously adjacent to each other in the movement direction (first direction (arrow X direction)) of the movable element 30 is referred to as a one-phase band 41. The stator winding 22 includes a plurality of basic coils 50 in which the magnitude of magnetomotive force generated by the plurality of coil sides 22a forming the one-phase band 41 is uniform in each of a plurality of movable element magnetic poles 32. A plurality of (two) basic coils 50 include a first basic coil 51 which is used as a reference regarding arrangement of the one-phase band 41 per pole in the movement direction (first direction (arrow X direction)) of the movable element 30, and at least one second basic coil 52 in which arrangement of the one-phase band 41 per pole in the movement direction (first direction (arrow X direction)) of the movable element 30 differs with respect to the first basic coil 51. A newly formed one-phase band 41 by mixing a plurality of coil sides 22a forming a certain one-phase band 41 of the first basic coil 51 with a plurality of coil sides 22a forming a certain one-phase band 41 of each of at least one second basic coil 52 is referred to as a mixed one-phase band 42. In the stator winding 22, a plurality of basic coils 50 are mixed with each other such that the magnitude of magnetomotive force generated by the plurality of coil sides 22a forming the mixed one-phase band 42 is uniform in each of a plurality of movable element magnetic poles 32.

According to the rotating electric machine 10 related to the aspect 1, uniformity of the magnitude of magnetomotive force and a magnetomotive force distribution generated when the stator winding 22 is conducted is increased. As a result, excitation force in a low-order spatial deformation mode is reduced compared with the number of magnetic poles of the movable element 30. Therefore, the rotating electric machine 10 related to the aspect 1 can suppress a reduction in an eigenfrequency of the stator 20, and can thus reduce noise and vibration caused by phase arrangement of the stator winding 22.

According to the rotating electric machine 10 related to an aspect 2, in the rotating electric machine 10 related to the aspect 1, at least one second basic coil 52 is disposed at a position moved by a predetermined slot pitch in a movement direction (first direction (arrow X direction)) of the movable element 30 with respect to the first basic coil 51.

According to the rotating electric machine 10 related to the aspect 2, at least one second basic coil 52 is disposed at a position moved by a predetermined slot pitch in a movement direction (first direction (arrow X direction)) of the movable element 30 with respect to the first basic coil 51, and thus a plurality of basic coils 50 are easily mixed with each other.

According to the rotating electric machine 10 related to an aspect 3, in the rotating electric machine 10 related to the aspect 2, in a case where an integer closest to the number of slots per pole, or a 1-slot pitch is set as a movement unit amount, a predetermined slot pitch is expressed by n times (where n is a natural number of 1 or more) the movement unit amount.

According to the rotating electric machine 10 related to the aspect 3, it is possible to suppress an excessive increase (in other words, excessive widening of a coil side distribution) in an effective coil side distribution width. Thus, the rotating electric machine 10 related to the aspect 3 can suppress a reduction in output torque. Particularly, in a case where an integer closest to the number of slots per pole is set as a movement unit amount, the above-described effect is remarkable.

According to the rotating electric machine 10 related to an aspect 4, in the rotating electric machine 10 related to the aspect 3, a first sequence of numbers which is a sequence of numbers in which a predetermined slot pitch of each of at least one second basic coil 52 is enumerated includes all natural number multiples from one time to n times the movement unit amount.

According to the rotating electric machine 10 related to the aspect 4, the first sequence of numbers includes all natural number multiples from one time to n times the movement unit amount, and thus uniformity of magnetomotive force per pole is easily realized.

According to the rotating electric machine 10 related to an aspect 5, in the rotating electric machine 10 related to the aspect 4, the movement unit amount is an integer slot pitch closest to the number of slots per pole. The center of the mixed one-phase band 42 calculated by taking into consideration both arrangement of a plurality of coil sides 22a forming the mixed one-phase band 42 and positions of a plurality of coil sides 22a in the movement direction (first direction (arrow X direction)) of the movable element 30 is referred to as the coil side center CC of the mixed one-phase band 42. A distance between the coil side centers CC of the mixed one-phase bands 42 adjacent to each other in the movement direction (first direction (arrow X direction)) of the movable element 30 is uniform in each of a plurality of movable element magnetic poles 32.

According to the rotating electric machine 10 of the aspect 5, a magnetomotive force distribution is equivalent in each of a plurality of movable element magnetic poles 32. Thus, in the rotating electric machine 10 related to the aspect 5, an effect of reducing noise and vibration caused by the stator winding 22 is improved.

According to the rotating electric machine 10 related to an aspect 6, in the rotating electric machine 10 related to any one of the aspects 2 to 5, a serial converted conductor number of a plurality of coil sides 22a forming a certain one-phase band 41 of the first basic coil 51 is referred to as a first coil side conductor number. A serial converted conductor number of a plurality of coil sides 22a forming a certain one-phase band 41 of each of at least one second basic coil 52 disposed at a position moved by a predetermined slot pitch in the movement direction (first direction (arrow X direction)) of the movable element 30 with respect to the certain one-phase band 41 of the first basic coil 51 is referred to as a second coil side conductor number. The first coil side conductor number and each of at least one second coil side conductor number are all uniform.

According to the rotating electric machine 10 related to the aspect 6, it is possible to easily uniformize the magnitude of magnetomotive force generated by a plurality of coil sides 22a forming the mixed one-phase band 42 in each of a plurality of movable element magnetic poles 32.

According to the rotating electric machine 10 related to an aspect 7, in the rotating electric machine 10 related to any one of the aspects 2 to 5, a serial converted conductor number of a plurality of coil sides 22a forming a certain one-phase band 41 of the first basic coil 51 is referred to as a first coil side conductor number. A serial converted conductor number of a plurality of coil sides 22a forming a certain one-phase band 41 of each of at least one second basic coil 52 disposed at a position moved by a predetermined slot pitch in the movement direction (first direction (arrow X direction)) of the movable element 30 with respect to the certain one-phase band 41 of the first basic coil 51 is referred to as a second coil side conductor number. A sequence of numbers in which the number of elements is m (where m is a natural number of 3 or more) is referred to as a second sequence of numbers, the elements such as enumerated coil side conductor numbers including the first coil side conductor number and at least one second coil side conductor number in which predetermined slot pitches are enumerated in an ascending order for each predetermined slot pitch. In the second sequence of numbers, a coil side conductor number of a k-th (where k is a natural number of m/2 or less) element is the same as a coil side conductor number of a (m−k+1)-th element.

According to the rotating electric machine 10 related to the aspect 7, it is possible to easily uniformize the magnitude of magnetomotive force generated by a plurality of coil sides 22a forming the mixed one-phase band 42 in each of a plurality of movable element magnetic poles 32.

According to the rotating electric machine 10 related to an aspect 8, in the rotating electric machine 10 related to the aspect 7, in the second sequence of numbers, a coil side conductor number increases from a first element to a j-th (where j is m/2, and is a natural number obtained by rounding up a decimal place when m/2 is not a natural number), and a coil side conductor number decreases from the j-th element to an m-th element.

According to the rotating electric machine 10 related to the aspect 8, a magnetic flux waveform generated in the gap between the stator 20 and the movable element 30 can come close to a sine wave, and thus harmonic components of magnetomotive force can be reduced.

According to the rotating electric machine 10 related to an aspect 9, in the rotating electric machine 10 related to the aspect 8, m is 3. In the second sequence of numbers, the coil side conductor number of the second element is set to be twice the coil side conductor number of the first element and the coil side conductor number of the third element.

According to the rotating electric machine 10 related to the aspect 9, in a form in which three basic coils 50 include the first basic coil 51 and two second basic coils 52 of which predetermined slot pitches are different from each other, a magnetic flux waveform generated in the gap between the stator 20 and the movable element 30 can come close to a sine wave, and thus harmonic components of magnetomotive force can be reduced.

OTHERS

The present embodiment is not limited to the above-described forms and the forms illustrated in the drawings, and may be modified and realized as appropriate within the scope without departing from the spirit. For example, the stator winding 22 may include five or more basic coils 50, and the number of basic coils 50 is not limited. The stator winding 22 may include a plurality of first basic coils 51. The number of slots of the stator 20 and the number of magnetic poles of the movable element 30 are not limited.

In the above-described embodiments, the movable element 30 is provided inside the stator 20 (inner rotary type rotating electric machine). However, the movable element 30 may be provided outside the stator 20 (outer rotary type rotating electric machine). The rotating electric machine 10 is not limited to a radial gap type or axial gap type rotating electric machine in which the stator 20 and the movable element 30 are disposed on the same axis. The rotating electric machine 10 may be applied to a linear electric motor or a linear generator in which the stator 20 and the movable element 30 are disposed linearly, and the movable element 30 is linearly moved with respect to the stator 20. The rotating electric machine 10 may be used for various rotating electric machines having a fraction slot configuration, and may be used for, for example, a drive electric motor and a generator for a vehicle, and an electric motor and a generator for industrial use or household use.

According to the rotating electric machine, the stator winding includes a plurality of basic coils in which the magnitude of magnetomotive force generated by the plurality of coil sides forming the one-phase band is uniform in each of the plurality of movable element magnetic poles. The plurality of basic coils include a first basic coil which is used as a reference regarding arrangement of the one-phase band per pole in the movement direction of the movable element, and at least one second basic coil in which arrangement of the one-phase band per pole in the movement direction of the movable element differs with respect to the first basic coil. In the stator winding, the plurality of basic coils are mixed with each other such that the magnitude of magnetomotive force generated by the plurality of coil sides forming the mixed one-phase band is uniform in each of the plurality of movable element magnetic poles. Consequently, uniformity of the magnitude of magnetomotive force and a magnetomotive force distribution generated when the stator winding is conducted is increased. As a result, excitation force in a low-order spatial deformation mode is reduced compared with the number of magnetic poles of the movable element. Therefore, the rotating electric machine can suppress a reduction in an eigenfrequency of the stator, and can thus reduce noise and vibration caused by phase arrangement of the stator winding.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotating electric machine having a fraction slot configuration in which the number of slots per pole per phase is not an integer, comprising:
a stator that includes
a stator core provided with a plurality of slots, and
a stator winding having a plurality of coil sides accommodated in the plurality of slots and a plurality of coil ends connecting the same side end parts of the plurality of coil sides to each other; and
a movable element that is supported to be movable with respect to the stator, and includes a movable element core, and a plurality of movable element magnetic poles provided in the movable element core,
wherein, in a case where a set of the plurality of coil sides with the same phase and the same current direction, accommodated in the plurality of slots which are continuously adjacent to each other in a movement direction of the movable element is referred to as a one-phase band, the stator winding includes a plurality of basic coils in which the magnitude of magnetomotive force generated by the plurality of coil sides forming the one-phase band is uniform in each of the plurality of movable element magnetic poles,
wherein the plurality of basic coils include
a first basic coil which is used as a reference regarding arrangement of the one-phase band per pole in the movement direction of the movable element, and
at least one second basic coil in which arrangement of the one-phase band per pole in the movement direction of the movable element differs with respect to the first basic coil, and
wherein, in a case where a newly formed one-phase band by mixing the plurality of coil sides forming a certain one-phase band of the first basic coil with the plurality of coil sides forming a certain one-phase band of each of at least one second basic coil is referred to as a mixed one-phase band, in the stator winding, the plurality of basic coils are mixed with each other such that the magnitude of magnetomotive force generated by the plurality of coil sides forming the mixed one-phase band is uniform in each of the plurality of movable element magnetic poles.

2. The rotating electric machine according to claim 1, wherein the at least one second basic coil is disposed at a position moved by a predetermined slot pitch in the movement direction of the movable element with respect to the first basic coil.

3. The rotating electric machine according to claim 2, wherein, in a case where an integer closest to the number of slots per pole, or a 1-slot pitch is set as a movement unit amount, the predetermined slot pitch is expressed by n times (where n is a natural number of 1 or more) the movement unit amount.

4. The rotating electric machine according to claim 3, wherein a first sequence of numbers which is a sequence of numbers in which the predetermined slot pitch of each of the at least one second basic coil is enumerated includes all natural number multiples from one time to n times the movement unit amount.

5. The rotating electric machine according to claim 4, wherein the movement unit amount is an integer slot pitch closest to the number of slots per pole, and
wherein, in a case where the center of the mixed one-phase band calculated by taking into consideration both arrangement of the plurality of coil sides forming the mixed one-phase band and positions of the plurality of coil sides in the movement direction of the movable element is referred to as a coil side center, a distance between the coil side centers adjacent to each other in the movement direction of the movable element is uniform in each of the plurality of movable element magnetic poles.

6. The rotating electric machine according to claim 2, wherein, in a case where a serial converted conductor number of the plurality of coil sides forming a certain one-phase band of the first basic coil is referred to as a first coil side conductor number, and a serial converted conductor number of the plurality of coil sides forming a certain one-phase band of each of the at least one second basic coil disposed at a position moved by the predetermined slot pitch in the movement direction of the movable element with respect to the certain one-phase band of the first basic coil is referred to as a second coil side conductor number, the first coil side conductor number and each of at least one second coil side conductor number are all uniform.

7. The rotating electric machine according to claim 2, wherein, in a case where
a serial converted conductor number of the plurality of coil sides forming a certain one-phase band of the first basic coil is referred to as a first coil side conductor number, a serial converted conductor number of the plurality of coil sides forming a certain one-phase band of each of the at least one second basic coil disposed at a position moved by the predetermined slot pitch in the movement direction of the movable element with respect to the certain one-phase band of the first basic coil is referred to as a second coil side conductor number, and a sequence of numbers in which the number of elements is m (where m is a natural number of 3 or more) is referred to as a second sequence of numbers, the elements enumerating coil side conductor numbers including the first coil side conductor number and at least one second coil side conductor number which is enumerated in an ascending order of the predetermined slot pitch for each predetermined slot pitch, in the second sequence of numbers,
the coil side conductor number of a k-th (where k is a natural number of m/2 or less) element is the same as the coil side conductor number of a (m−k+1)-th element.

8. The rotating electric machine according to claim 7, wherein, in the second sequence of numbers, the coil side conductor number increases from a first element to a j-th (where j is m/2, and is a natural number obtained by rounding up a decimal place when m/2 is not a natural number) element, and the coil side conductor number decreases from the j-th element to an m-th element.

9. The rotating electric machine according to claim 8, wherein m is 3, and
wherein, in the second sequence of numbers, the coil side conductor number of a second element is set to be twice the coil side conductor number of the first element and the coil side conductor number of a third element.

\* \* \* \* \*